US008606734B2

(12) United States Patent
Du Castel et al.

(10) Patent No.: US 8,606,734 B2
(45) Date of Patent: Dec. 10, 2013

(54) SYSTEM AND METHOD FOR AUTOMATING EXPLORATION OR PRODUCTION OF SUBTERRANEAN RESOURCE

(75) Inventors: Bertrand Du Castel, Austin, TX (US); Harry Barrow, Girton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 359 days.

(21) Appl. No.: 13/054,039

(22) PCT Filed: Jul. 23, 2009

(86) PCT No.: PCT/IB2009/006350
§ 371 (c)(1), (2), (4) Date: Mar. 15, 2011

(87) PCT Pub. No.: WO2010/010455
PCT Pub. Date: Jan. 28, 2010

(65) Prior Publication Data

US 2011/0155462 A1 Jun. 30, 2011

Related U.S. Application Data

(60) Provisional application No. 61/083,125, filed on Jul. 23, 2008, provisional application No. 61/083,074, filed on Jul. 23, 2008.

(51) Int. Cl.
*G06F 17/00* (2006.01)

(52) U.S. Cl.
USPC .......... 706/45

(58) Field of Classification Search
None
See application file for complete search history.

(56) References Cited

U.S. PATENT DOCUMENTS

| | | | | |
|---|---|---|---|---|
| 6,021,377 | A * | 2/2000 | Dubinsky et al. | 702/9 |
| 6,868,920 | B2 | 3/2005 | Hoteit et al. | |
| 6,892,812 | B2 | 5/2005 | Niedermayr et al. | |
| 7,128,167 | B2 * | 10/2006 | Dunlop et al. | 175/24 |
| 2007/0094216 | A1 | 4/2007 | Mathias et al. | |
| 2008/0071714 | A1 | 3/2008 | Menich et al. | |
| 2008/0156531 | A1 | 7/2008 | Boone et al. | |
| 2011/0166789 | A1 | 7/2011 | Barrow et al. | |

FOREIGN PATENT DOCUMENTS

WO 0198631 A1 12/2001

OTHER PUBLICATIONS

Fine et al., "The Hierarchical Hidden Markov Model: Analysis and Applications", 1998, Machine learning, vol. 32, pp. 42-62.*
Brachman: "On the epistemological status of semantic networks," Associative Networks: Representation and Use of Knowledge by Computers, N V Findler (ed), Academic Press, 1979, pp. 3-50.
Brachman et al: "Krypton: A functional approach to knowledge representation," IEEE Computer, vol. 16, No. 10, Oct. 1983, pp. 67-73.
Costa et al: "PR-OWL: A framework for probabilistic ontologies", International Conference on Formal Ontology in Information Systems, Baltimore, USA, Nov. 9-11, 2006.

(Continued)

*Primary Examiner* — Jeffrey A Gaffin
*Assistant Examiner* — Paulinho E Smith

(57) ABSTRACT

A method and system for automating exploration and production of subterranean resources, using data collected from exploration and production activities, including drilling rig data and/or the like is described. The method and system include the use of a knowledge representation containing representation of uncertainty in the exploration and production operations.

9 Claims, 49 Drawing Sheets

(56) References Cited

OTHER PUBLICATIONS

Gennari et al: "The evolution of protégé: An environment for knowledge-based systems development". Report SMI-2002-0943, Stanford Medical Informatics, Stanford University, 2002.
Haase et al: "Ontology learning and reasoning—Dealing with uncertainty and inconsistency", International Semantic Web Conference, Galway, Ireland, Nov. 6-10, 2005, pp. 45-55.
Hendler et al: "Integrating applications on the semantic web," Journal of the Institute of Electrical Engineers of Japan, vol. 122, No. 10, Oct. 2002, pp. 676-680. Also available at http://www.w3.org/2002/07/swint.
Lymberopoulos et al: "Macroscopic human behavior interpretation using distributed imager and other sensors", Proceedings of the IEEE, vol. 96, No. 10, Oct. 2008, pp. 1657-1677.
Masterman: "Semantic message detection for machine translation, using an interlingua", International Conference on Machine Translation of Languages and Applied Language Analysis, National Physical Laboratory, Teddington, United Kingdom, Sep. 5-8, 1961, pp. 438-474.
Pearl: "Markov and Bayesian Networks: Two graphical representations of probabilistic knowledge", Probabilistic Reasoning in Intelligent Systems: Networks of Plausible Inference, Morgan Kaufmann Publishers, 1988, chapter 3, pp. 77-141.
Pearl: "Belief updating by network propagation", Probabilistic Reasoning in Intelligent Systems: Networks of Plausible Inference, Morgan Kaufmann Publishers, 1988, chapter 4, pp. 143-237.
Pearl: "Distributed revision of composite beliefs", Probabilistic Reasoning in Intelligent Systems: Networks of Plausible Inference, Morgan Kaufmann Publishers, 1988, chapter 5, pp. 239-288.
Quillian: "Semantic Memory", Report AD-641671, Clearinghouse for Federal Scientific and Technical Information; abridged version in M Minsky (ed.) Semantic Information Processing, MIT Press, 1968, pp. 227-270.
Schank et al: "A conceptual parser for natural language", International Joint Conference on Artificial Intelligence, Washington DC, May 7-9, 1969, pp. 569-578.
Sowa: "Semantic networks", Encyclopedia of Artificial Intelligence, vol. 2, Stuart C. Shapiro (ed), John Wiley & Sons, 1987, pp. 1011-1024.
W3C: "Web Ontology Language (OWL)", World Wide Web Consortium, W3C Semantic Web, 2007, website: http:// www.w3.org/2004/OWL/.
Zhang et al: "Complex activity representation and recognition by extended stochastic grammar", Lecture Notes in Computer Science, vol. 3851, Springer-Verlag, 2006, ISBN 978-3-540-31219-2, pp. 150-159.
International Search Report of PCT Application No. PCT/IB2009/006346 dated Apr. 8, 2010.
International Search Report of PCT Application No. PCT/IB2009/006350 dated Mar. 19, 2010.

* cited by examiner

231

| | A-C | A-B-D | A-B-E | FINISH |
|---|---|---|---|---|
| START | .6 | 12 | .28 | 0 |
| A-C | 0 | 0 | 0 | 1.0 |
| A-B-D | 0 | 0 | 0 | 1.0 |
| A-B-E | 0 | 0 | .5 | .5 |

TRAITS-TO-STATE

| | TRAIT 1 | TRAIT2 | TRAIT3 | TRAIT4 |
|---|---|---|---|---|
| A | - | - | 1 | 0 |
| B | 1 | - | - | - |
| C | 0 | 1 | - | 0 |
| D | 0 | 1 | 1 | - |

*Fig. 20*

| | |
|---|---|
| A | 0010, 0110, 1010,1111 |
| B | 1000,1001,1010,1011,1100,1101,1110,1111 |
| C | 0100,0110 |
| D | 0110,0111 |

*Fig. 21*

TRAITS-TO-DATA

| | TRAIT 1 | TRAIT2 | TRAIT3 | TRAIT4 |
|---|---|---|---|---|
| 1 | 0 | 0 | - | - |
| 2 | 1 | 0 | - | - |
| 3 | - | - | 0 | 0 |
| 4 | - | - | 0 | 1 |
| 5 | - | - | 1 | 0 |
| 6 | - | - | 1 | 1 |

*Fig. 22*

| | |
|---|---|
| 1 | 0000,0001, 0010, 0011 |
| 2 | 1000,1001,1010,1011 |
| 3 | 0000,0100,1000,1100 |
| 4 | 0001,0101,1001,1101 |
| 5 | 0010,0110,1010,1110 |
| 6 | 0011,0111,1011,1111 |

*Fig. 23*

DATA-TO-STATE COMPATIBILITY MATRIX

| DATA/ TRAITS | A / - - 1 0 | B / 1 - - - | C / 0 1 - 0 | D / 0 1 1 - |
|---|---|---|---|---|
| | 0010, 0110, 1010,1111 | 1000,1001,1010, 1011,1100,1101, 1110,1111 | 0100,0110 | 0110,0111 |
| 1 / 00-- 0000 0001 0010 0011 | 1000 | 0000 0000 | 00 | 00 |
| 2 / 10-- 1000 1001 1010 1011 | 0010 | 1111 0000 | 00 | 00 |
| 3 / --00 0000 0100 1000 1100 | 0000 | 1000 1000 | 10 | 00 |
| 4 /--01 0001 0101 1001 1101 | 0000 | 0100 0100 | 00 | 00 |
| 5 / --10 0010 0110 1010 1110 | 1110 | 0010 0010 | 01 | 10 |
| 6 / --11 0011 0111 1011 1111 | 0001 | 0001 0001 | 00 | 01 |

STATE CONFIGS COMPATIBLE WITH A GIVEN DATA VALUE

*Fig. 24*

| | A / - - 1 0 | B / 1 - - - | C / 0 1 - 0 | D / 0 1 1 - |
|---|---|---|---|---|
| 1 / 00-- | 1000 -> 1/6 | 0000 0000 | 00 | 00 |
| 2 / 10-- | 0010 -> 1/6 | 1111 0000 -> 1/3 | 00 | 00 |
| 3 / --00 | 0000 | 1000 1000 -> 1/6 | 10 -> 1/2 | 00 |
| 4 /--01 | 0000 | 0100 0100 -> 1/6 | 00 | 00 |
| 5 / --10 | 1110 -> 1/2 | 0010 0010 -> 1/6 | 01 -> 1/2 | 10 -> 1/2 |
| 6 / --11 | 0001 -> 1/6 | 0001 0001 -> 1/6 | 00 | 01 -> 1/2 |
| Count | 6 | 12 | 2 | 2 |

STATE CONFIGS COMPATIBLE WITH A GIVEN DATA VALUE

*Fig. 25*

| | A / - - 1 0 | B / 1 - - - | C / 0 1 - 0 | D / 0 1 1 - |
|---|---|---|---|---|
| 1 / 00-- | 1 | 0 | 0 | 0 |
| 2 / 10-- | 1/3 | 2/3 | 0 | 0 |
| 3 / --00 | 0 | 1/4 | 3/4 | 0 |
| 4 /--01 | 0 | 1 | 0 | 0 |
| 5 / --10 | 3/10 | 1/10 | 3/10 | 1/10 |
| 6 / --11 | 1/5 | 1/5 | 00 | 3/5 |

STATE CONFIGS COMPATIBLE WITH A GIVEN DATA VALUE

*Fig. 26*

| | A | B | C | D | FINISH |
|---|---|---|---|---|---|
| Start | 1.0 | 0 | 0 | 0 | 0 |
| A | .5 | 0 | .3 | .2 | 0 |
| B | .3 | 0 | 0 | .7 | 0 |
| C | 0 | .3 | 0 | .7 | 0 |
| D | 0 | 0 | 0 | 0 | 1.0 |

TRANS-PROB example corresponding to Grammar 801

| | | | | | | |
|---|---|---|---|---|---|---|
| 5 | 2 | 5 | 3 | 6 | 5 | 6 |

805

| | | | | | | | | |
|---|---|---|---|---|---|---|---|---|
| START | 0 | .0 | 0.0 | 0.0 | 0.0 | 0.0 | 0.0 | 0.0 |
| A | 0.4 | .485 | .694 | .574 | 0.0 | 0.17 | .062 | .357 |
| B | 0.4 | .015 | .306 | 0.0 | .137 | .108 | 0.0 | .027 |
| C | 0.1 | .182 | 0.0 | .272 | .863 | 0.0 | .008 | 0.0 |
| D | 0.1 | .217 | 0.0 | .154 | 0 | .875 | .04 | .616 |
| FINISH | 0 | .101 | .0 | .0 | .0 | .0 | .89 | .0 |

209'

205'

| | | | | | | |
|---|---|---|---|---|---|---|
| .0 | 0.0 | 0.0 | 0.0 | 0.0 | 0.0 | 0.0 |
| .32 | .247 | .439 | 287 | .041 | .041 | .031 |
| .03 | .055 | 0.0 | .082 | .259 | 0.0 | .002 |
| .12 | .145 | .208 | .172 | 0.0 | .005 | .019 |
| .43 | .235 | .353 | .305 | .700 | .079 | .018 |
| .1 | .217 | 0.0 | .154 | 0.0 | .875 | .040 |

207'

| | | | | | | |
|---|---|---|---|---|---|---|
| .0 | .0 | .0 | .0 | .1 | .0 | .1 |
| .3 | .333 | .3 | .0 | .2 | .3 | .2 |
| .1 | .667 | .1 | .137 | .2 | .1 | .2 |
| .3 | .0 | .3 | .863 | .0 | .3 | .0 |
| .1 | .0 | .1 | .0 | .6 | .1 | .6 |
| 0 | .0 | .0 | .0 | .0 | .0 | .0 |

Actual Value

Recorded Value

| Trait #1 | On | Off |
|---|---|---|
| On | .98 | .02 |
| Off | .02 | .98 |

Actual Value

Recorded Value

| Trait #2 | On | Off |
|---|---|---|
| On | .97 | .03 |
| Off | .03 | .97 |

903

Actual Value

Recorded Value

| Trait #3 | On | Off |
|---|---|---|
| On | 1.0 | 0.0 |
| Off | 0.0 | 1.0 |

Actual Value

Recorded Value

| Trait #4 | On | Off |
|---|---|---|
| On | 1.0 | 0.0 |
| Off | 0.0 | 1.0 |

| Wash... | Motor... | Torque | dropping | steady | increasing |
|---|---|---|---|---|---|
| washout | stall | dropping | 0.000 | 0.000 | 10.000 |
| washout | stall | steady | 0.000 | 0.000 | 10.000 |
| washout | stall | increas... | 0.000 | 0.000 | 10.000 |
| washout | ok | dropping | 100.00 | 0.000 | 0.000 |
| washout | ok | steady | 90.000 | 10.000 | 0.000 |
| washout | ok | increas... | 40.000 | 30.000 | 30.000 |
| ok | stall | dropping | 0.000 | 0.000 | 5.000 |
| ok | stall | steady | 0.000 | 0.000 | 5.000 |
| ok | stall | increas... | 0.000 | 0.000 | 5.000 |
| ok | ok | dropping | 95.000 | 5.000 | 0.000 |
| ok | ok | steady | 2.500 | 95.000 | 2.500 |
| ok | ok | increas... | 0.000 | 5.000 | 95.000 |

SYSTEM AND METHOD FOR AUTOMATING EXPLORATION OR PRODUCTION OF SUBTERRANEAN RESOURCE

Embodiments of the present invention relate to interpreting data, including but not limited to interpreting data from oilfield applications—which data may include but is not limited to drilling data, production data, well data, completions data, drill string data, wellbore data, logging data and/or the like—using a knowledge representation that contains representation of uncertainties.

BACKGROUND

The statements in this section merely provide background information related to the present disclosure and may not constitute prior art.

In oilfield applications, the drilling process can be impeded by a wide variety of problems. Accurate measurements of downhole conditions, rock properties and surface equipment allow many drilling risks to be minimized and may also be used for detecting when a problem has occurred. At present, most problem detection is the result of human vigilance, but detection probability is often degraded by fatigue, high workload or lack of experience.

Merely by way of example, in oilfield applications, some limited techniques have been used for detecting the occurrence of one of two possible rig states using a single input channel. In one example, a technique may be used to automatically detect if a drill pipe for drilling a hydrocarbon well is either “in slips” or “not in slips”. This information may be used to gain accurate control of depth estimates, for example in conjunction with activities such as measurement-while-drilling (MWD) or mud logging. To tell whether the drill pipe is “in slips,” the known technique generally only uses a single input channel of hookload data measured on the surface. Another example of making a determination between two possible rig states is a technique used to predict if the drill bit is “on bottom” or “not on bottom.” Again, this method makes use of only a single input channel, namely block position, and is only used to detect one of two “states” of the drilling rig.

In the oilfield industry there is a need to automate process/applications and to monitor the automated processes and applications. This automation and monitoring may require monitoring of one or more streams of data and interpretation of the data.

BRIEF DESCRIPTION OF THE DRAWINGS

The present disclosure is described in conjunction with the appended figures.

FIG. 3(*b*) is a screen shot showing a zoom-in on the graphs of several data channels collected during a drilling operation of FIG. 3(*a*) over a short time interval.

FIG. 3(*c*) is a screen shot showing graphs of several data channels collected during a drilling operation and interpretations including probabilities of particular drilling activities occurring based on the input data of FIG. 3(*a*) using a methodology, in accordance with an embodiment of the present invention.

FIG. 3(*d*) is a zoom-in on the screen shot of FIG. 3(*c*) for a short time interval.

FIG. 20 is a continuation of the example started with FIG. 19 and introduces a table illustrating the values for the traits making up the configurations of the leaf activities of FIG. 19.

FIG. 21 illustrates the compatible configurations for the configurations defined in FIG. 20.

FIG. 22 provides a table of the values of the traits making up the configurations corresponding to six data values used in the example introduced in FIG. 19.

FIG. 23 illustrates the compatible configurations for the configurations defined in FIG. 22.

FIG. 24 is a table of sequence of flags that reflect whether a particular corresponding configuration of the state is compatible with the configuration of the data value.

FIG. 25 is a table illustrating an intermediate step in the computation of the DATA-STATE-PROB matrix corresponding to the example introduced in FIG. 19.

FIG. 26 is an illustration of the resulting matrix following the normalization operation.

FIG. 27 provides an example TRANS-PROB matrix for the purposes of illustrating the operation of the interpretation program.

FIG. 28 is an illustration of the results of the operation of the interpretation program 401 using the process described in conjunction with FIGS. 13 though 15 and the TRANS-PROB matrix of FIG. 27 and the DATA-STATE-PROB matrix of FIG. 26.

FIG. 29 illustrates some confusion matrices corresponding to the example given herein above.

Figure 1:
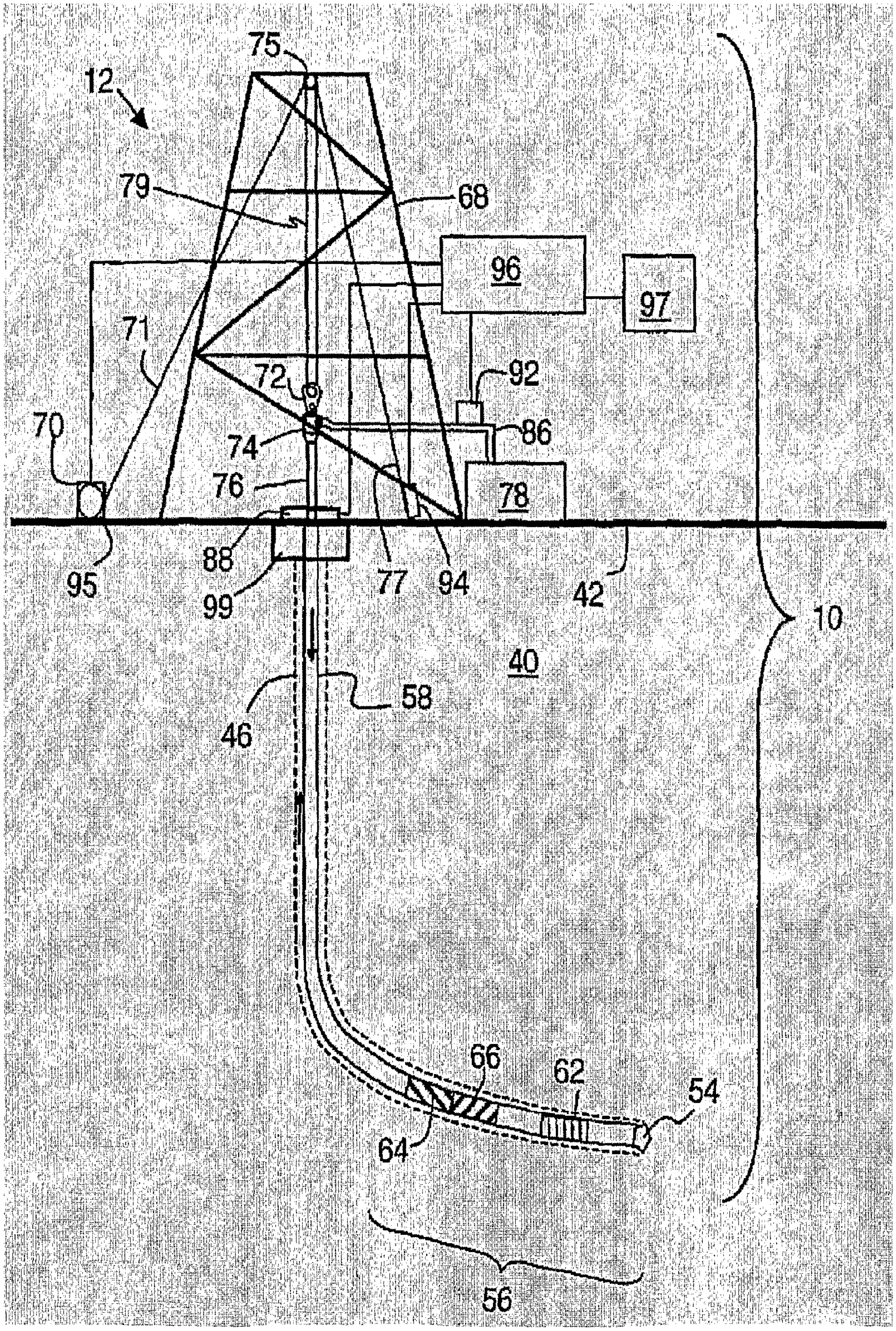
FIG. 1 shows a drilling system using automatic rig state detection, according to one embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In this disclosure, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Embodiments of the present invention provide a method of describing oilfield operations in a knowledge representation that contains a grammar for interpreting oilfield application data. Merely by way of example, in some embodiments, methods of describing drilling operations in a knowledge representation that contains a grammar for interpreting drilling data are provided. However, the methods herein disclosed may be used on other oilfield applications, such as hydrocarbon production, well completions, well logging, well interpretation, recovery operations, stimulation or the like. The knowledge representation of embodiments of the present invention may include representation of uncertainty.

For example, given a representation of oilfield operations, such as drilling activities or the like, that have component subactivities, the representation may include probabilities for transitioning from one such subactivity to another. The method, when applied, may provide for an efficient way of interpreting input data to determine the probability that the input data is indicative of certain activities occurring and is therefore a valuable tool in analyzing an oilfield application, such as the operations of a drilling rig or the like.

FIG. 1 shows a drilling system 10 using automatic rig state detection, according to one embodiment of the present invention. Drill string 58 is shown within borehole 46. Borehole 46 is located in the earth 40 having a surface 42. Borehole 46 is being cut by the action of drill bit 54. Drill bit 54 is disposed at the far end of the bottom hole assembly 56 that is attached to and forms the lower portion of drill string 58. Bottom hole assembly 56 contains a number of devices including various subassemblies. According to an embodiment of the invention measurement-while-drilling (MWD) subassemblies are included in subassemblies 62. Examples of typical MWD measurements include direction, inclination, survey data, downhole pressure (inside the drill pipe, and outside or annular pressure), resistivity, density, and porosity. Also included is a subassembly 62 for measuring torque and weight on bit. The signals from the subassemblies 62 are preferably processed in processor 66. After processing, the information from processor 66 is communicated to pulser assembly 64. Pulser assembly 64 converts the information from processor 66 into pressure pulses in the drilling fluid. The pressure pulses are generated in a particular pattern which represents the data from subassemblies 62. The pressure pulses travel upwards though the drilling fluid in the central opening in the drill string and towards the surface system. The subassemblies in the bottom hole assembly 56 can also include a turbine or motor for providing power for rotating and steering drill bit 54. In different embodiments, other telemetry systems, such as wired pipe, fiber optic systems, acoustic systems, wireless communication systems and/or the like may be used to transmit data to the surface system.

Figure 4:
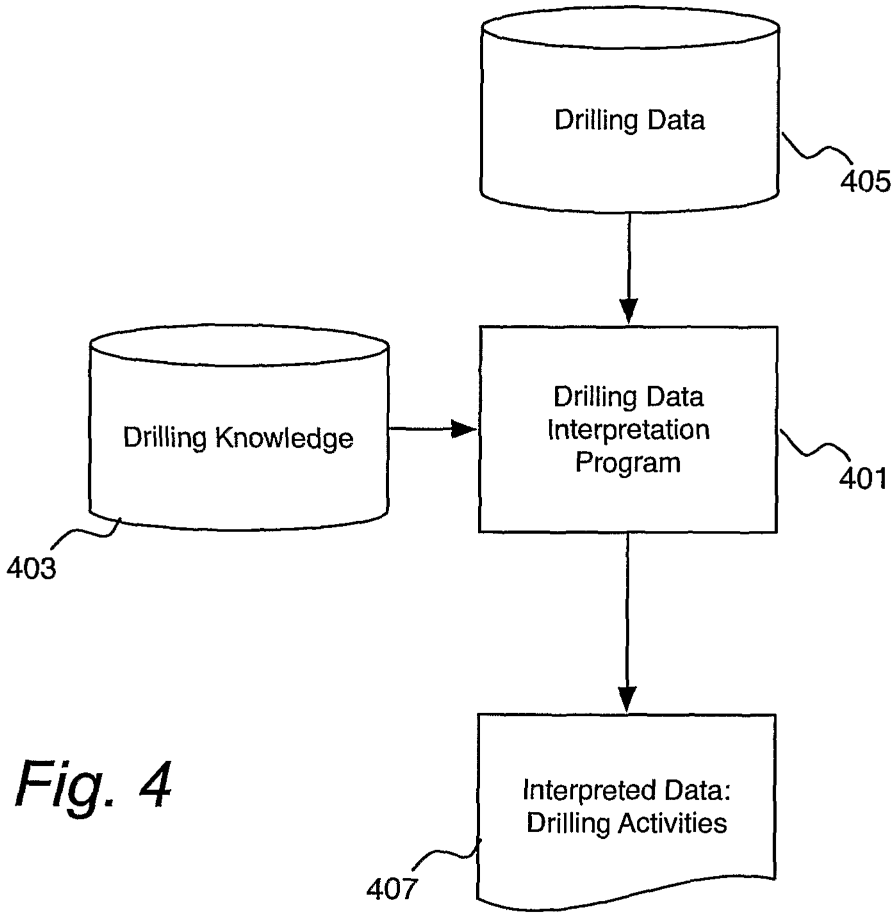
FIG. 4 is a high-level schematic illustration of a RIG data interpretation software program that may be used in accordance with an embodiment of the present invention to compute the interpretations illustrated in FIGS. 3(*c*) and 3(*d*).

The drilling rig 12 includes a derrick 68 and hoisting system, a rotating system, and a mud circulation system. The hoisting system which suspends the drill string 58, includes draw works 70, fast line 71, crown block 75, drilling line 79, traveling block and hook 72, swivel 74, and deadline 77. The rotating system includes kelly 76, rotary table 88, and engines (not shown). The rotating system imparts a rotational force on the drill string 58 as is well known in the art. Although a system with a kelly and rotary table is shown in FIG. 4, those of skill in the art will recognize that the present invention is also applicable to top drive drilling arrangements. Although the drilling system is shown in FIG. 4 as being on land, those of skill in the art will recognize that the present invention is equally applicable to marine environments.

The mud circulation system pumps drilling fluid down the central opening in the drill string. The drilling fluid is often called mud, and it is typically a mixture of water or diesel fuel, special clays, and other chemicals. The drilling mud is stored in mud pit 78. The drilling mud is drawn in to mud pumps (not shown), which pump the mud though stand pipe 86 and into the kelly 76 through swivel 74 which contains a rotating seal.

The mud passes through drill string 58 and through drill bit 54. As the teeth of the drill bit grind and gouges the earth formation into cuttings the mud is ejected out of openings or nozzles in the bit with great speed and pressure. These jets of mud lift the cuttings off the bottom of the hole and away from the bit 54, and up towards the surface in the annular space between drill string 58 and the wall of borehole 46.

At the surface the mud and cuttings leave the well through a side outlet in blowout preventer 99 and through mud return line (not shown). Blowout preventer 99 comprises a pressure control device and a rotary seal. The mud return line feeds the mud into separator (not shown) which separates the mud from the cuttings. From the separator, the mud is returned to mud pit 78 for storage and re-use.

Various sensors are placed on the drilling rig 10 to take measurement of the drilling equipment. In particular hookload is measured by hookload sensor 94 mounted on deadline 77, block position and the related block velocity are measured by block sensor 95 which is part of the draw works 70. Surface torque is measured by a sensor on the rotary table 88. Standpipe pressure is measured by pressure sensor 92, located on standpipe 86. Additional sensors may be used to detect whether the drill bit 54 is on bottom. Signals from these measurements are communicated to a central surface processor 96. In addition, mud pulses traveling up the drillstring are detected by pressure sensor 92. Pressure sensor 92 comprises a transducer that converts the mud pressure into electronic signals. The pressure sensor 92 is connected to surface processor 96 that converts the signal from the pressure signal into digital form, stores and demodulates the digital signal into useable MWD data. According to various embodiments described above, surface processor 96 is programmed to automatically detect the most likely rig state based on the various input channels described. Processor 96 is also programmed to carry out the automated event detection as described above. Processor 96 preferably transmits the rig state and/or event detection information to user interface system 97 which is designed to warn the drilling personnel of undesirable events and/or suggest activity to the drilling personnel to avoid undesirable events, as described above. In other embodiments, interface system 97 may output a status of drilling operations to a user, which may be a software application, a processor and/or the like, and the user may manage the drilling operations using the status.

Processor 96 may be further programmed, as described below, to interpret the data collected by the various sensors provided to provide an interpretation in terms of activities that may have occurred in producing the collected data. Such interpretation may be used to understand the activities of a driller, to automate particular tasks of a driller, and to provide training for drillers.

Figure 2:
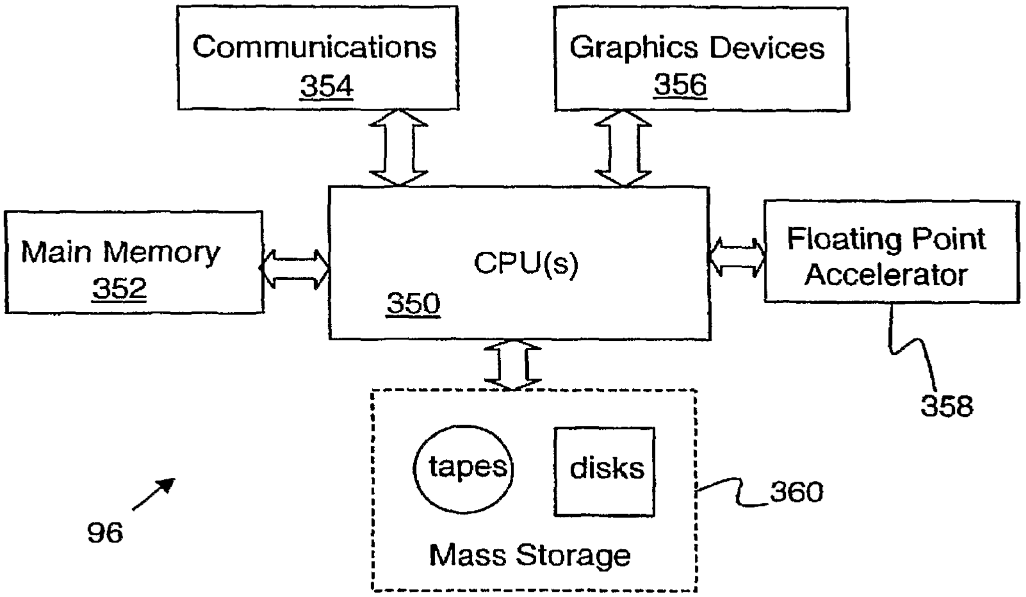
FIG. 2 illustrates a processor system for processing data to determine oilfield application state, according to one embodiment of the present invention.
Figure 3A:
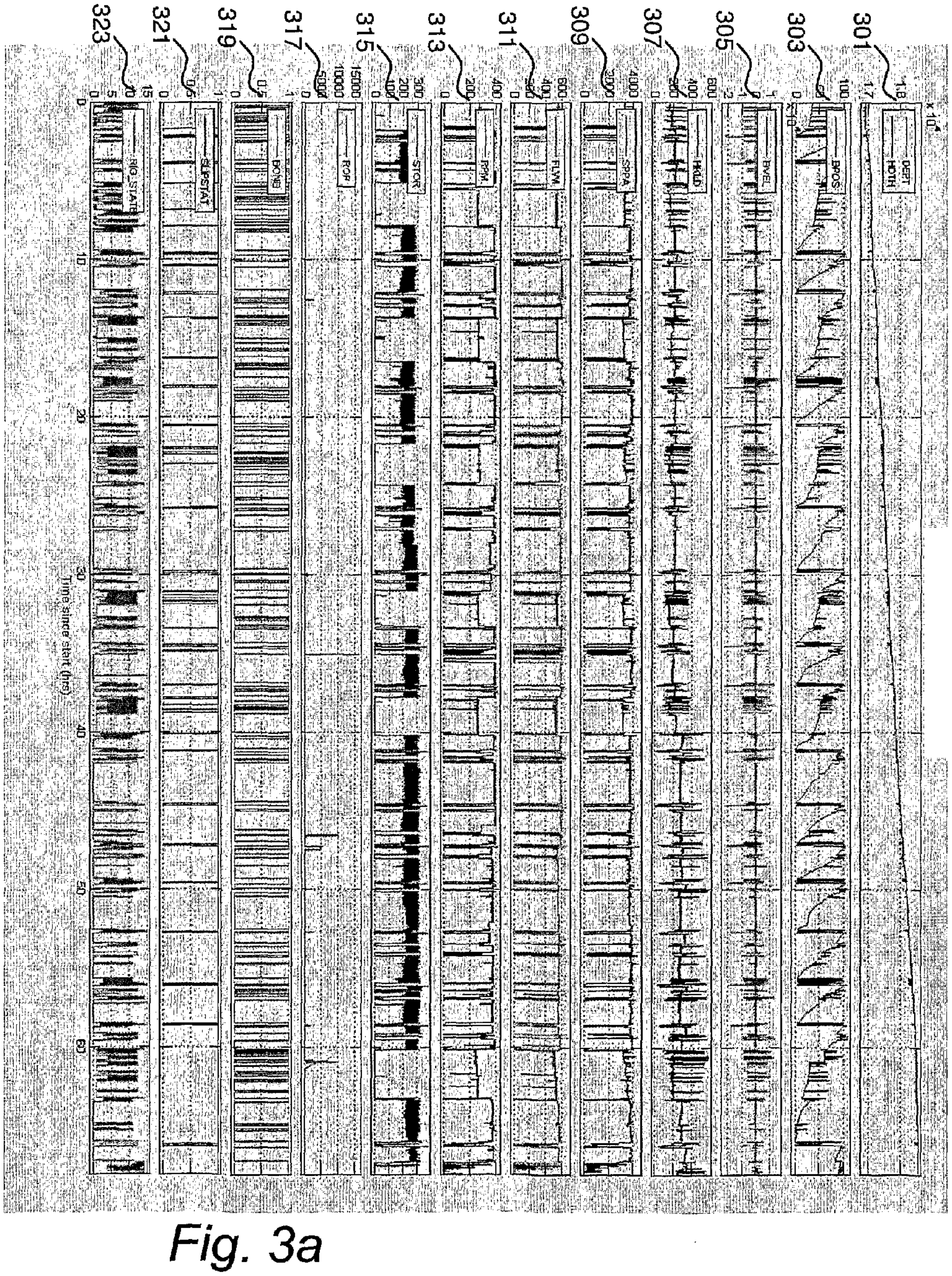
FIG. 3(*a*) is a screen shot showing graphs of several data channels collected during a drilling operation as may be used with an embodiment of the present invention.
Figure 3B:
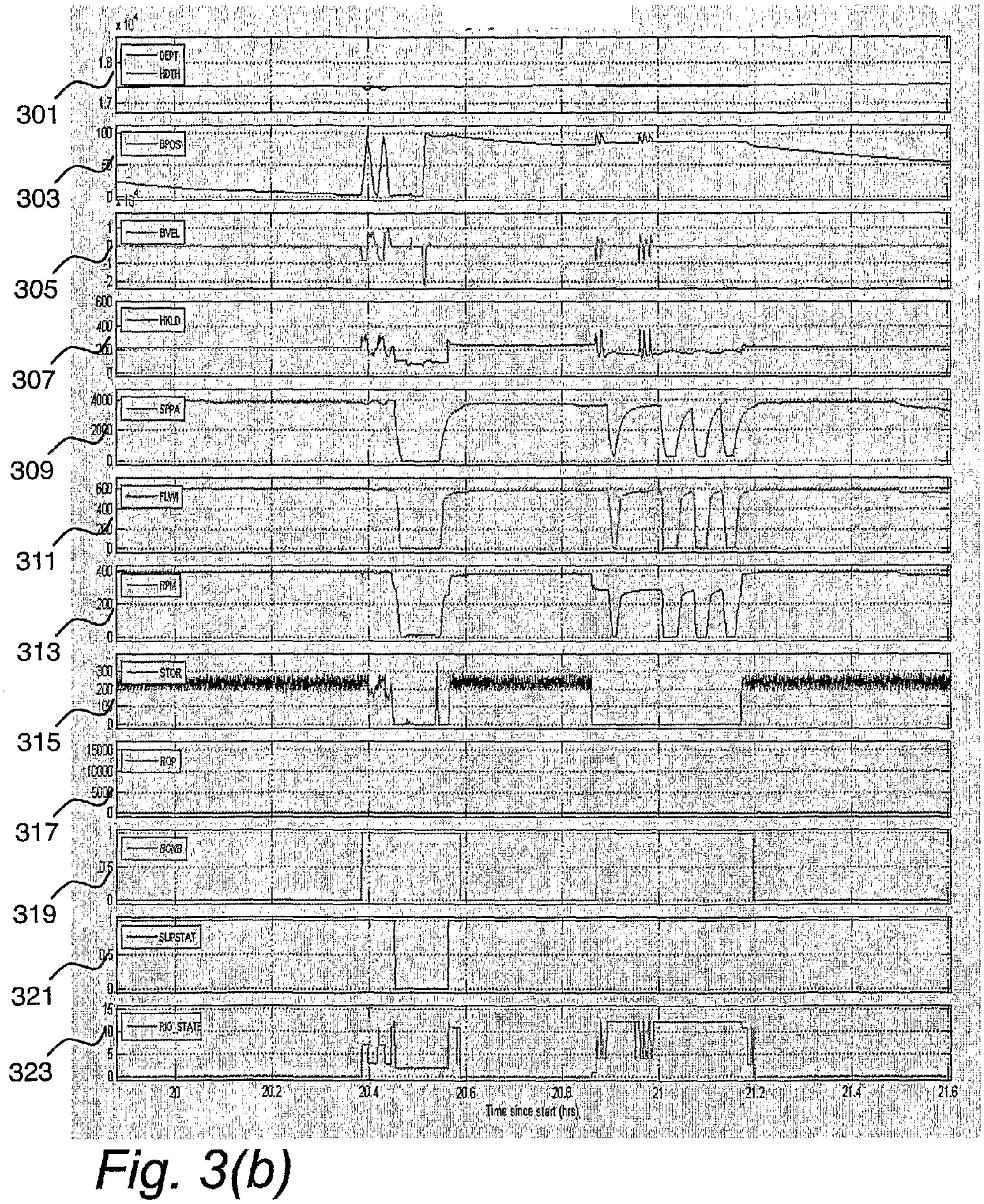
Figure 3C:
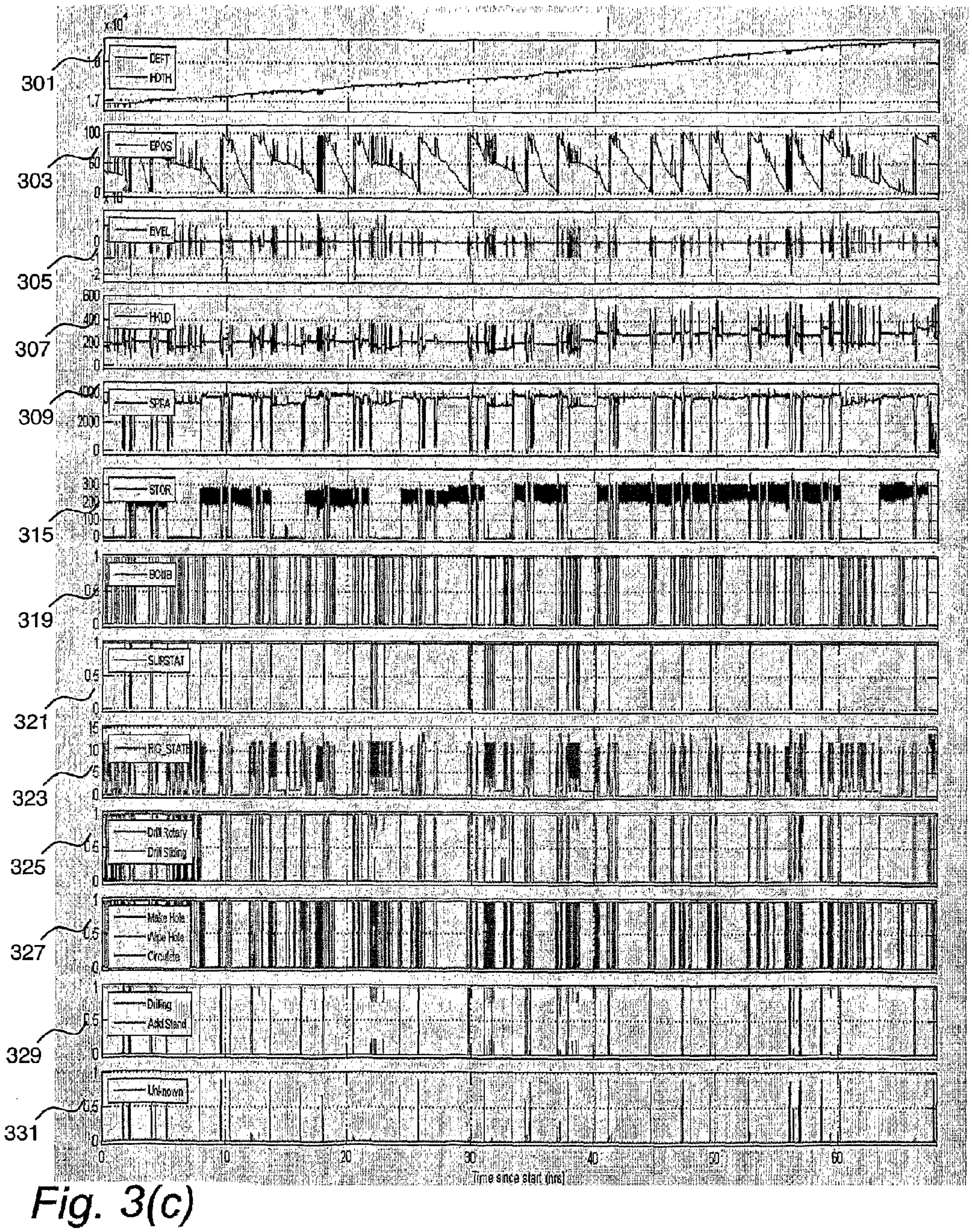
Figure 3D:
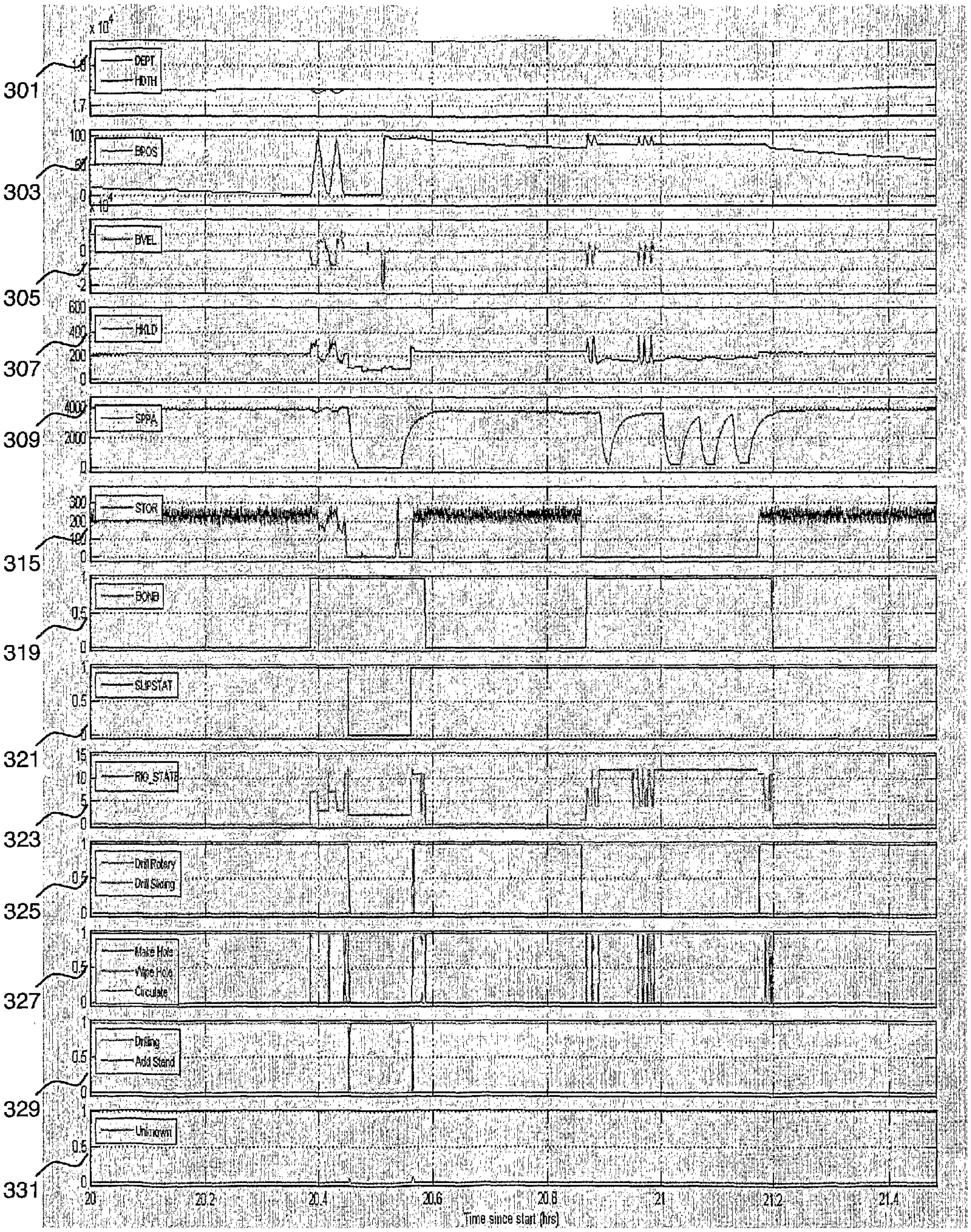

FIG. 2 shows further detail of processor 96, according to preferred embodiments of the invention. Processor 96 preferably consists of one or more central processing units 350, main memory 352, communications or I/O modules 354, graphics devices 356, a floating point accelerator 358, and mass storage such as tapes and discs 360. It should be noted that while processor 96 is illustrated as being part of the drill site apparatus, it may also be located, for example, in an exploration company data center or headquarters.

FIG. 3(*a*) is a screenshot of 11 data channels logged as part of a drilling operation and one data channel that is an interpretation of a subset of the 11 logged data channels. Channel 301 is a plot of the depth (DEPT) and horizontal depth (HDTH). Channel 303 is a plot of block position (BPOS). Channel 305 is a plot of block velocity (BVEL). Channel 307 is a plot of hook load (HKLD). Channel 309 is a plot of standpipe pressure (SPPA). Channel 311 is a plot of mud flow rate in (FLWI). Channel 313 is a plot of rotational speed (RPM). Channel 315 is a plot of surface torque (STOR). Channel 317 is a plot of rate of penetration (ROP). Channel 319 is a plot of a binary value that indicates whether the bit is on bottom (BONB), and channel 321 is a plot of a binary value indicating whether the rig is “in slips” (SLIPSTAT).

FIG. 3(*b*) is a zooming in on a small section along the time-index of the screen shot from FIG. 3(*a*) thereby spreading out the data to show greater detail.

As described in U.S. Pat. Nos. 6,868,920 and 7,128,167—which patents are commonly owned by the owner of the present application and are incorporated herein in their entirety by reference for all purposes, various sensor data, i.e., one or more of the data channels shown in FIG. 3, may be communicated via the communications modules 354 and may be interpreted to determine a rig state. The rig states, in one embodiment, may include the following states: DrillRot, DrillSlide, RihPumpRot, RihPump, Rih, PoohPumpRot, PoohPump, Pooh StaticPumpRot, StaticPump, Static, In slips, Unclassified. Where Rih=Run in Hole, Rot=Rotate, Pooh=Pull out of hole. These states correspond to a numerical value in the RIG channel that is also logged and depicted as channel 323 in FIG. 3.

Table I is a listing of RIG channel values and corresponding configurations:

TABLE I

RIG Channel Values and Configurations

| | | TRAITS | | | | |
|---|---|---|---|---|---|---|
| Integer Value | Rig State | Rotation | Pumping | Block | Bottom | Slips |
| 0 | Rotary Drill | On | On | Slow | On Bottom | Not Slips |
| 1 | Slide Drill | Off | On | Slow | On Bottom | Not Slips |
| 2 | In Slips | — | — | — | — | In Slips |
| 3 | Ream | On | On | Down | Off Bottom | Not Slips |
| 4 | Run In Pump | Off | On | Down | Off Bottom | Not Slips |
| 5 | Run In Rotate | On | Off | Down | Off Bottom | Not Slips |
| 6 | Run In | Off | Off | Down | Off Bottom | Not Slips |
| 7 | Back Ream | On | On | Up | Off Bottom | Not Slips |
| 8 | Pull Up Pump | Off | On | Up | Off Bottom | Not Slips |
| 9 | Pull Up Rotate | On | Off | Up | Off Bottom | Not Slips |
| 10 | Pull Up | Off | Off | Up | Off Bottom | Not Slips |
| 11 | Rotate Pump | On | On | Stop | Off Bottom | Not Slips |
| 12 | Pump | Off | On | Stop | Off Bottom | Not Slips |
| 13 | Rotate | On | Off | Stop | Off Bottom | Not Slips |
| 14 | Stationary | Off | Off | Stop | Off Bottom | Not Slips |
| 15 | Un-classified | — | — | — | — | — |
| 16 | Absent | — | — | — | — | — |
| 17 | Data Gap | — | — | — | — | — |

In addition to the physical traits such as Rotation etc., the grammar of Appendix A defines traits for datagap, classified, and absent. These traits reflect the presence or consistency of the data. For example, a configuration that is not compatible with any of the first 15 data values, would be unclassified. Where data is missing for one index value in the data, the data would be absent, and if no data is recorded (including no index value), the data would be a datagap. For Rig States 0 through 14, these traits all have the values classified, not absent, and not datagap. Conversely, rig states 15 through 17 correspond to the conditions resulting in those particular states, e.g., for 15 unclassified, the trait values are unclassified, not absent, and not datagap.

A configuration is a particular combination of traits. The Rig channel is an assignment of a value corresponding to values collected from sensors that indicate a combination of traits corresponding to particular drilling conditions and operations. For this example, the traits are Rotation, Pumping, Block, Bottom, and Slips; Rotation signifies whether the drill string is rotating or not; Pumping signifies whether drilling mud is being pumped; Block indicates the direction of the block, i.e., up, down, slow or no movement; and Slips is reflects whether the drill string is in slips or not. Thus, a configuration is a particular combination of these trait values. Of course, given five variables, some of which take on several different values, the universe of configurations is rather large. However, some combinations of traits may not make sense. These nonsensical combinations are delegated to the Unclassified configuration. Drilling data may be collected on particular time intervals. As such, in some embodiments of the present invention, if for any given time index, data is recorded as NIL, the Absent value is assigned to the RIG channel. Similarly, if no data is recorded at all, the Data Gap value is assigned to the RIG channel.

While in one embodiment the invention may be used to interpret activities that correspond to values of the RIG channel, in other embodiments, other data values may be interpreted, either as combinations of data channels forming configurations in a similar manner to that discussed above for the RIG channel or for single channel data sets.

FIG. 4 is a high-level schematic illustration of a RIG data interpretation software program 401, advantageously stored on a mass storage device 360 of the computer system 96 or on an interpretation computer system not located at the rig site but, for example, having a similar architecture as computer system 96, that is operable to further interpret the log data collected during a drilling operation. In one embodiment, described herein, the further interpretation operates to further interpret the collected data to determine the activities that occur or have occurred during a drilling operation by analyzing a time sequence of the RIG channel 323. In an alternative embodiment additional data channels are used for determining the activities that occur or have occurred during a drilling operation.

The drilling data interpretation program 401 may accept as input a drilling knowledge base 403 and drilling data 405. The drilling data 405 may be drilling log data, for example, as depicted in FIGS. 3(*a*) and 3(*b*), a subset of the drilling log data, or, for example, the RIG_STATE channel 323. The drilling knowledgebase 403 is described in further detail below. As is discussed herein below, in an alternative embodiment, the drilling data interpretation program 401 may be constructed from the drilling knowledge in the drilling knowledgebase 403. It may, in accordance with an embodiment of the present invention, then be reused for interpreting subsequent data sets without accessing the knowledgebase 403.

The output of the drilling data interpretation program may be some form of interpretation 407 of the drilling data 405, e.g., a report of the activities that are occurring or have occurred during a drilling operation. The interpretation output 407 may be an interpretation of the input data using the knowledge contained in the knowledge base 403.

Embodiments of the present invention described herein, may be used on a variety of data channels and provide a variety of interpretations. Herein, merely for purposes of example, the interpretations that are made from the Rig Status channel 323 include four separate channels as illustrated in FIGS. 3(*c*) and 3(*d*). FIGS. 3(*c*) and 3(*d*) contain, in addition to a subset of the channels illustrated in FIGS. 3(*a*) and 3(*b*), four interpretation channel graphs containing curves for several interpretation probability variables (in italics in the table below):

1. (Channel graph 325) Type of Drilling Operation, i.e., whether the rig is used for drilling rotary (drill rotary), drilling sliding (drill sliding), or neither
2. (Channel graph 327) Actively making hole (Make Hole), wiping the hole (Wipe Hole), or merely circulating mud by pumping (Circulate)
3. (Channel graph 329) Actively drilling (drilling), adding stand (Add Stand)
4. (Channel graph 331) Activity unknown (Unknown)

For each interpretation channel plot 325 through 331 there are logs for each of the interpretation probability variables. For example, considering graph 329, for most of the displayed section of Figure (c) the Drilling plot and the Add Stand plot behave essentially binary, e.g., there is a 1.0 probability of drilling at the same time as there is a 0.0 probability of adding stand. However, in the section near time-mark 23, the Add Stand plot indicates a probability of approximately 0.2-0.3 and, conversely, the Drilling plot indicates a probability of drilling of approximately 0.7-0.8. In other words, the plotted curves in graphs 325 through 331 indicate the probability of a particular activity.

Having described the input and the interpretation result, the methodology of interpreting the input data is now described, which methodology of interpretation may in some embodiments of the present invention take uncertainty into account and may produce the interpretation results.

Figure 5:
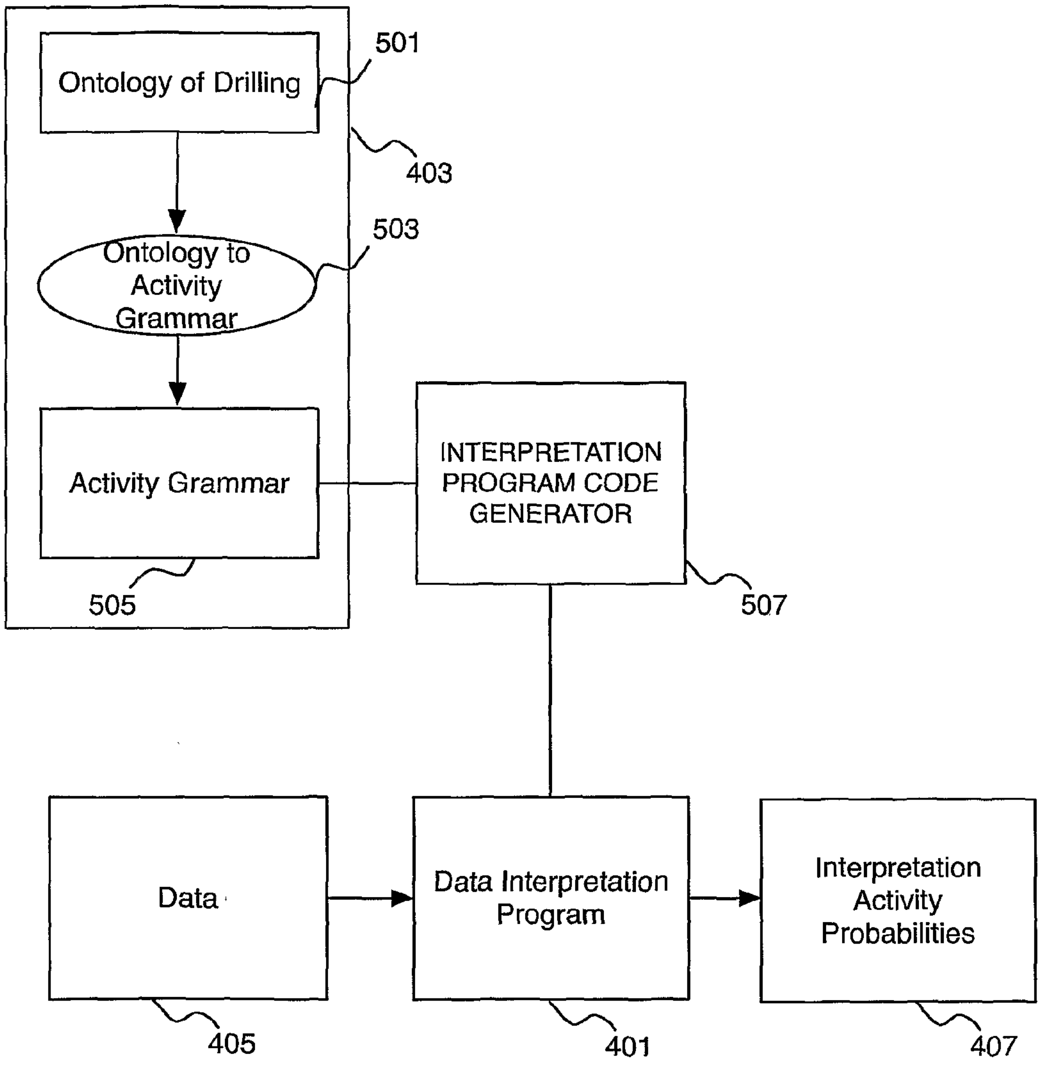
FIG. 5 is a schematic-type illustration illustrating use of drilling knowledge to interpret drilling data to produce an interpretation in greater detail than provided in FIG. 4, in accordance with an embodiment of the present invention.

FIG. 5 is a schematic illustration illustrating one embodiment of using drilling knowledge to interpret drilling data 405 to produce an interpretation 407. In the example of FIG. 5, the drilling knowledgebase 403 is used by an interpretation program code generator 507 to produce a data interpretation program 401.

The drilling knowledgebase 403 may be contained in a hierarchical structure 501 known as an ontology. A sample ontology is depicted and described in greater detail hereinbelow.

Figure 6:
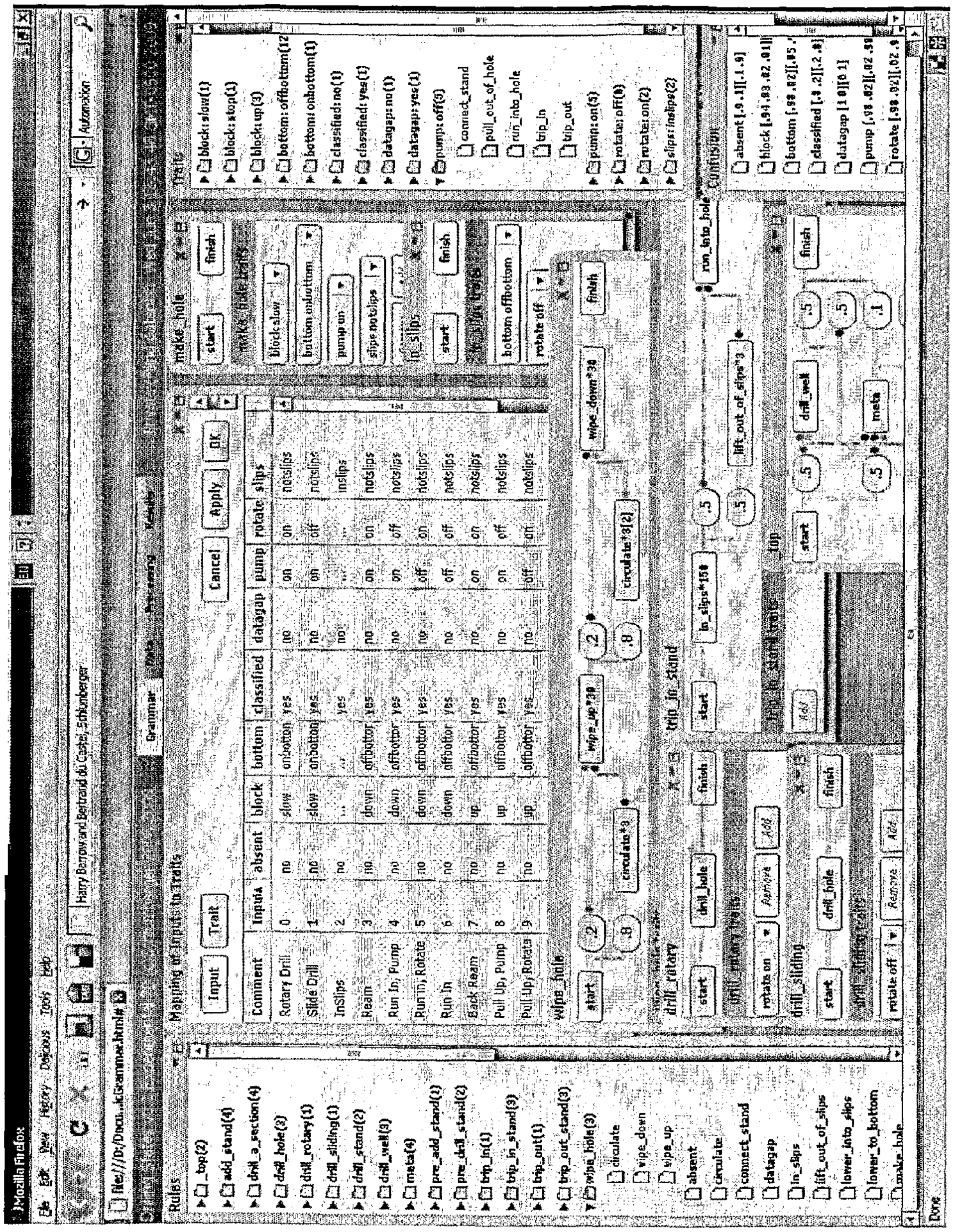
FIG. 6 is a screen dump of a portion of an ontology of drilling, in accordance with an embodiment of the present invention.

The ontology 501 may be input into an Ontology-to-Activity-Grammar program 503, the output of which is an activity grammar 505. In an alternative embodiment, the drilling knowledge is contained directly in an activity grammar 505. FIG. 6 is a screen dump of a portion of an ontology of drilling 501. A corresponding text version of the stochastic grammar ontology may be found in Appendix A—DRILLING STATES ONTOLOGY LISTING.

An Activity Grammar 505 contains, for example:

Activity descriptions for a number of activities wherein each activity is described as a start state, a finish state, and one or more subactivities performed during each activity. There may be any number of levels of subactivities, i.e., a subactivity may be further composed of other subactivities.

Transitional probabilities defining the probability of transitioning from one subactivity to another subactivity, from the start state to a particular subactivity, and from a subactivity to the finish state.

A number of leaf activities. A leaf activity is an activity that does not include any subactivities.

Configuration variables that define the configuration of an activity with respect to particular traits, which are values of particular observed conditions, e.g., whether the bit is on bottom, whether the mud circulating pump is on or not, whether block is moving, the direction it is moving, etc, wherein a configuration is a combination of trait values.

Specification of a top level activity, e.g., drill_well. The activity drill_well corresponds to a defined activity that is composed of several subactivities. drill_well is defined in the activity grammar at lines A-1471 through A-1555. Without meta information, drill_well. Would logically be the top level activity. However, in the actual implementation, for implementation reasons, the top level activity is a combination of drill_well activity and the meta activity defined at A-1760 through A-1818.

Each of these elements of the stochastic grammar 505 is described herein below.

Activity Descriptions

Figure 7:
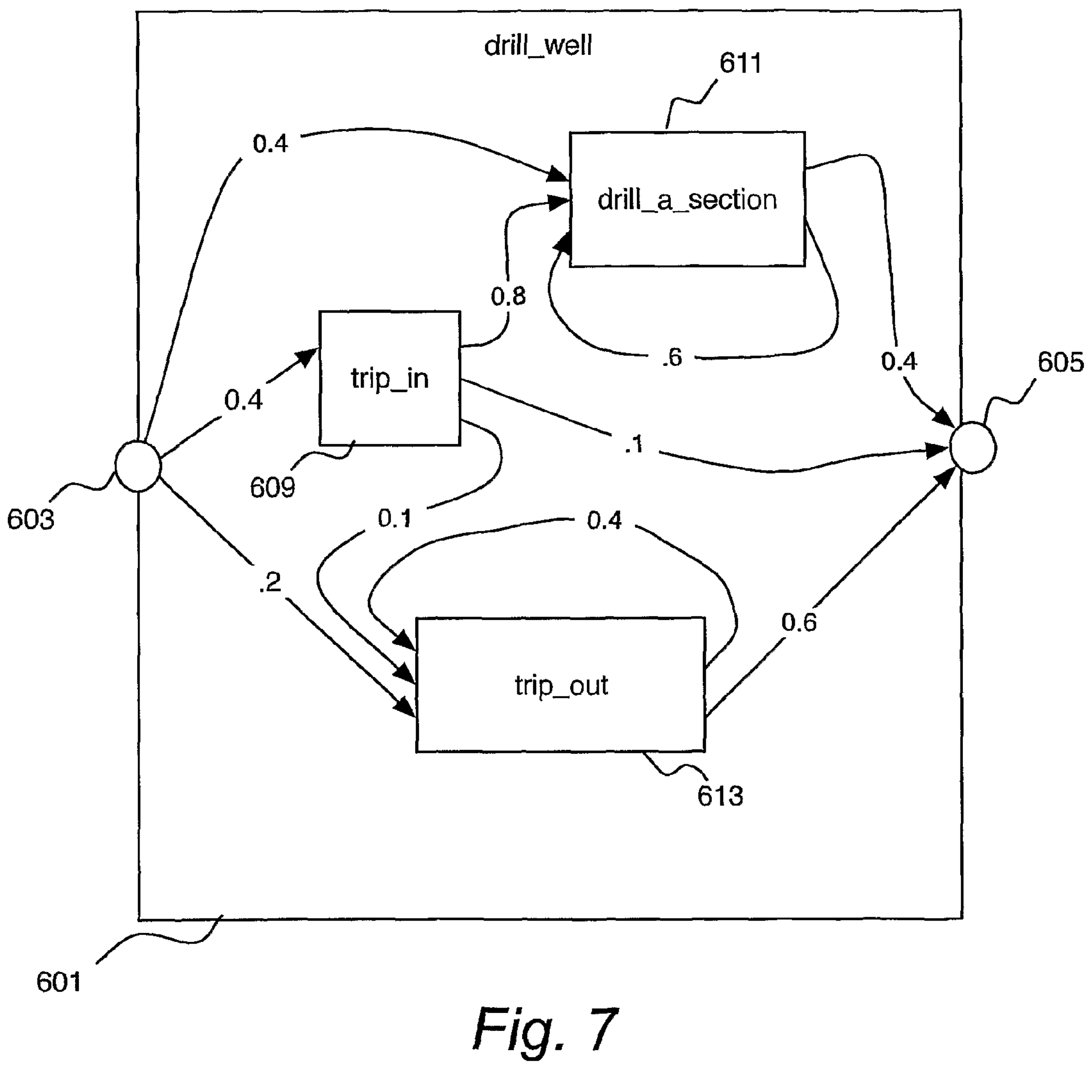
FIGS. 7 through 11 are schematic-type illustrations of activities in a drilling activity grammar as may be used in the interpretation methodology of FIG. 5, in accordance with an embodiment of the present invention.

FIG. 7 is a schematic illustration of the activity drill_well represented by stochastic finite state machine 601. In a sense activities as defined in the activity grammar are probabilistic finite state machines, i.e., finite state machines in which transitions from one state to another have assigned probabilities. In FIG. 7 the activity finite state machine (AFSM) 601 corresponds to the activity grammar code (Appendix A, Lines A-1471 through A-1555). The drill_well AFSM 601 has a start state 603 and a finish state 605. From the start state 603, there are transitions to each of three sub-activities, namely, drill_a_section 611, trip_in 609, and trip_out 613, with transition probabilities 0.4, 0.4, and 0.2. These transitions and transitional probabilities are defined in the code at Lines A-1473 through A-1479, A-1480 through A-1486, and A-1501 through A-1507.

Drilling a section is defined as a continuous drilling operation that is terminated by an activity that does not fit within the grammar definition for the drill_a_section activity 611, see below. Therefore, at the conclusion of drill_a_section 611, or a sequence of drill_a_section activities, the AFSM drill_well transitions to the finish state 605.

Figure 8:
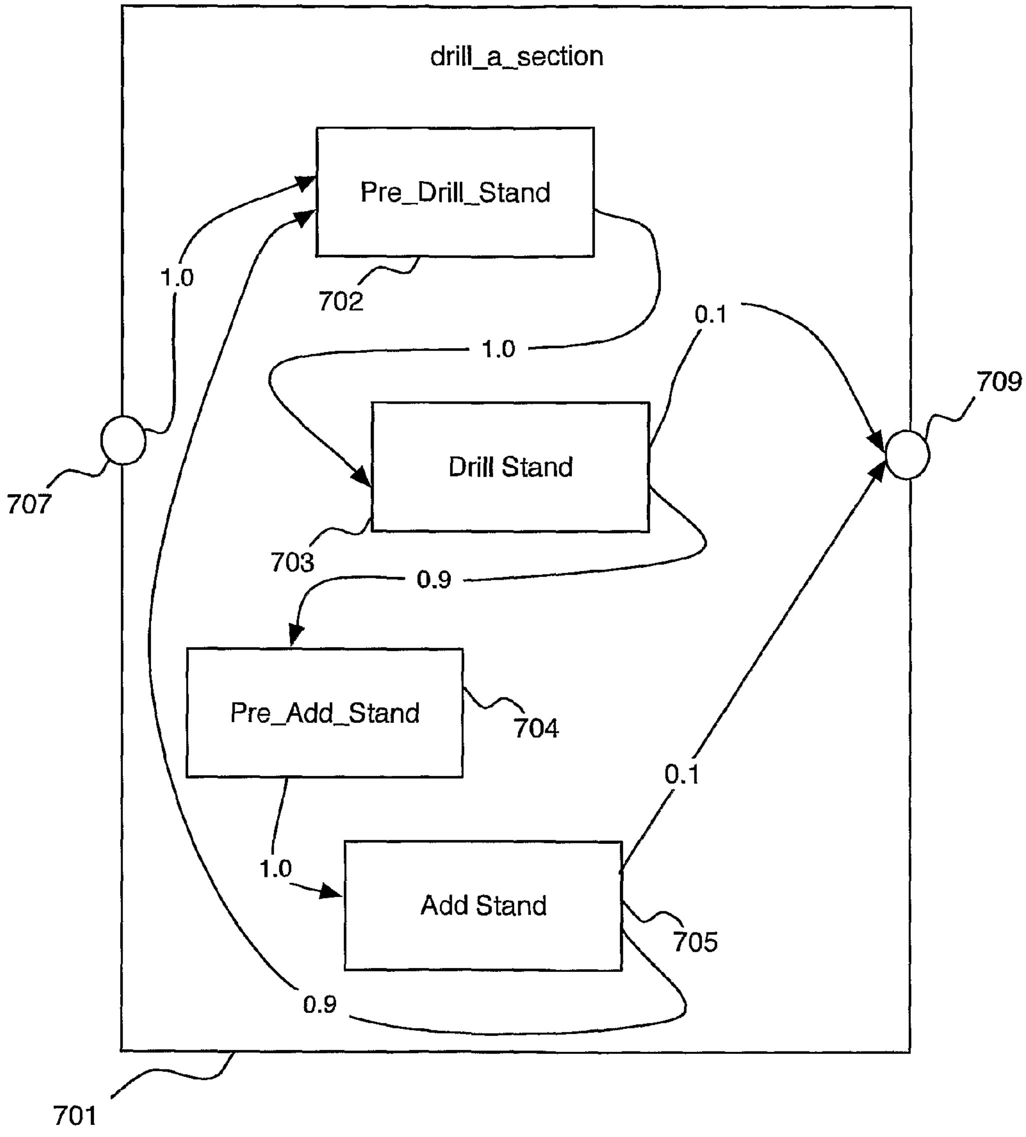

Now consider the activity drill_a_section (Lines A-1557 through A-1607) illustrated in FIG. 8. The activity drill_a_section has several component activities, also known as subactivities. The subactivities of an activity are states in the finite state machine corresponding to the activity. Thus, there is a one-to-one mapping between activities and states. The drill_a_section activity 701 is depicted graphically in FIG. 8. The drill_a_section 701 is composed of the subactivities: pre_drill_stand 702, drill_a_stand 703, pre_add_stand 704 and add_a_stand 705 (in addition to the start 707 and finish states 709).

Figure 9:
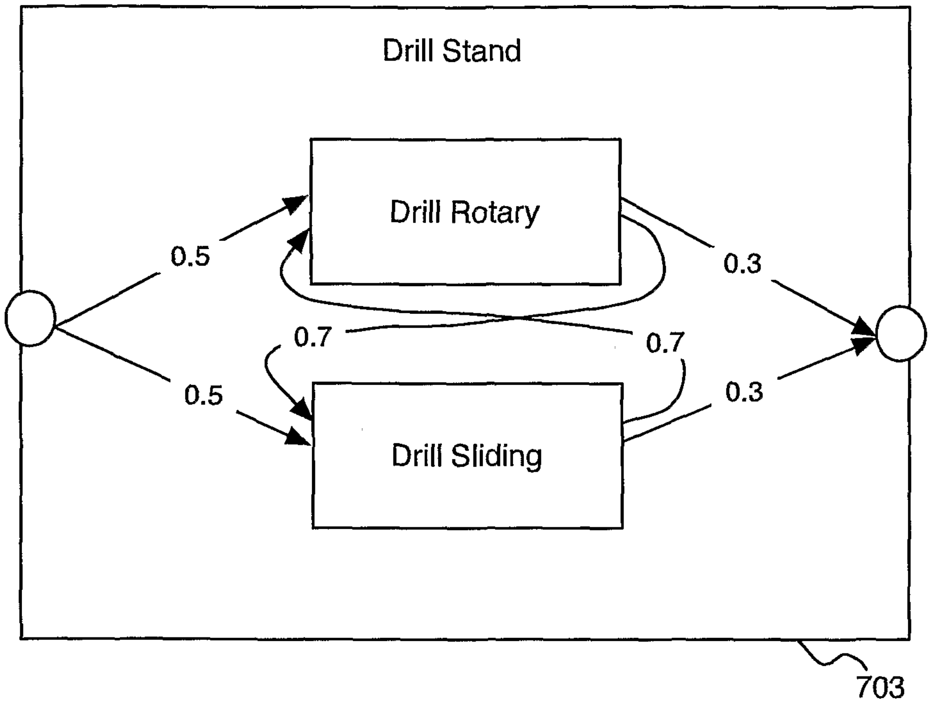

FIG. 9 is a schematic illustration of the drill_a_stand activity 703.

Figure 10:
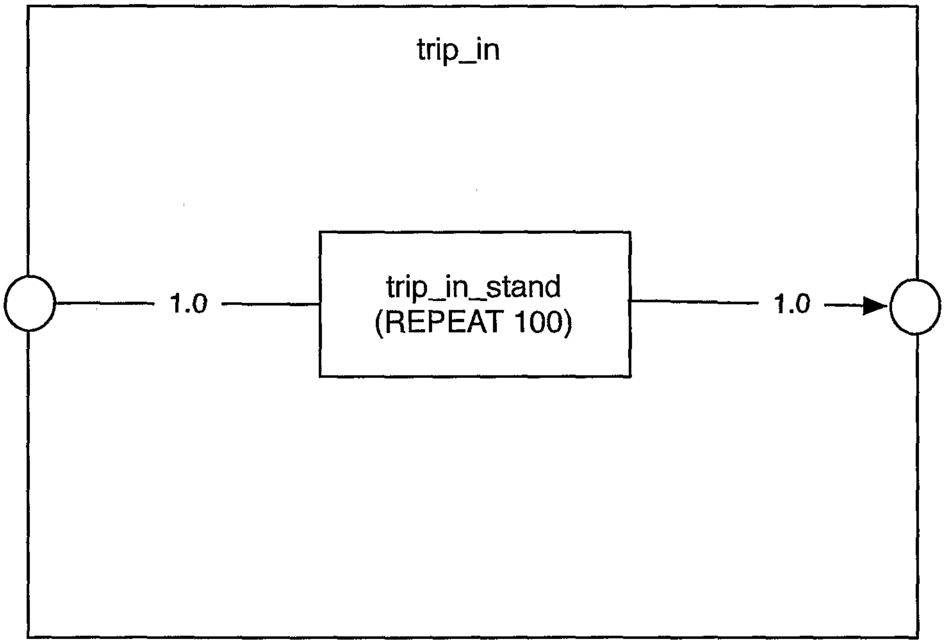

FIG. 10 is a schematic illustration of an activity with a repeating subactivity. The trip_in activity 711 includes one subactivity, the trip_in stand subactivity 713 which may repeat up to 100 times.

Figure 11:
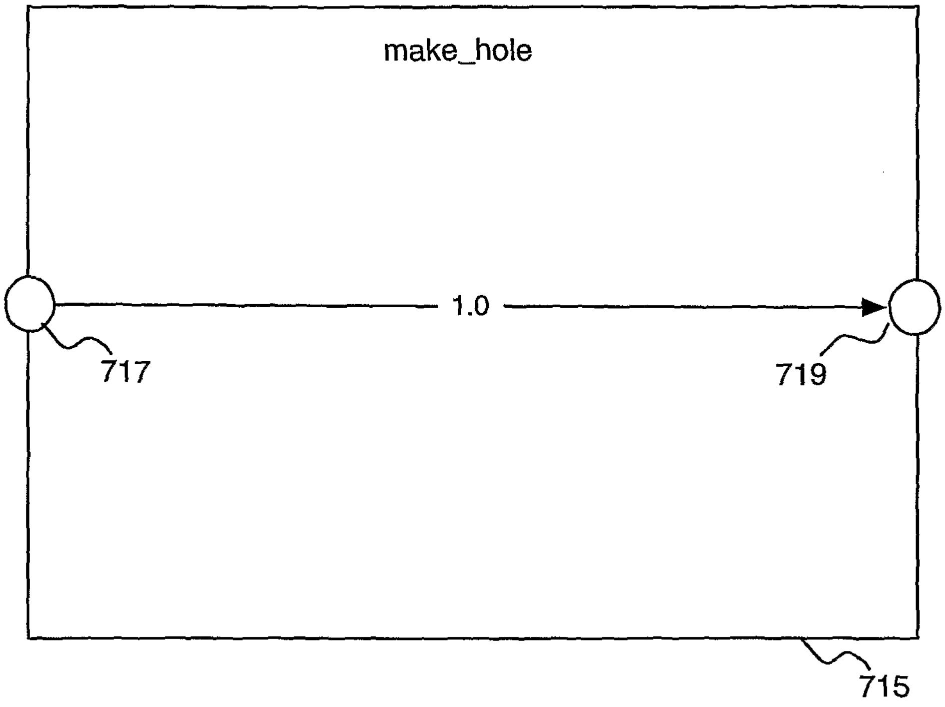

FIG. 11 is a schematic illustration of a leaf activity, namely, the make_hole activity 715. The make_hole activity is defined in Appendix A at lines A-1188 through A-1213. The make_hole activity has not subactivities and the only transition is directly from its start state 717 to its finish state 719. In the context of the finite state machine representation of stochastic grammar, leaf activities are referred to as leaf states.

The example of Appendix A defines the following leaf activities:

TABLE II

| Leaf Activities from the Example of Appendix A |
|---|
| lower_to_bottom |
| run_into_hole |
| lift_out_of_slips |
| circulate |
| wipe_up |
| wipe_down |
| lower_into_slips |
| make_hole |
| pull_out_of_hole |
| in_slips |
| connect_stand |
| unclassified |
| absent |
| datagap |
| unknown |

Transitional Probabilities

As noted above, each activity, other than leaf activities or bottom level activities, comprise one or more subactivities. The activity has specified transitional probabilities and a start and finish state. For example, the drill_well activity 601 defines transitions from trip_in 609 to trip_out 613 and drill_a_section 611. In the example of drill_well, the transitional probabilities from its start state 603 to drill_a_section is 0.4 and to trip_in 0.4. These probabilities represent probabilities that well drilling operation commences with drilling a section or tripping in, respectively. In some circumstances, drilling a well may start with a tripping out operation represented by a 0.2 probability transition from the start state to the trip_out subactivity 613.

As illustrated in FIGS. 7 through 10, activities correspond to finite state machines with transitions from the start state to the finish state through a sequence of subactivities. The activity grammar defines transitional probabilities for the transitions from the start state to these various subactivities, to one another, and to the finish state.

For example, lines A1473 through line A1542 define the transitional probabilities of the activity drill_well, corresponding to the transitional probabilities illustrated in FIG. 7 and discussed hereinabove.

Configuration Variables and Leaf Activities

The grammar has certain activities that do not have further subactivities; these are leaf activities. Associated with each leaf activity are values for certain traits. The traits may be defined in superactivities of the leaf activities and inherited by the leaf activities. A combination of trait values constitute a configuration that by definition have certain values when the leaf activity is being performed. The configuration variables, in a preferred embodiment, include pump, rotate (optionally), block, bottom, and slips.

Pump has the values on and off, and indicates whether the pump circulating drilling mud through the drillpipe is pumping (on) or not (off).

Rotate defines whether the drillstring is rotating or not.

Block indicates the movement of the block and has the values up, down, and stop (i.e., no movement).

Bottom indicates whether the bit is on the bottom of the borehole and has the values onbottom and offbottom.

Slips indicates whether the drillstring is inslips or notinslips.

Each leaf state is defined by particular values for each of the configuration variables. Configurations are particular combinations of trait values. For example, lines A1084 through A1109 defines that the activity circulate has the values pump=on, rotate=on, block=stop, bottom=offbottom, and slips=notslips. In other words, when the activity is circulate by definition the pump is pumping, the drill string is rotating, the block is not moving, the drillstring is off the bottom of the borehole and in slips.

In addition to the traits pump, rotate, block, bottom, and slips the ontology of Appendix A define several traits that are not directly associated with drilling operations, but rather with the data collected. These include classified, datagap and absent. Classified indicates that the trait combination recorded by the observed data translates to a datavalue in the RIG channel. I.e., if the combination of pump, rotate, block, bottom, and slips do not produce a RIG channel datavalue, the configuration is said to not be Classified. Datagap is used to signify a sequence of datapoints without recorded data. Absent indicates a missing data value.

Declaring configurations for the leaf activities specifies connections to the observations that lead to a conclusion that the drilling rig is operating according to that leaf activity. Thus, the system defines some configuration variables, namely pump, block, bottom, rotate and slips. These correspond to the data channels and correspond to the RIG STATE data channel. Furthermore, these define important variables that characterized into discrete cases, e.g., block is going down, pumping is off or on, we are either rotating or not, we are either on bottom or not on bottom, and in or not in slips. In an embodiment of the present invention, qualitative variables may be used that couple to the actual data. To decide whether the drilling process is pumping or not, in aspects of the present invention, a threshold above which it is deemed that the system is pumping is defined.

This threshold may be determined/analyzed/interpreted probabilistically. When looking at a measurement with a threshold, if far from the threshold there is a high certainty about the meaning of the data, e.g., high standpipe pressure above the determined pumping threshold means the probability of pumping in the system is high, whereas low pipe pressure data below the pumping threshold means that the probability is that the pumping in the system is off. Pumping data around the threshold means the probability of pumping or not pumping is about fifty-fifty. As the pipe pressure rises, the probability of pumping goes from zero, to fifty percent, to 100 percent.

The specific configuration variable values for each leaf state may be found in Appendix A, e.g., for make_hole, at A-1189 through A-1212, which defines that the configuration for make_hole is slips=notslips, pump=on, block=slow, bottom=onbottom; rotate is not specified.

Top-Level Activity

The grammar 505 defines a top level activity from which certain operations of the generation of the data interpretation program 501 may commence. For example, determination of transitional probabilities from one leaf-state to another leaf-state is performed by traversing the grammar. That traversal begins at the top-level activity.

In FIG. 5, the ontology 501 contains a data representation of uncertainty in drilling knowledge. Uncertainty in drilling knowledge includes uncertainties in the manner in which one would interpret a particular data condition. Consider, for example, a knowledge that driller is drilling a section of a well and that in so doing the driller is drilling a stand of drill pipe, there is an uncertainty as to whether the driller will at the conclusion of that operation drill another stand or will have finished drilling a the section of the well. Experience may have shown that 90% of the time after drilling a stand another stand is added and 10% of the time the drilling of the section has finished. The activity grammar 505 contains this type of probability knowledge about the flow of drilling operations.

Code Generator 507

In one embodiment of the present invention, the code generator 507 accepts as input the activity grammar 505 (e.g., as listed in Appendix A) and produces the Data Interpretation Program 401 that when executed may be used to interpret the input data 405 and produce an interpretation 407 of the data in terms of the activities of the grammar 505. A sample code generator 507 written in the Java programming language is listed in Appendix B. This sample code generator accepts as input the grammar 505 that is represented in listing form in Appendix A.

Figure 12:
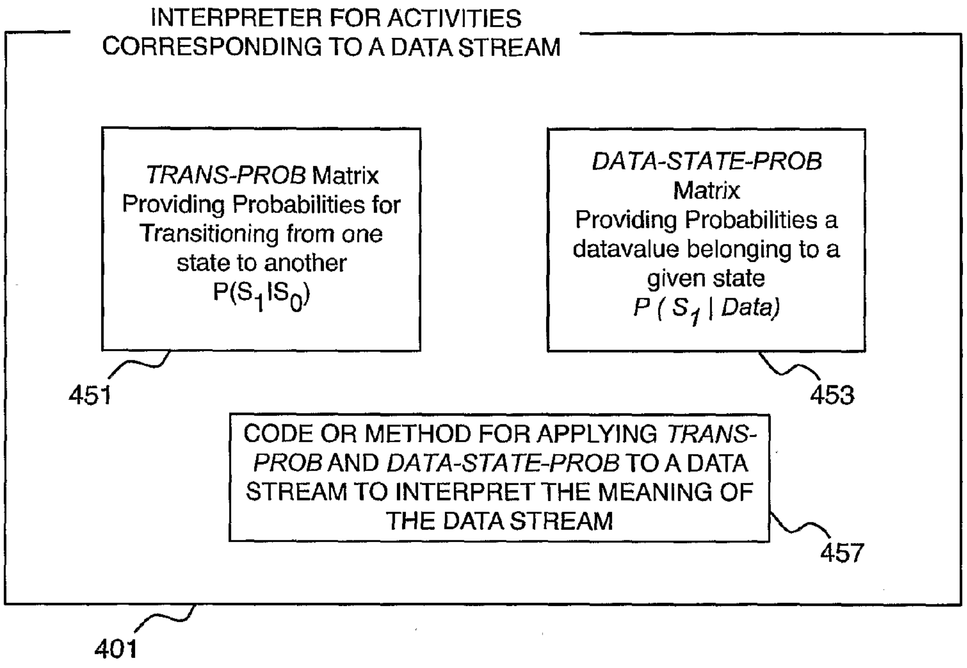
FIG. 12 is a block diagram illustrating the components of a data interpretation program generated by a data interpretation program generator, in accordance with an embodiment of the present invention.

FIG. 12 is a block diagram illustrating the components of the data interpretation program 401 generated by the data interpretation program generator 401. The data interpretation program 401 consists of three major components: a transition probability matrix (TRANS-PROB) 451 which is a matrix containing the probabilities of transitioning from one activity (i.e., one state) to another, a data-to-state probability matrix (DATA-STATE-PROB) 453 which is a matrix containing the probabilities that a given data value corresponds to each particular state, and the program code 455 that applies the TRANS-PROB matrix 451 and the DATA-STATE-PROB matrix 453 to compute an interpretation of the input data in terms of probabilities that the input data corresponds to particular activities defined in the knowledge base 403.

The mechanism for building the TRANS-PROB matrix 451 and the DATA-STATE-PROB matrix 453 is described herein below. Before discussing how the code generator 507 builds these matrices we describe the operation of the code 455 that applies these matrices to interpret input data, e.g., a RIG states channel.

Figure 13:
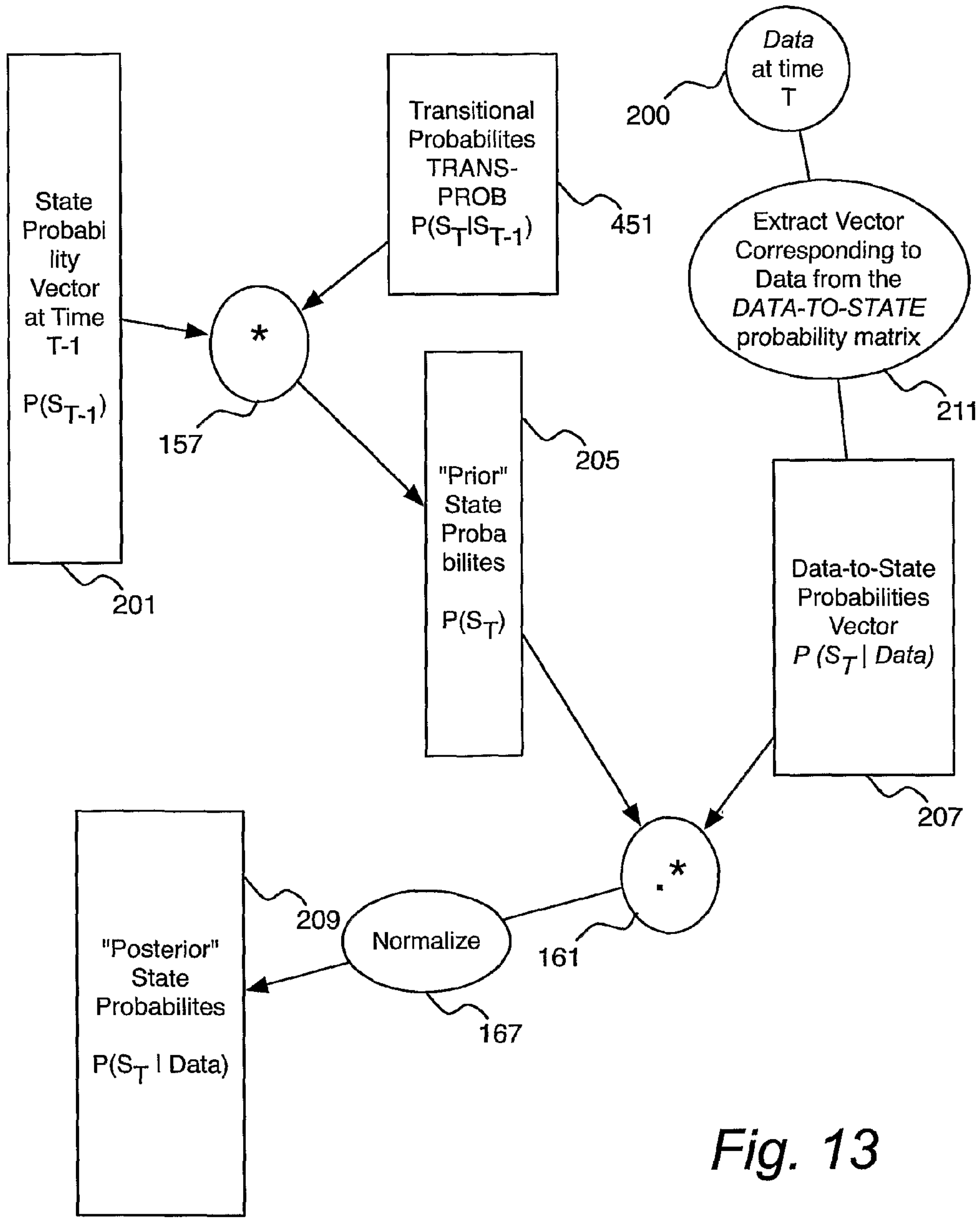
FIG. 13 is a block diagram illustrating the process of interpreting a time sequence of input data, to compute probability values for each leaf state and for each activity defined by the activity grammar, in accordance with an embodiment of the present invention.

FIG. 13 is a block diagram illustrating the process of interpreting a time sequence of input data, e.g., the RIG State channel 323, to compute probability values for each leaf state and for each activity defined by the activity grammar 505, in accordance with an embodiment of the present invention. FIG. 13 illustrates an example of the operation of code 455. In the illustrated embodiment, the input is the sequence to be interpreted, e.g., the RIG states channel data, and the grammar data structure, e.g., the grammar data structure 511.

Consider the interpretation of a data value Data at time T 200, and the probabilities of the various states at time T−1 201. The input state probabilities vector $P(S_{T-1})$ indicates the probability of each leaf activity is the leaf activity occurring at time T−1. Considering the example of Appendix A, there are fifteen leaf activities defined. The $P(S_{T-1})$ therefore has 15 elements, each indicating the probability that one of the leaf activities is occurring at T−1.

The $P(S_{T-1})$ is matrix-to-vector multiplied 157 with the TRANS-PROB matrix to determine the probability of each leaf state given the probabilities of transitioning from that leaf state to each other state, i.e., $P(S_T|S_{T-1})$. The construction of the TRANS-PROB matrix is described herein below.

The matrix-to-vector multiplication 157 produces a prior state probabilities vector $P(S_T)$ 205 in which each element represents the probability that the corresponding leaf state would occur given the state probability vector at T−1. As is discussed herein below, the TRANS-PROB is derived from the transitional probabilities in the grammar 505 and the grammar structure itself. Thus, $P(S_{T-1})$ 205 reflects only the transitional probabilities resulting from the grammar without taking the input data Data 200 into account. In Bayesian inference, a prior probability distribution, often called simply the prior, is a probability distribution representing knowledge or belief about an unknown quantity a priori, that is, before any data have been observed P(A).

The prior probability vector $P(S_T)$ 205 is adjusted by the probabilities that the data reflects each particular leaf activity $P(S_T|\text{Data})$ 207. That task is performed by extracting 211 the vector of probability values corresponding to the Data value 200 in the DATA-STATE-PROB matrix 453. The DATA-STATE-PROB matrix 453 contains the probability value of each leaf activity given a particular data value. The computation of the DATA-STATE-PROB matrix 453 is provided herein below.

The prior probability vector $P(S_T)$ 205 is adjusted by the probabilities that the data reflects each particular leaf activity $P(S_T|\text{Data})$ 207 by an element-by-element multiplication 161 of each element in the prior probability vector $P(S_T)$ 205 by the corresponding element in the data-to-state probability vector $P(S_T|\text{Data})$ 207 and normalizing 167 the result thereby obtaining the posterior state probabilities at time T $P(S_T|\text{Data})$ 209. Thus, the posterior state probabilities at time T $P(S_T|\text{Data})$ 209 take into account both the stochastic grammar 505 and the data values from the data channel.

Figure 14:
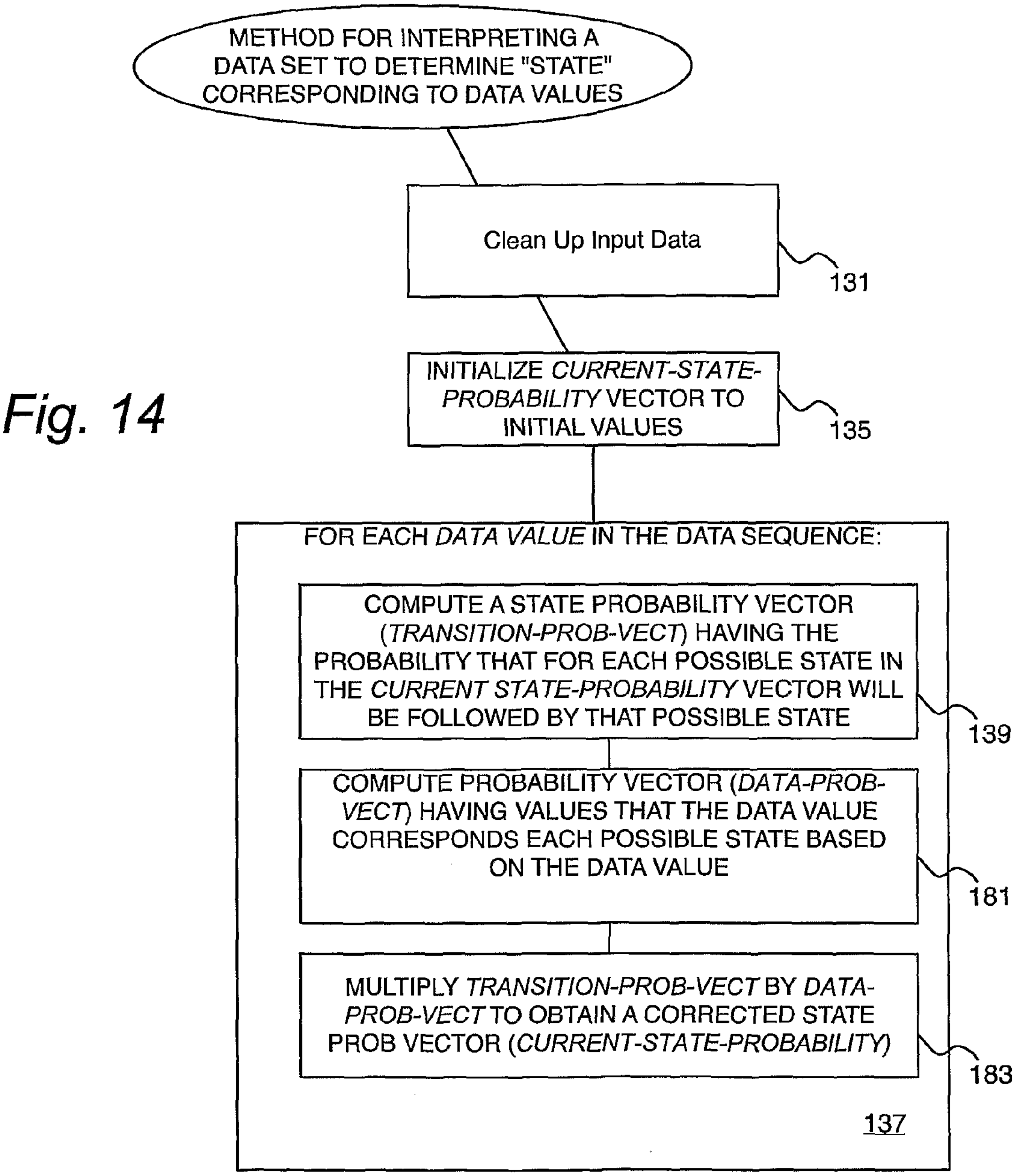
FIG. 14 is a block diagram illustrating exemplary pseudo code implementing the process illustrated and discussed in conjunction with FIG. 13, in accordance with an embodiment of the present invention.

FIG. 14 is a block diagram illustrating exemplary pseudo code implementing the process illustrated and discussed in conjunction with FIG. 13. A first step may be to clean up the input data, step 131. The data may be cleaned up to provide for missing data, to remove spikes indicative of nonsense/non-probabilistically relevant data and/or the like. In certain aspects, the nonsense/non-probabilistically relevant data may be treated as missing data. In an embodiment of the present invention, the program may interpolate for missing data values.

The pseudo code of FIG. 14 operates to take a current state probability vector (computed at T−1) as an input for the processing of each data value in the data sequence at time T and from it, together with the data value, compute a new current state probability vector reflecting the data value at time T−1. For each iteration; the current state vector from the previous iteration (each iteration reflecting the processing of a data value in the sequence of data values) is updated. Thus, a first step may be to initialize the array holding the current state vector (CURRENT-STATE-VECTOR), step 135. The initialization may be to give each state the same probability, e.g., if there are 14 different possible states, each state would be given the probability of $1/14=0.0714$. An alternative approach is to use a statistical distribution of states from historical data as the basis for the initial probability distribution.

Figure 15:
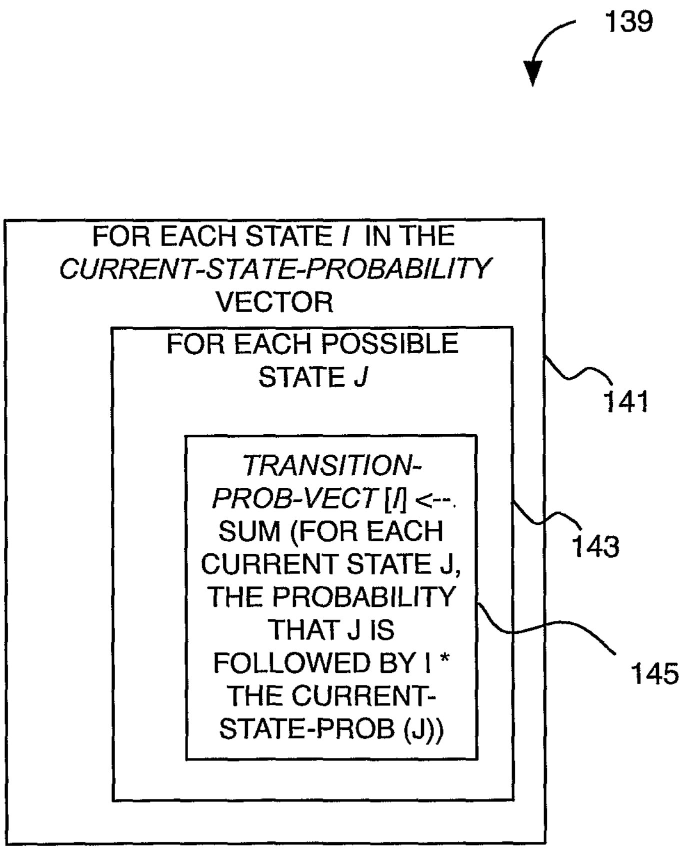
FIG. 15 is a block diagram illustrating code for computing the current state probability vector, in accordance with an embodiment of the present invention.

Next, the pseudo code includes a loop iterating over the sequence of data samples to be processed, loop 137, to update the CURRENT-STATE-VECTOR. First, the state probability vector (TRANSITION-PROB-VECT) is computed, step 139. Step 139 is fleshed out in greater detail in FIG. 15. As discussed in conjunction with FIG. 13, step 157, step 139 is a vector-matrix multiplication operation between the CURRENT-STATE-VECTOR and TRANS-PROB matrix. For each state i in the CURRENT-STATE-VECTOR (i.e., at T−1), outer loop 141, the sum of the probability that a each possible state j is followed by the state i is calculated using an inner loop 143 that is an iteration over the possible states j by looking up the probability value that the state j is followed by the state i in the TRANS-PROB matrix, step 145. The computed vector TRANSITION-PROB-VECT is the “Prior” States Probabilities 205 of FIG. 13.

Returning to FIG. 14. The processing of a data value in the sequence being processed also includes the computation of the probability vector having values that the Data value at time T corresponds to each possible activity based on the data on the data value, i.e., the Data-to-State Probabilities vector 207 of FIG. 13, step 181 corresponding to operation 211 of FIG. 13. This computation may be a look up operation in the DATA-TO-STATE probability matrix to determine for each possible state the probability that the Data value corresponds to that state.

It should be noted that steps 139 and 181 are independent of one another and may be computed in parallel or in any sequence.

The prior probabilities (TRANSITION-PROB-VECT) 205 are combined with the Data-to-State Probabilities vector 207 by multiplying each value in the prior probabilities vector to the corresponding value in the Data-to-State Probabilities vector, step 183.

In an embodiment of the present invention, having computed the Leaf State v. Rig State probability matrix, step 153, the interpretation/parse program loops over the sequence of data samples in the input data 405, loop 155 may be determined. For each sample in the data channel, time-step by time-step, the interpretation/parse program may be performed (this process is illustrated in FIG. 14).

At the beginning of each sample, there is a probability of being in each state from the previous sample (the initial condition being either that the rig is in the unknown state, or that the probability is equal for all states, step 154). In FIG. 14 these state probabilities are contained in a state probability vector 201. In an embodiment of the present invention, the transitional probability matrix 203 may be applied to all these state probabilities, step 157. This is a matrix multiplication operation. The application of the state transitional probabilities produces a prior state probability vector 205 (“prior” in the sense that it is computed solely from the previous state probability vector 201 and the transitional probability matrix 203).

Figure 16:
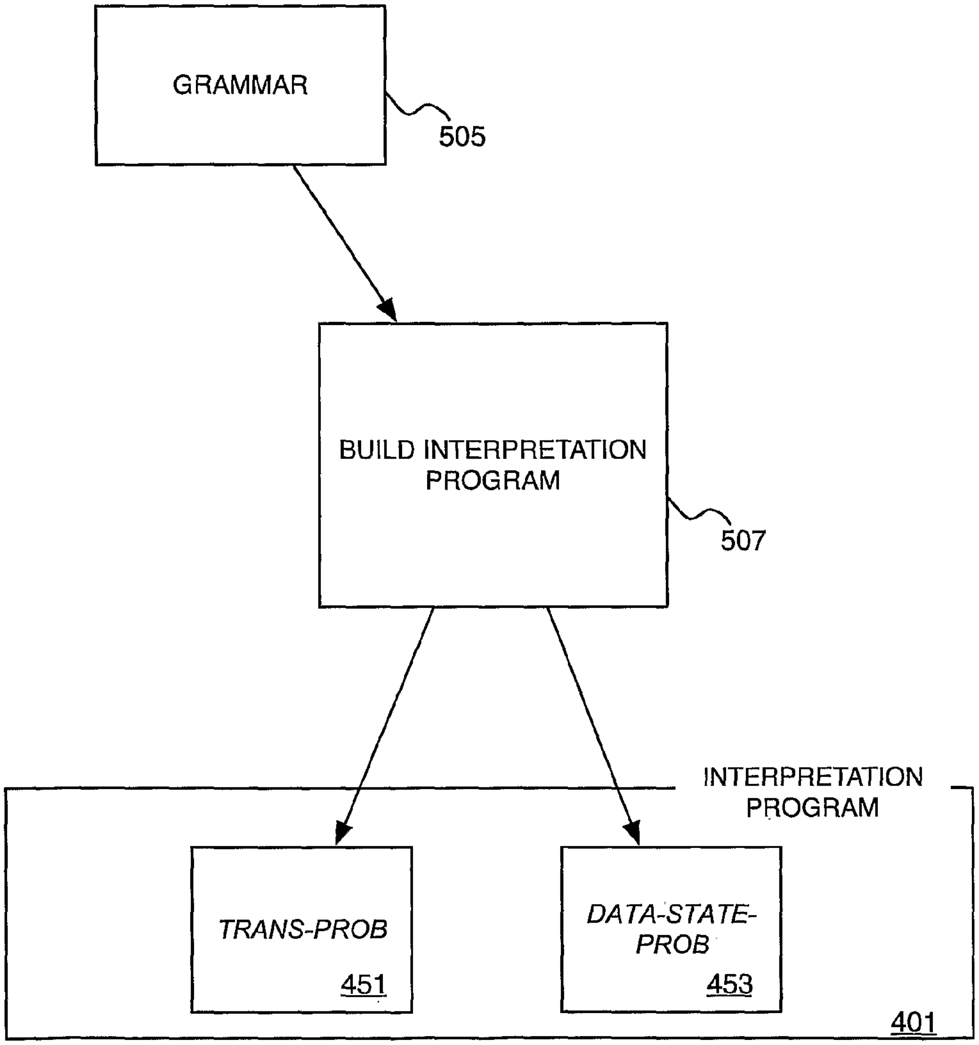
FIG. 16 is a block diagram illustrating a relationship between the stochastic grammar described in FIG. 5, the interpretation program code generator describe in FIG. 5, and the TRANS-PROB matrix and the DATA-STATE-PROB matrix of the data interpretation program, in accordance with an embodiment of the present invention.

The details of the Interpretation Program Code Generator 507 are now described. As noted above, the Interpretation Program 401 contains the TRANS-PROB matrix 451 and DATA-STATE-PROB matrix 453. The Interpretation Program Code Generator 507 produces these two matrices from the grammar 505 as is illustrated in FIG. 16.

The following pseudo code describes the process of creating the TRANS-PROB matrix 451:

TABLE III

Pseudo Code describing how to build the TRANS-PROB matrix

```
Build TRANS_PROB matrix
{
    Determine_Leaf_Nodes (START) {Determine Leaf Nodes of the
    grammar starting with START (see below)}
    Build Trans-Prob Matrix from leaf_nodes {rows = {START,
    leaf_nodes}; columns {leaf_nodes, FINISH}}
    Traverse_to_collect_probabilities by following paths from each
    leaf-node to each other leaf-node
}
```

Figures 17, 18:
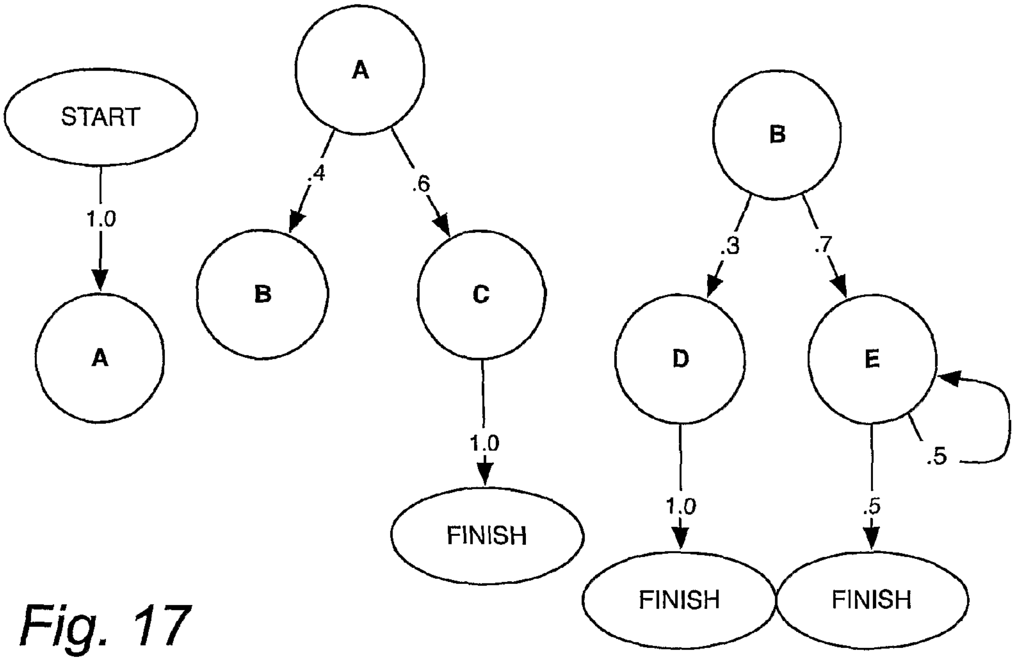
FIG. 17 depicts a grammar that may be relied upon herein to provide an illustrative example of the process for generating the TRANS-PROB matrix.
FIG. 18 is an example of a TRANS-PROB matrix corresponding to the grammar of FIG. 17.

The first step is to determine the leaf nodes. As discussed herein above, the leaf nodes are those nodes that have no subactivity states. The matrix may thus merely be traversed until a node has no transition out. FIG. 17 is a very simple grammar used as an example to illustrate (this grammar is used herein below to illustrate the operation of the system and method for interpreting drilling data using a stochastic grammar. Beginning at the START state, the grammar is traversed collecting the nodes that have no path other than to finish. Thus, there is a path A-B-D and D to Finish. Therefore one leaf node is the A-B-D node, representing the transitions from Start to Finish via the nodes A, B, and D. Similarly, further traversal of the grammar structure of FIG. 17 determines that nodes A-C and A-B-E are leaf nodes.

Next, the TRANS-PROB matrix is constructed to have a row and column for each leaf state, an additional row for the START state, and an additional column for the FINISH state. Such a TRANS-PROB matrix 231 that corresponds to the grammar of FIG. 17 is illustrated in FIG. 18.

Next, the TRANS-PROB matrix 231 is populated by traversing the grammar following the transitions from START to leaf-states and multiplying together the transition probabilities. In the example, the path from START to A-C to FINISH has the transitions Start→A with a probability 1.0, A→C with a probability 0.6, and C→FINISH with a probability 1.0. Thus, the START to A-C state-to-state transition probability is 1.0*0.6*1.0=0.6. Similarly, from START to A-B-D to FINISH has the transition probabilities 1.0, 0.4, 0.3, and 1.0 for a state-to-state transition probability of 0.12, and so on. Of note is the transition back from node A-B-E onto itself with a 0.5 probability. In the traversal of the grammar to determine the transitional probabilities from one node to another, if a transition causes a visit to a node that has previously been visited in the determination from that one node to that another node, the traversal stops and the product of the transitional probabilities encountered along the path is noted. In this particular example, there is only the transition from A-B-E onto itself with a transitional probability of 0.5. A complete leaf-state-to-leaf-state traversal that multiplies all the transitional probabilities in the path from each leaf-state that can reach each other leaf-state results in the TRANS-PROB matrix, e.g., for the grammar example of FIG. 17, into the matrix 231 of FIG. 18.

The process for building the interpretation program 401, e.g., the interpretation program code generator 507, also computes the DATA-STATE-PROB probability matrix 453. The following pseudo code describes, one possible process of creating the DATA-STATE-PROB probability matrix 453:

TABLE IV

Pseudo Code describing how to build the DATA-STATE-PROB matrix without taking confusion into account

```
Build Data-to-state matrix NOT taking confusion into account
1     {
2
3     for each state
4     {
5          determine the configurations compatible with that state (state-compatible-
configurations) and number of state compatible configuration (state-compatible-
configurations-count); /* i.e., if a state is defined by config 11--, the compatible
configurations are 1100, 1101, 1110, and 1111. Thus there are 4 compatible configurations */
6          state-per-configuration-probability := 1 / state-compatible-configurations-
           count;
7          for each state-compatible-configuration
8          {
9               for each data-value
10              {
11                        if the data value is compatible with the state-compatible-
                configuration then
12                   {
13                             note the data value as compatible (e.g., set a bit
                    corresponding to that datavalue and configuration;
14                             increment count of data value-configuration
                    pairing as compatible for this state (data-value-compatible-
                    count);
15                   } /* end if data value is compatible
16               } /* end for each data value */
17               for each compatible-datavalue
18               {
19                        DATA-STATE-PROB [compatible-datavalue,state] :=
                 DATA-STATE-PROB [compatible-datavalue,state] + state-per-
                 configuration-probability DIVIDED BY data-value-compatible-
                 count;
20               } /* end for each compatible datavalue */
21          }/* end for each state-compatible-configuration */
22    }      /* end for each state */
23    normalize each datavalue row;
25         }
```

The process iterates over the leaf-states defined in the grammar. In the present example, the leaf states are A, B, C, and D.

Figure 19:
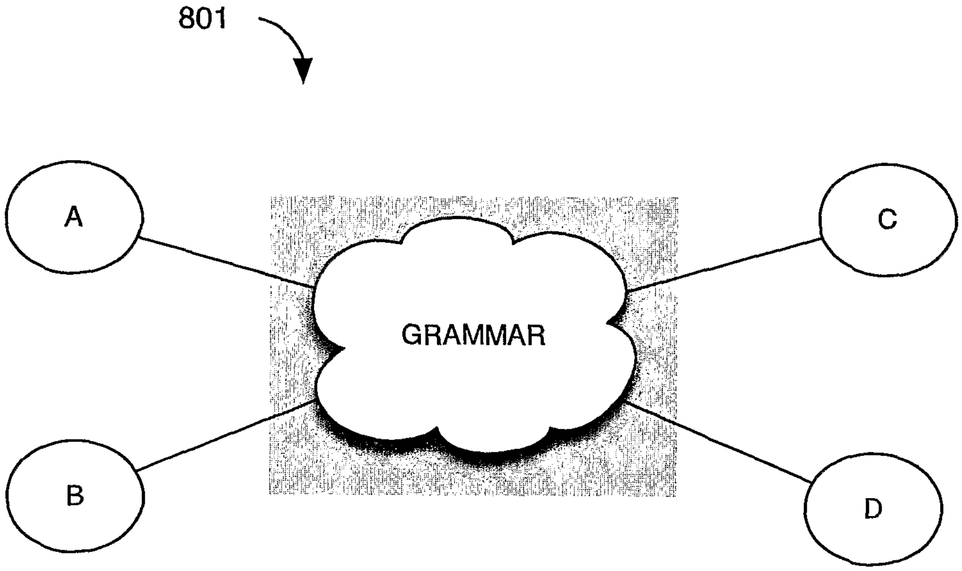
FIG. 19 is an abstraction of a grammar showing four leaf states without providing specific grammar rules for transitioning between these four leaf states. This abstraction is provided for illustrative purposes.

For each state, first there is a determination of which states are compatible with particular data values based on common traits, Loop Lines 3 through 22. FIGS. 19 and 20 illustrate the operation of matching compatible states and traits. Consider a very simple grammar 801 of FIG. 19. The grammar 801 has four leaf states: A, B, C, and D. The transitions defined by the grammar 801 are not specified. However, let's stipulate that the grammar defines four traits: TRAIT1, TRAIT2, TRAIT3, and TRAIT4. The values for the configurations of these traits for the four states are given in the TRAITS-TO-STATE table of FIG. 20. Note that similar configurations are given for the leaf-states defined in the grammar of Appendix A. For illustrative purposes, the traits in FIG. 19 are binary. Thus, for each trait, a configuration corresponding to a particular state may have the value undefined (–), 1, or 0. For State A, the configuration is - -1 0, etc. Thus, since the undefined (–) values may take any value, the compatible configurations for state A are 0010, 0110, 1010, and 1110. FIG. 21 illustrates the compatible configurations for the states in the present example.

Similarly, configurations, i.e., combination of trait values are assigned to the various data values. For example, in the example of Appendix A, the token Run_In (Appendix A, Lines A269 through A304), corresponding to the RIG channel value 6, has the defined configuration classified=yes, absent=no, rotate=off, block=down, bottom=offbottom, pump=off, slips=notslips, and datagap=np. All other possible data values also have defined configurations.

In the simplified example presented here, there are six data values provided, 1 through 6. FIG. 22 provides a table of the configurations corresponding to these six data values. For example, data value 1 has the configuration 0 0- - .

These configurations may also be expanded into compatible configurations like the configurations corresponding to the various leaf states. FIG. 23 is a table of the compatible configurations corresponding to the defined configurations of FIG. 22.

The compatible are referred to in the pseudo code of Table IV as state-compatible-configurations and the count of such configurations, as state-compatible-configurations-count.

Having determined the compatible configurations, the process assigns the total probability for the state over those compatible configurations by simply taking the inverse of the state-compatible-configurations-count, Line 6.

The process iterates over all the state-compatible-configurations for the state of the current outer loop iteration, Loop starting Line 7 and ending Line 21 to determine the data values (innermost nested loop: Lines 9 through 16) that have a configuration that matches the compatible configurations. For any data value that is compatible with the state configuration (If statement Line 11), the data value is noted as compatible (Line 13) and a count of compatible data value-to-state-configuration pairings is incremented (Line 14). FIG. 24 is an illustration of the notation of compatible configurations for each state. Note that the configurations for each state are numbered sequentially and that each element in the matrix of FIG. 24 is a sequence of flags that reflect whether the particular corresponding configuration of the state is compatible with the configuration of the data value. For example, because the configuration of state A is - -10 and has compatible configurations 0010, 0110, 1010, 1111 and data value 1 has the configuration 00- - with the compatible configurations 0000, 0001, 0010, 0011, the first compatible configuration of state A is the only compatible configuration that is compatible with the configurations of Data value 1.

After the conclusion of the loop over compatible configurations, the process knows which datavalues are compatible with the state (e.g., have been noted as compatible) and how many such compatible states there are, data-value-compatible-count. That information is used to populate the DATA-STATE-PROB matrix 453. For each data value that is noted as compatible, the DATA-STATE-PROB [datavalue, state] matrix element is set to number of compatible configurations for that data value, state combination divided by the total number of compatible configurations for the state, Lines 17-21. FIG. 25 is an illustration of the result of the loop of Lines 17-21. Consider, for example, the column for State B. For data value 2, there are 4 compatible configurations, for each of data values 3 through 6 there are 2 compatible configurations. Thus, for the entire column there are a total of 12 matches of compatible configurations. Dividing the matching configurations for each data value with the total number of matching configurations results in the values 1/3, 1/6, 1/6, 1/6, and 1/6 for rows corresponding to data values 2 through 6.

Finally, the DATA-STATE-PROB matrix is normalized along the rows, Line 23. FIG. 26 is an illustration of the resulting matrix following the normalization operation.

The example grammar 801 of FIG. 19 does not provide specific transition rules. For the purpose of illustrating the operation of the data interpretation program, let's consider an example TRANS-PROB matrix with arbitrarily selected probability numbers. FIG. 27 provides such an example that will be used herein below for the purposes of illustrating the operation of the interpretation program 401.

FIG. 28 is an illustration of the results of the operation of the interpretation program 401 using the process described in conjunction with FIGS. 13 though 15 and the TRANS-PROB matrix of FIG. 27 and the DATA-STATE-PROB matrix of FIG. 26. Row 803 represents a sequence of data values. Column 805 is an initial value for the CURRENT-STATE-PROBABILITY VECTOR; or it may be viewed as an interim vector in the processing of some larger sequence that is immediately followed by the vector 803.

Table 205' is the prior probabilities. Thus, the first column are the prior probabilities obtained from a vector-to-matrix multiplication of the initial vector 805 and the TRANS-PROB matrix of FIG. 27 as discussed in conjunction with elements 157 of FIG. 13, 139 of FIGS. 14 and 15. Table 207' contains the Data-to-State vectors corresponding to the respective data values in the input data sequence 803. For example, the first, third, and sixth data values are the value 5. The value 5 has the data-to-state vector [0, 0.3, 0.1, 0.3, 0.1, 0]. Thus, that vector is recorded in columns 1, 3, and 6 of table 207'. Having the vectors 205 and 209, corresponding to a data value, these are element-by-element multiplied (operation 161) and normalized (operation 167) to produce the vector corresponding to the same data value in the output table 209'.

While the present example discussed herein above relies on a very simplified grammar, the same techniques may be used for a more complex grammar 505. Appendix A illustrates such a grammar. Appendix B is an example Java program implementation of an interpretation program code generator 507 operating on, for example, the activity grammar 505 that has been extracted into the representation of Appendix A.

It is entirely possible that a recorded data value is inaccurate. Consider an unrelated example. Consider two drivers following one another. The trailing driver wishes to use the turn signal of the car in front to determine the actions of the first driver. Usually the turn signal coming on is a good predictor of the intent of the driver to turn. However, a missing turn signal may only mean that the light is out. Even a blinking turn signal may not indicate that the driver intends to turn. The blinking turn signal could be indicative of a faulty circuit or that the driver mistakenly engaged the turn signal (or that the eyes of the person in the trailing car is hallucinating). Thus, there is some confusion about what the observed data really means.

The same phenomena may occur in a drilling operation. For example, a RIG state indicative of the rig being in slips usually would mean that the rig is indeed in slips. However, it could also mean that there was an error in recording the rig as being in slips. Such errors may occur, for example, by sensors failing, sensor calibration being off, or some anomalous condition that caused a sensor to operate erratically.

An embodiment of the present invention accounts for such uncertainties, also known as confusion, by recording the confusion as to the meaning of a trait value in a confusion matrix mapping recorded values to actual values according to the probability that the recorded value accurately reflects the actual value. FIG. 29 illustrates some confusion matrices that could correspond to the example given herein above. The first trait confusion matrix 901, for example, corresponds to the Trait #1 and indicates that a recorded value of ON is 0.98 indicative of the actual value being ON and 0.02 indicative of the actual value being OFF. Similarly of the other traits. Note that the third and fourth confusion matrices 903 and 905 indicate that there is no confusion as to these values.

It is valuable to note that the confusion matrices are not necessarily symmetrical. The example, with the turn signal would probably yield a similar dissymmetry, i.e., it is more likely that the turn signal being on means an imminent turn than that the turn signal being off means that no turn will be made.

The following pseudo code describes the process of creating the DATA-STATE-PROB matrix 453 using the Confusion Matrices:

TABLE V

Pseudo Code describing how to build the DATA-STATE-PROB matrix using confusion matrices

```
Build Data-to-state matrix taking confusion into account
{

for each state
{
    determine the configurations compatible with that state (state-compatible-
    configurations) and number of state compatible configuration (state-
    compatible-configurations-count); /* i.e., if a state is defined by config 11--,
```

TABLE V-continued

Pseudo Code describing how to build the DATA-STATE-PROB matrix using confusion matrices

```
        the compatible configurations are 1100, 1101, 1110, and 1111. Thus there are
        4 compatible configurations */
6       state-per-configuration-probability := 1 / state-compatible-configurations-
        count;
7       for each state-compatible-configuration
8       {
9           for each data-value in the list of data-values
10          {
11                  if the data value is compatible with the state-compatible-
            configuration then
12              {
13                      note the data value as compatible (e.g., set a bit
              corresponding to that datavalue and configuration;
14                      increment count of data value-configuration
              pairing as compatible for this state (data-value-compatible-
              count);
15              } /* end if data value is compatible
16          }; /* end for each data value */
17          if the state-compatible-configuration does NOT have confusion
18              for each compatible-datavalue
19                      DATA-STATE-PROB [compatible-
              datavalue,state] := DATA-STATE-PROB [compatible-
              datavalue,state] + state-per-configuration-probability
              DIVIDED BY data-value-compatible-count
20          else /* the state-compatible-configuration does have confusion */
21                  for each confusion-alternative-configuration /*
            e.g., if config is 1 0 and can be confused with 1 1 the iteration is
            over the set 1 0 and 1 1 . */
22                  {
21                      Determine the alternative-config-
             probability for the confusion-alternative-configuration from the
             confusion matrix;
22                      For each alternative-data-value IN the
             list of data-values that is compatible with the confusion-
             alternative-configuration
23                          DATA-STATE-PROB
              [alternative-data-value,state] := DATA-STATE-PROB
              [alternative-data-value,state] + alternative-config-
              probability* state-per-configuration-probability DIVIDED
              BY data-value-compatible-count;
24                  } /* end for each confusion-alternative-
                  configuration */
25              /* ENDIF */
26      } /* end for each state-compatible-configuration */
27  }     /* end for each state */
28  normalize each datavalue row;
29  }
```

The above pseudo code will be described herein by way of example. The pseudo code of Table V loops over each state (Loop starting at Line 3). The pseudo-code of Table V operates much like pseudo code of Table IV. For any configuration that is compatible with the state and for which there is no confusion, the assignment of probability is the same. However, if there is confusion in a compatible configuration, the probability associated with that configuration is allocated between the alternative configurations that could reflect the recorded configuration and to the datavalues that such alternative configurations are compatible with according to the probabilities assigned in the confusion matrices.

Consider a very simple example. If a first state S has a defined configuration as 1—, i.e., the first bit is 1 and the second bit is undefined, there are two configurations that are compatible with that configuration, 1 0 and 1 1. Now, suppose that there are three alternative data values, A, B, and C. Let's define 1 0 to be compatible with A and B, and 1 1, with B and C. Let's further define that the first compatible configuration, 1 0, has no confusion, whereas 1 1 may be confused and has alternative configurations 1 0 and 1 1. According to the confusion matrix, 1 1 has the probability 0.8 of begin 1 1 and the probability 0.2 of being 1 0.

Because there are two compatible configurations for state S, each is allocated a probability of 0.5.

Consider now the first compatible configuration of the state S, 1 0. Because it has no confusion, of the data values compatible with 1 0, namely A and B, are allocated ½ of the 0.5 probability allocated to 1 0.

The resulting DATA-TO-STATE probability matrix for state S is as follows:

A: 0.25

B: 0.25

C: 0.0

Now consider the second compatible configuration of state S, 1 1. Because 1 1 has confusion, Line 20 of the pseudo code of Table V, for each alternative (1 1 and 1 0), the probability of that configuration is determined from the confusion matrix. The confusion matrix has a row for each recorded value of a trait and a column for each actual value. In the present example, the only recorded value is 1 and the corresponding actual values may be either 1 (with a probability 0.8) and 0 (with a probability 0.2). Thus, the two alternative configurations are given the probabilities 0.8 and 0.2, respectively, Line 22. For each configuration that is an alternative to the confused configuration each compatible data value the probability assigned to the alternative configuration multiplied by the portion of the probability assigned to the state compatible configuration that is assigned to each data value, Line 23. Because there are two data values compatible with the second state compatible configuration each is allocated 0.25. This is then multiplied by then allocated to the data values compatible with the alternative configurations as follows:

A: 0.2*0.25 (from being compatible with 1 0 which is 0.2 probability alternative of 1 1)

B: 0.8*25+0.2*0.25 (from being compatible with 1 1 which is 0.8 probability alternative of 1 1, and being compatible with 1 0 which is 0.2 probability alternative of 1 1)

C: 0.8*0.25 (from being compatible with 1 1 which is 0.8 probability alternative of 1 1)

Thus, the end-result allocation of data-to-state probabilities for state S is:

A: 0.25+0.2*0.25

B: 0.25+0.8*25+0.2*0.25

C: 0.0+0.8*0.25

Figure 30:
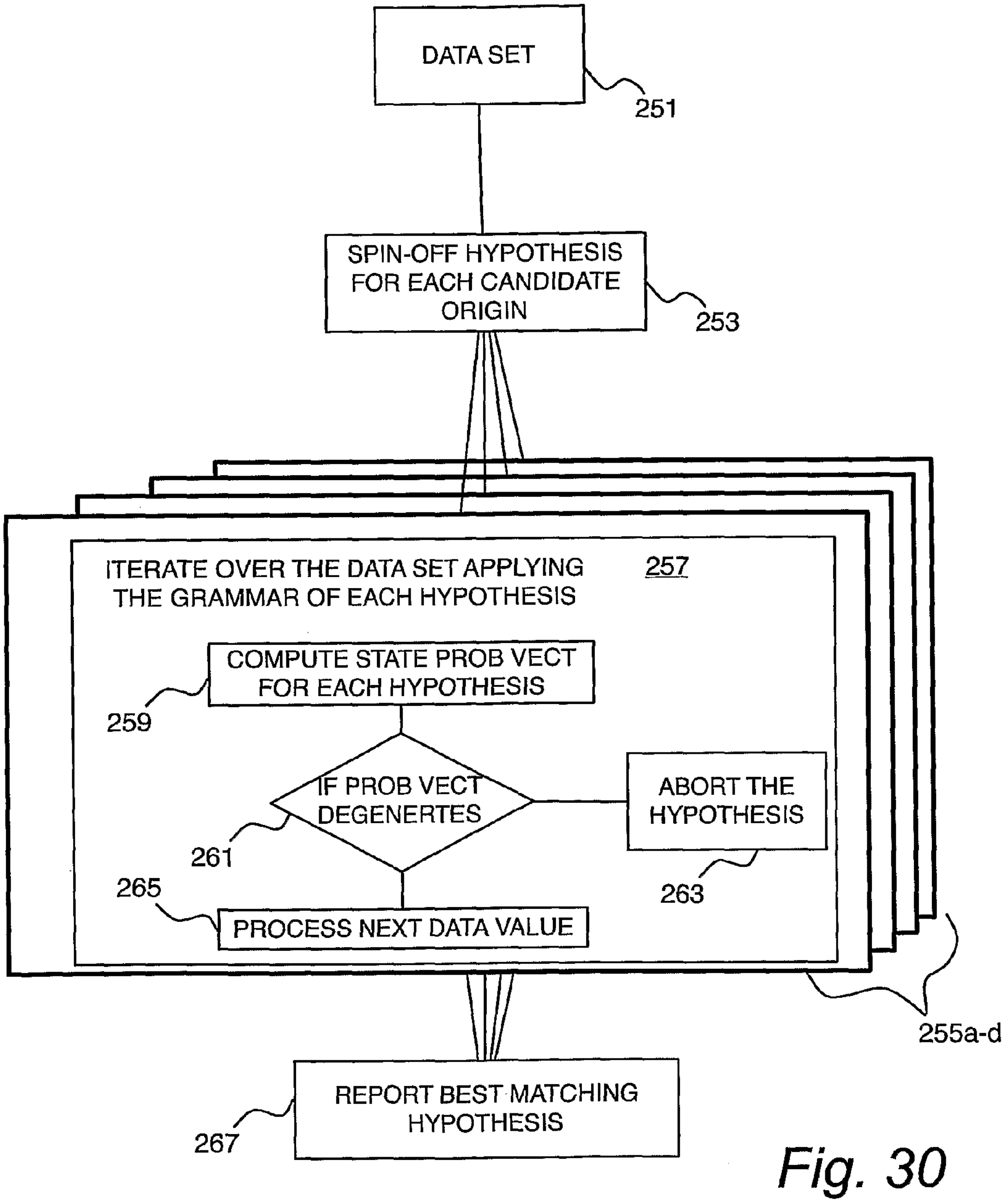
FIG. 30 is a flow-chart illustrating the process of applying the data interpretation program introduced herein to evaluate multiple hypothesis relevant to the origin of a data set.

The methodology for storing a stochastic grammar 505 in an ontology for drilling 501 and using that in the manner described for interpreting a data stream 405 may be extended. In an embodiment, the above-described methodology is used to assess the compatibility of a data set with a particular grammar and thereby determining something about the data set. For example, each operator company may have its own way of performing drilling operations and may handle particular situations in particular ways. Each company would then have a unique grammar. Similarly, different geographic regions may have different grammars. A data set, for which an analyst does not know the origin, be it by operator-company or by geographic region, may be interpreted against several alternative grammars to determine which grammar is the best fit and therefore most likely to be the origin of the data set. FIG. 30 is a flow-chart illustrating the process of determining the origin of a data set.

A data set 251, e.g., a RIG state channel or another data channel, is received as input. A plurality of hypothesis **255*a* through 255*d* are started, step 253. Each hypothesis 253 may be a data interpretation program 401 that implements a unique stochastic grammar reflecting the operations of a particular drilling operator or geological area. These hypothesis data interpretation programs 255 each iterate 257 over the data sequence 251 in the manner described herein above in conjunction with, for example, the interpretation program 401. On each iteration, the hypothesis interpretation programs 255** determine state probability vector corresponding to an interpretation of the data set using the grammar associated with that particular hypothesis.

Each hypothesis may test the state probability vector it generates against some criteria to determine whether the hypothesis is plausible, decision 261. Usually, if a data set reflects activities that may be interpreted by a particular grammar the state probability vector would strongly indicate that certain activities are much more probable than the other activities. Conversely, if all activities are roughly equally probable, there is a very poor match between the grammar and the data set. Thus, if the grammar seem ill-suited over several iterations, the hypothesis is aborted, step 263, otherwise, the next point in the sequence is processed, step 265. At the conclusion of the processing of the data set through various hypothesis, the interpretation results may be reported, step 267, including reporting the best overall match between the data set 251 and the grammars processed by the various hypothesis interpretation programs 255.

As described herein above, a stochastic grammar may be stored in an ontology for the purpose of interpreting certain data in terms of activities performed by a driller. In further embodiments, additional drilling knowledge may be stored in the ontology 501 to facilitate reasoning about drilling operations that involve combining knowledge from different aspects of drilling, exploration, production, etc. Such different knowledge may include information about relationships between certain measurements and problem diagnostic inferences that may be drawn from those measurements. By correlating different types of knowledge, all stored in a common representation, inferences may be drawn about the relationships between the interpretations that may be made from the different types of knowledge. For example, if one domain of knowledge allows for interpretation of data leading to problem diagnostics and a second domain of knowledge allows for interpretation of drilling activities, these interpretations may be correlated to allow for inferences such as what actions (or activities in the parlance of the embodiments described herein above) a driller takes when the driller likely has encountered certain problems or drilling conditions. Extensions to the ontology 501 and these types of reasoning is described herein below.

Figure 31:
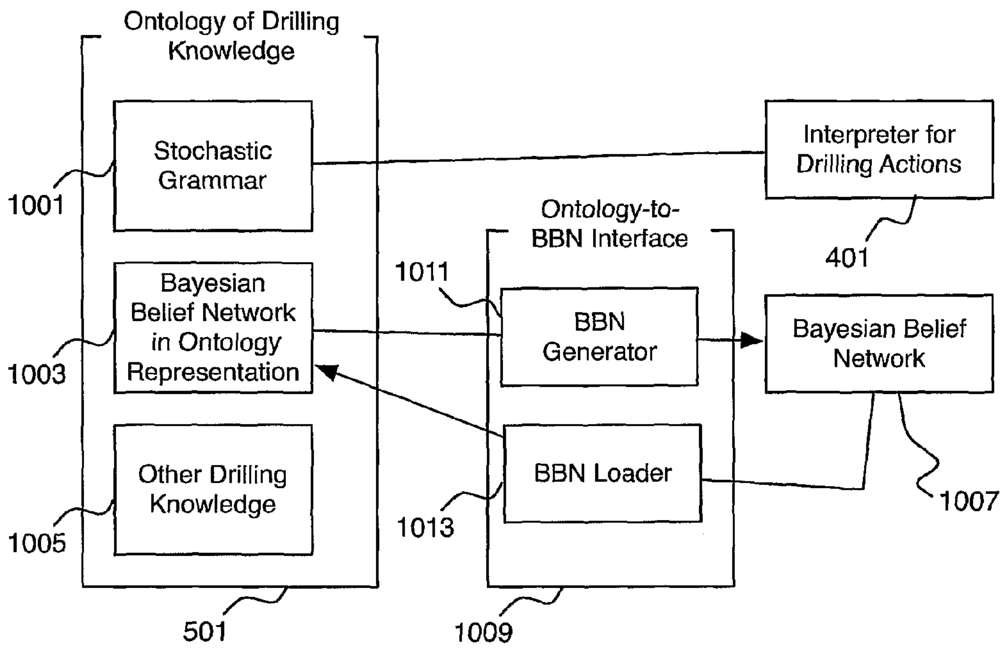
FIG. 31 is a block diagram illustrating the extension of the drilling ontology illustrated in FIGS. 4 through 30 to include ontology representations of a stochastic grammar, and further, a Bayesian Belief Network (BBN) and, optionally, additional other drilling knowledge, in accordance with an embodiment of the present invention.

FIG. 31 is a block diagram illustrating the extension of the drilling ontology 501 to include ontology representations of, as herein above, a stochastic grammar 1001, further, a Bayesian Belief Network (BBN) 1003, and, optionally, additional other drilling knowledge 1005. As discussed herein above, the stochastic grammar may be extracted from the ontology 501 and form the basis for a drilling activity interpretation program 401. Similarly, the ontology representation of the Bayesian Belief Network 1003 may be used to extract a BBN in a representation 1007 (for example, a Netica .dne file) that may be interpreted by a BBN interpreter (for example, the Netica program from Norsys Software Corp, Vancouver, Canada). For ease of explanation, the interpretable representation 1007 of the BBN is referred to herein below as the DNE BBN representation. However, it must be understood that .dne and Netica are merely examples and that any representation of a BBN and, conversely, any interpreter of BBNs are alternatives and are to be included in the interpretation of the words DNE BBN representation and BBN Interpreter respectively. The DNE BBN representation 1007 is produced by an ontology-to-BBN-interface 1009 containing a BBN generator 1011. Conversely, the DNE BBN representation 1007 may be loaded back into the ontology by a BBN Loader 1013.

Figure 32:
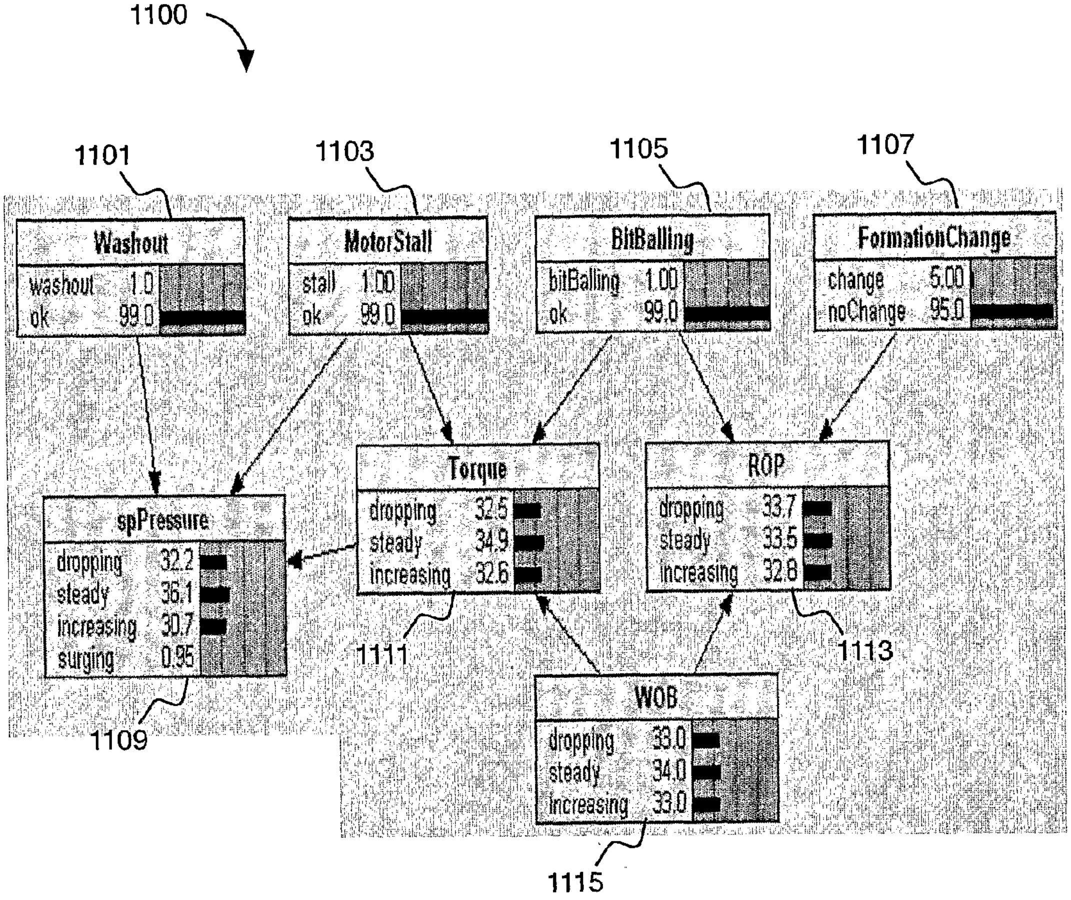
FIG. 32 is a graphic representation of a Netica DNE BBN representation of a BBN for diagnosing drilling problems, in accordance with an embodiment of the present invention.

FIG. 32 is a graphic representation 1100 of a Netica DNE BBN representation 1007'. Each node in the DNE BBN representation 1007' represent particular probabilities of particular diagnostics (Washout 1101, MotorStall 1103, BitBalling 1105, FormationChange 1107) based on the probabilities of particular observed physical properties (spPressure 1109, Torque 1111, ROP (rate of penetration) 1113, and WOB (weight on bit) 1115. Each of the diagnostic nodes 1101 through 1105 either have a state value OK, meaning the condition associated with the node, is not the case with a probability indicated. E.g., in the present example, the Washout node 1101 indicates a 99% probability of being OK. Conversely, each of the diagnostic nodes also indicate the probability of the corresponding diagnostic condition, e.g., for the Washout node 1101 there is a 1% probability of Washout occurring, and for Formation change 1107 there is a 5% probability of a formation change.

Appendix C contains a listing of a .dne file generated from an ontology 501, and corresponding to the graphic representation 1100.

Figure 33:
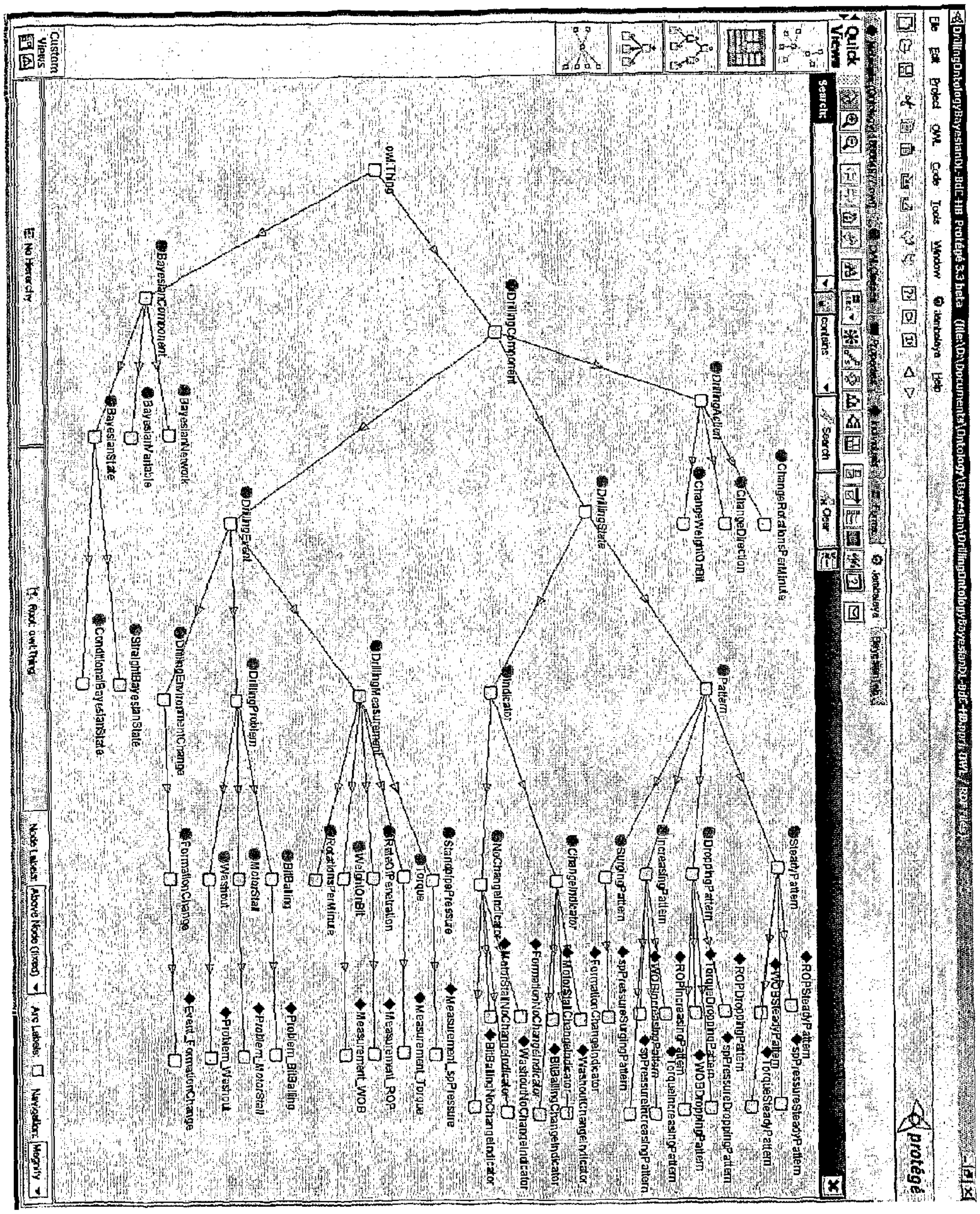
FIG. 33 is a screenshot of a hierarchical representation of an ontology containing a BBN, in accordance with an embodiment of the present invention.
Figure 34:
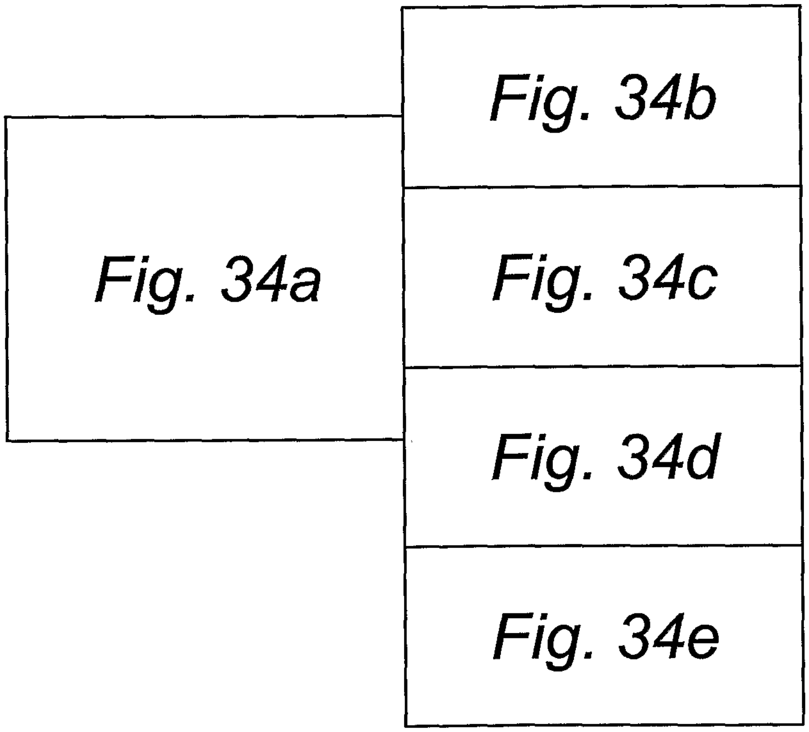
FIG. 34, which is distributed over FIGS. 34*a-e*, provides a magnified view of the graphical representation of FIG. 33, in accordance with an embodiment of the present invention.

FIG. 33 is a screenshot of a hierarchical representation of an ontology 501 containing a BBN 1003. As an example of an embodiment of the present invention, a small part of the domain of knowledge about drilling in the OWL ontology language is provided below. FIG. 33 shows a graphical representation of the taxonomy of concepts, viewed using the Protégé ontology development environment. FIG. 34, which is distributed over FIGS. 34*a-e*, provides a magnified view of the graphical representation of FIG. 33.

In the illustrated embodiment, the leftmost node, Owl: Thing 1201 is the top node of the taxonomy. DrillingComponent 1203 is a class or subset of the top node 1201, and in turn it has sub-classes DrillingAction 1205, DrillingState 1207, and DrillingEvent 1209. One sub-class of DrillingEvent is DrillingProblem 1211, which is expanded on FIG. 34*d* and contains the sub-classes BitBalling 1213, MotorStall 1215 and Washout 1217 (as three arbitrary examples of problems). The class DrillingEvent 1209 also contains the sub-class DrillingMeasurement 1219, which is also expanded on FIG. 34*d* and which in turn contains StandpipePressure 1221, Torque 1223, and other measurements.

In addition to the sub-class relationship, the ontology contains individual instances of the various classes and relationships between the classes. For example, a DrillingProblem instance is related to one or more corresponding DrillingStates that represent associated observations of various measurements. The relationship hasDrillingState in the ontology expresses the link between the two.

In accordance an embodiment of the present invention, the process of representing drilling knowledge in an ontology illustrated FIGS. 33 and 34 described above provides a very simple example in which a number of typical problems encountered while drilling and a number of observations by which they may be recognized have been defined in an ontology.

Figure 34A:
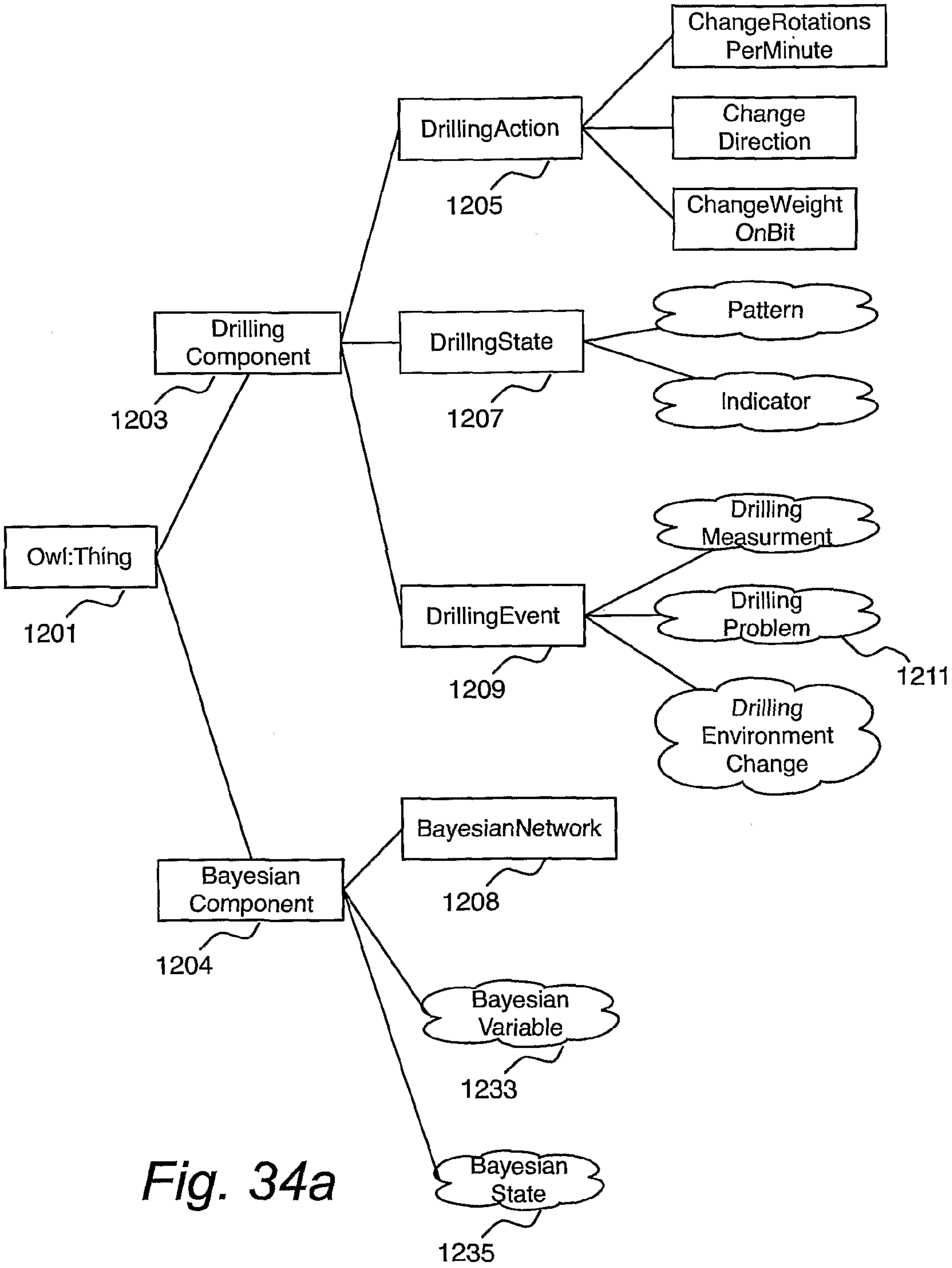
Figure 34B:
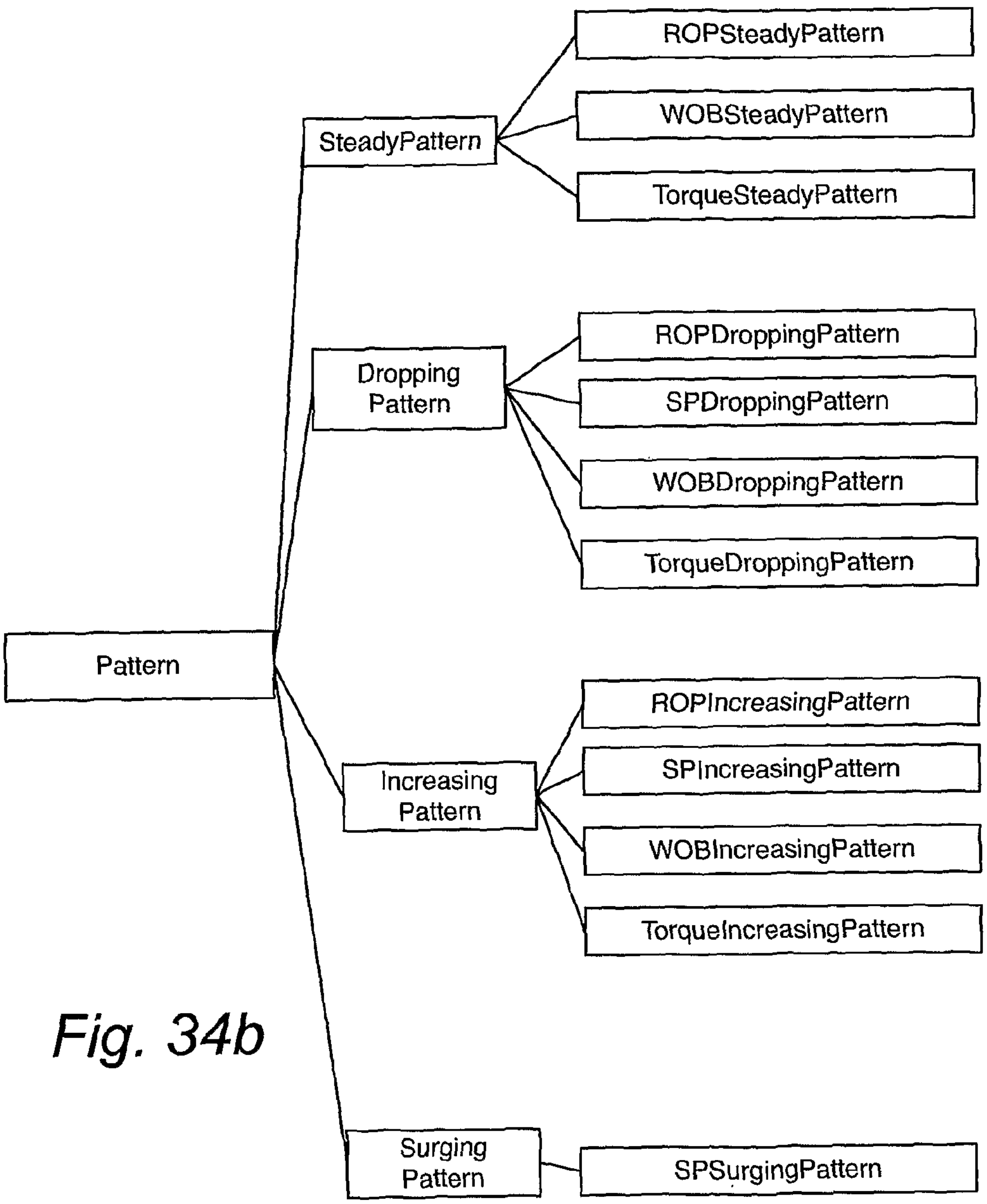
Figure 34C:
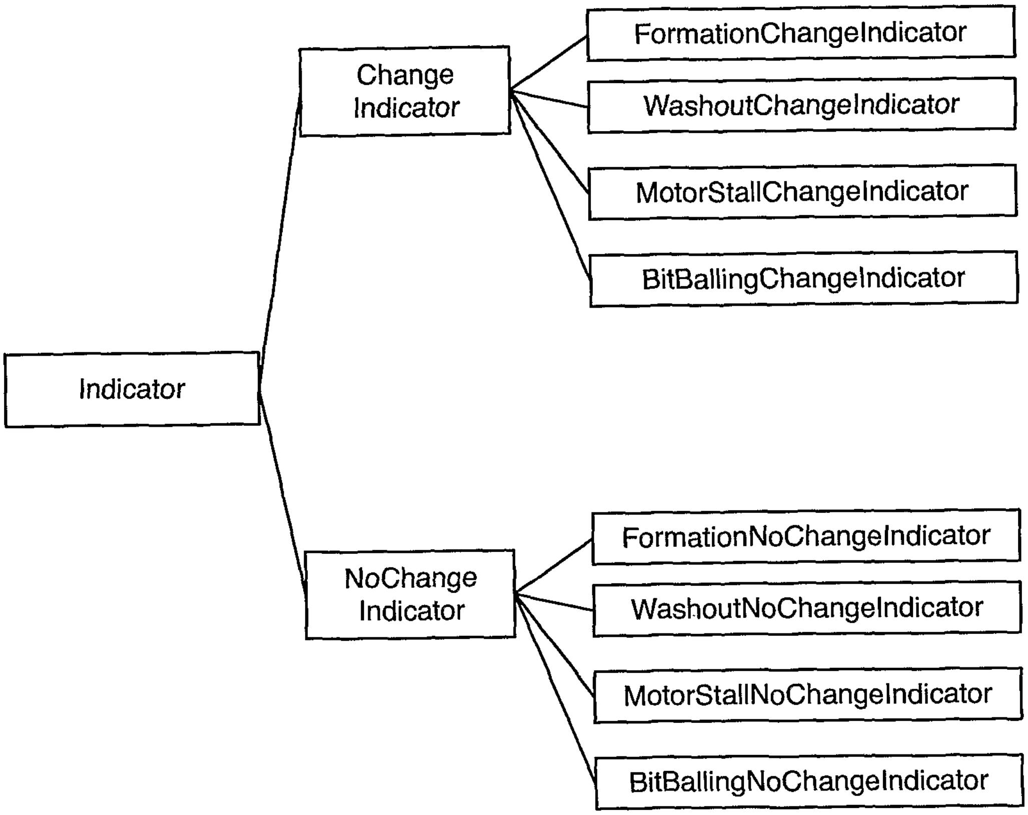
Figure 34D:
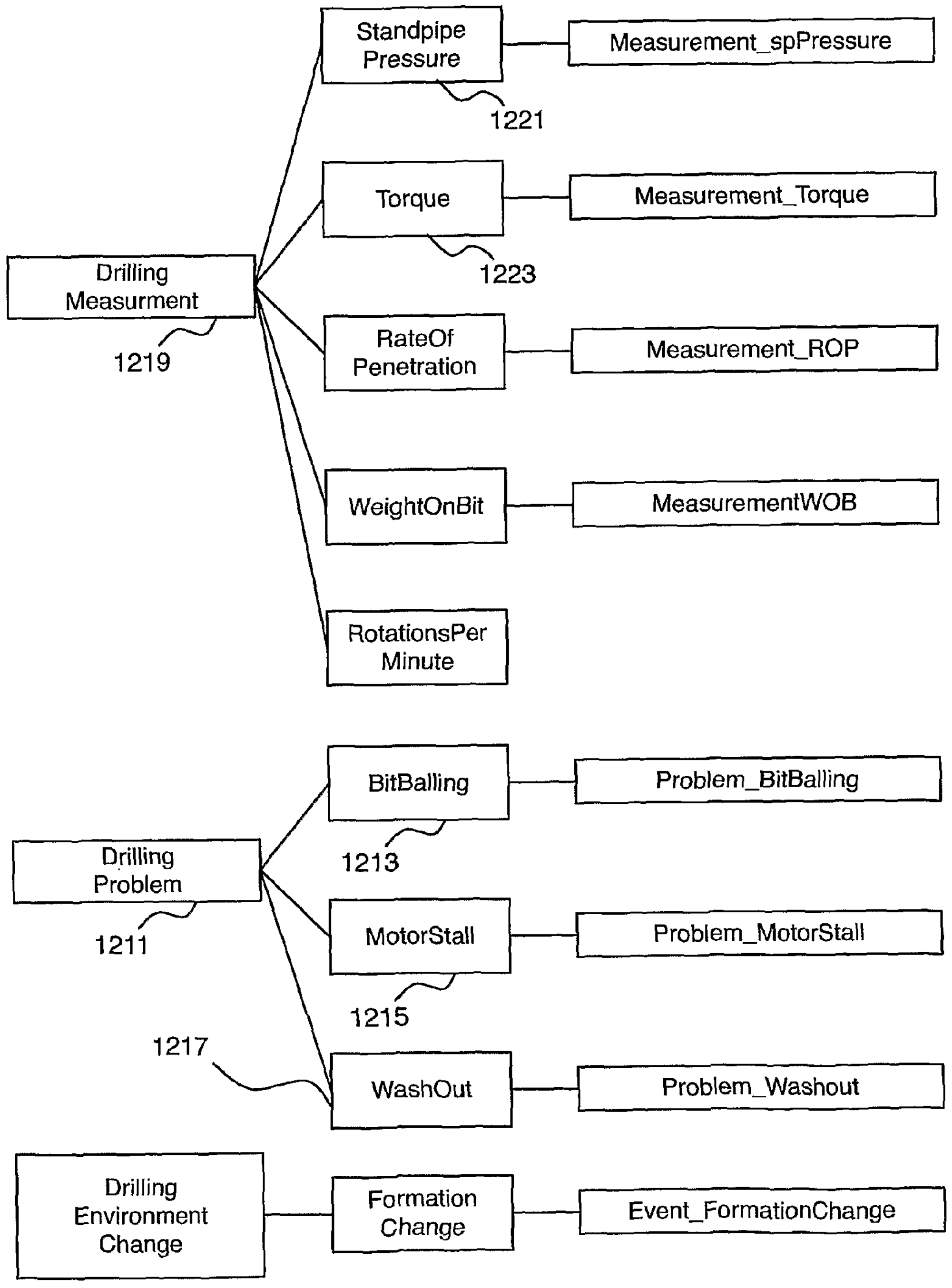
Figure 34E:
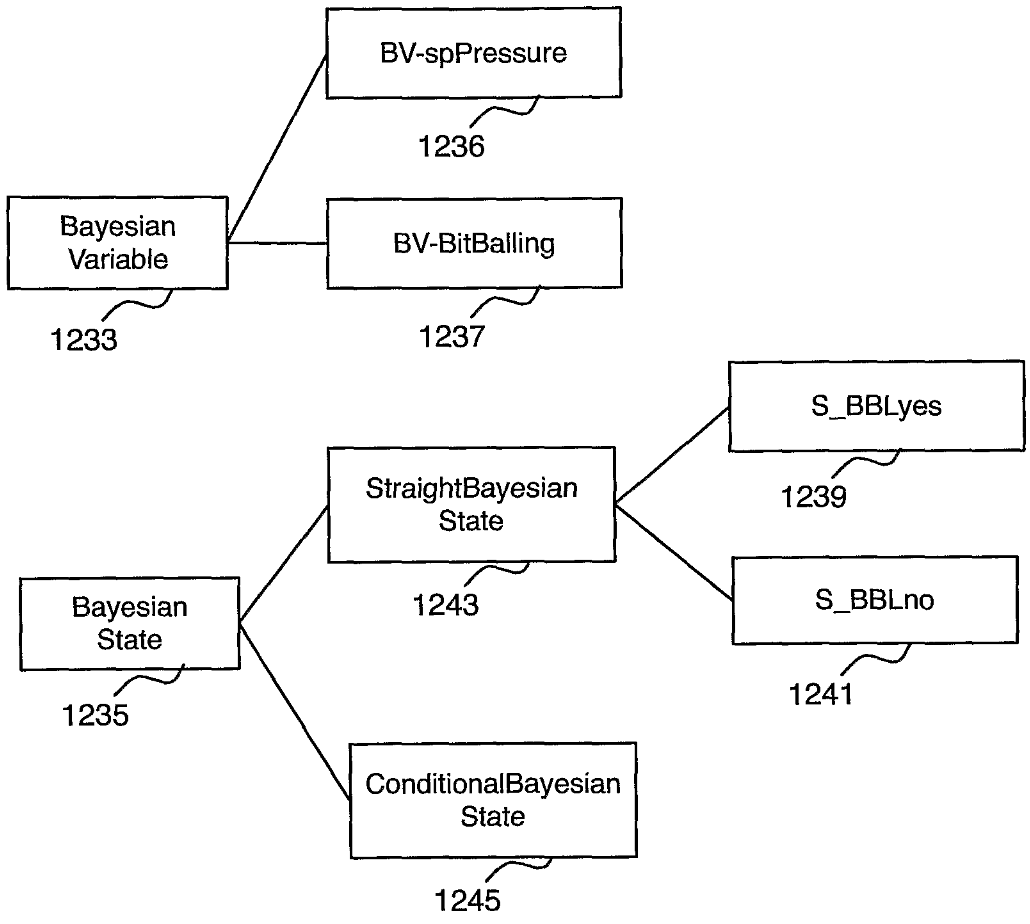

In an embodiment, probabilistic knowledge is represented in the ontology using an ontology representation of a Bayesian Belief Network. In that representation probabilistic knowledge is represented by defining various classes and individuals in the ontology that relate to Bayesian inference. For example, the class BayesianComponent 1204, which is a sub-class to Owl:Thing 1201, is defined to contain BayesianVariable 1233 and BayesianState 1235 (both expanded on FIG. 34*e*). A Bayesian variable, expanded on in FIG. 34*e*, represents a small set of mutually exclusive and exhaustive propositions about the state of the world, for example "Bit-Balling is occurring" and "Bit-Balling is not occurring"; an assignment of a state to the variable represents one of the propositions being true and the rest being false. In our example, BV-BitBalling 1237 is the class of Bayesian variables representing Bit-Balling problems, and the BayesianStates S_BBLyes 1239 and S_BBLno 1241 correspond to the two propositions above. The BBN makes the determination of the probabilities prob(BitBalling=yes) and prob (BitBalling=no) possible.

In an embodiment of the present invention, the state of a Bayesian variable may be independent of other variables, in which case the state is a StraightBayesianState 1243 and the state has a relation hasBayesianProbability that links the state to a numerical value for the probability of the state, representing prob(variable=value).

Alternatively the state of the variable may be dependent upon the state of other variables, in which case the state is a ConditionalBayesianState 1245. For example, bit-balling causes a decrease in ROP (rate of penetration), therefore, the goal is to determine the conditional probability prob (ROP=decreasing|BitBalling=yes), i.e., the probability that the ROP is decreasing on the observation that BitBalling is occurring. This conditional probability relationship is represented in the example ontology by an individual ConditionalBayesianState 1245 that links to specific states for other variables and to a numerical value for the conditional probability.

In the example of the embodiment, there are also relationships, hasBayesianVariableRepresentation and is BayesianVariableRepresentationOf, which link DrillingEvents to BayesianVariables.

Figure 35:
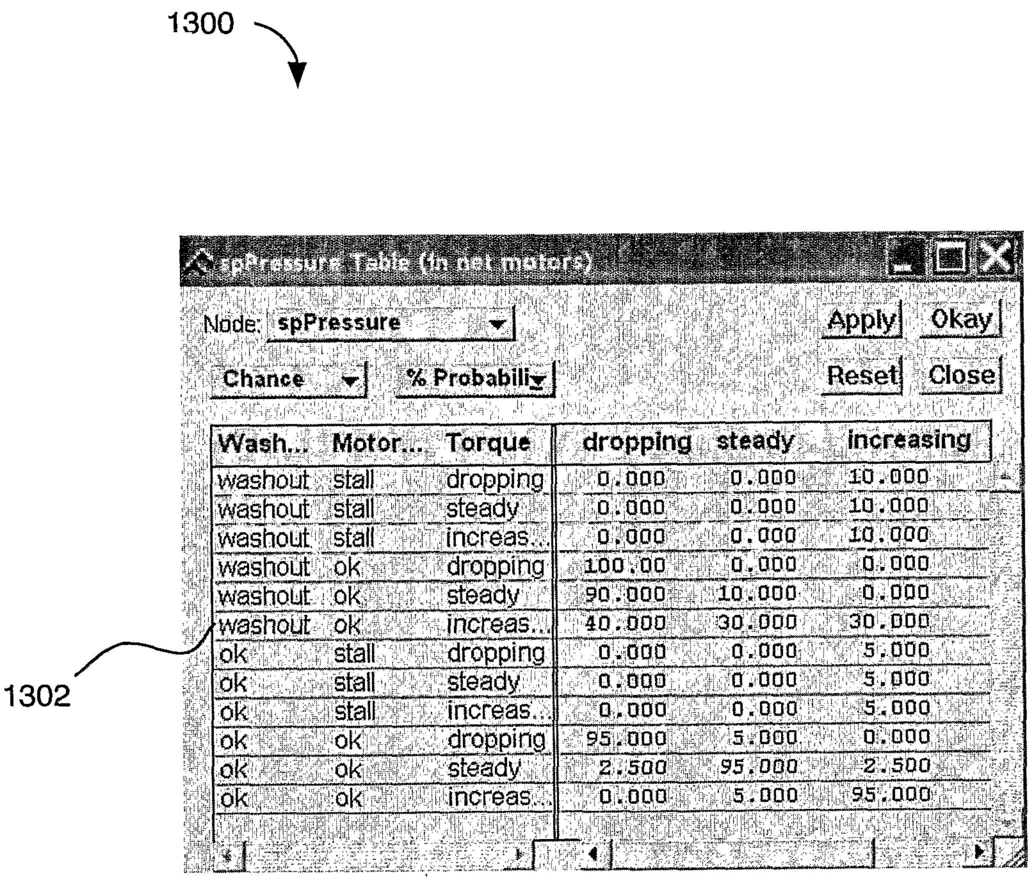
FIG. 35 is a screen shot of a probabilities table showing the conditional probabilities for the spPressure Bayesian variable from the BBN of FIGS. 32 through 34, in accordance with an embodiment of the present invention.

In the DNE BBN representation 1007 (depicted graphically in graph 1100), the straight Bayesian probabilities and conditional Bayesian probabilities are defined tabularly. FIG. 35 is a screen shot of a probabilities table 1300 showing the conditional probabilities for the spPressure Bayesian variable 1109. As can be noted there, the spPressure Bayesian variable 1109 depends on the Bayesian variables Washout 1101, MotorStall 1103, and Torque 1111. Further, for each combination of possible values for the states of those variables, the probabilities for the states of the spPressure Bayesian variable are defined. For example, the row 1302 defining the conditions Washout=washout, MotorStall=ok, and Torque=increasing, the conditional probabilities for the value steady is 30.00%.

Figure 36:
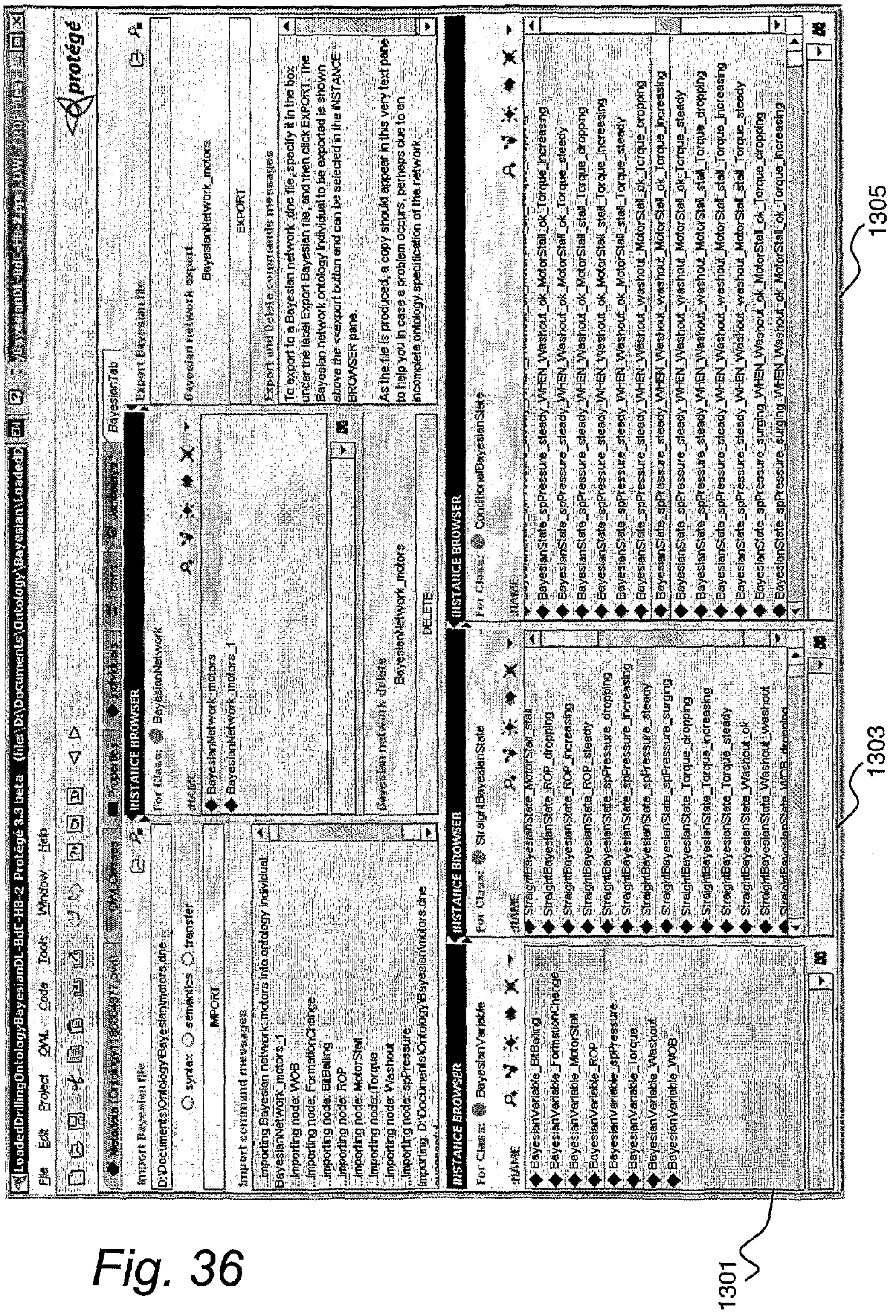
FIG. 36 is a screen shot with several windows from the Protégé development system illustrating the relationships relating to the ontology representation of the BBN of FIG. 32 and particularly, the spPressure node thereof, in accordance with an embodiment of the present invention.
Figure 37:
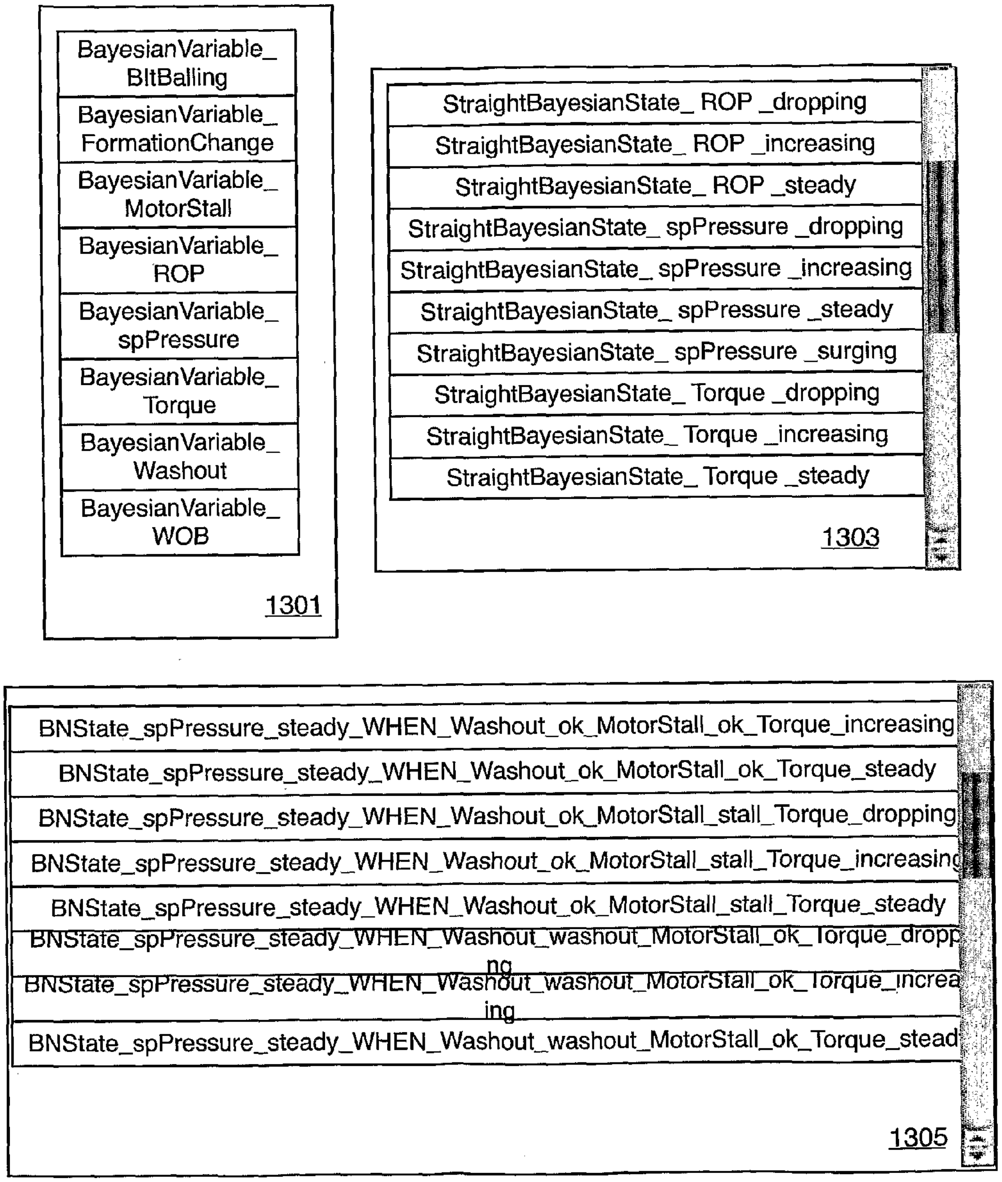
FIG. 37 provides a more detailed view of the windows of FIG. 36.

FIG. 36 is a screen shot with several windows from the Protégé development system illustrating the relationships relating to the ontology representation of the BBN 1100 and particularly, the spPressure node 1109. FIG. 37 provides a more detailed view. A first window 1301 defines the Bayesian variables in the BBN 1100, each corresponding to a node in the BBN 1100. A second window 1303 lists the states and relationships of the spPressure node 1109. The second window includes the states dropping, steady, increasing, and surging. These states, as well as several of the states corresponding to the other nodes in the BBN 1100, are shown in the second window 1303. For example, the BBN state steady, becomes StraightBayesianState_spPresure_steady. A few of the corresponding conditional Bayesian states are shown in the third window 1305. For example, the row defining the conditional Bayesian state BNState_spPressure_steady_WHEN_Washout_washout_MotorStall_ok_Torque_increasing corresponds to the row 1302 in the conditional probabilities table 1300 of FIG. 35.

Figure 38:
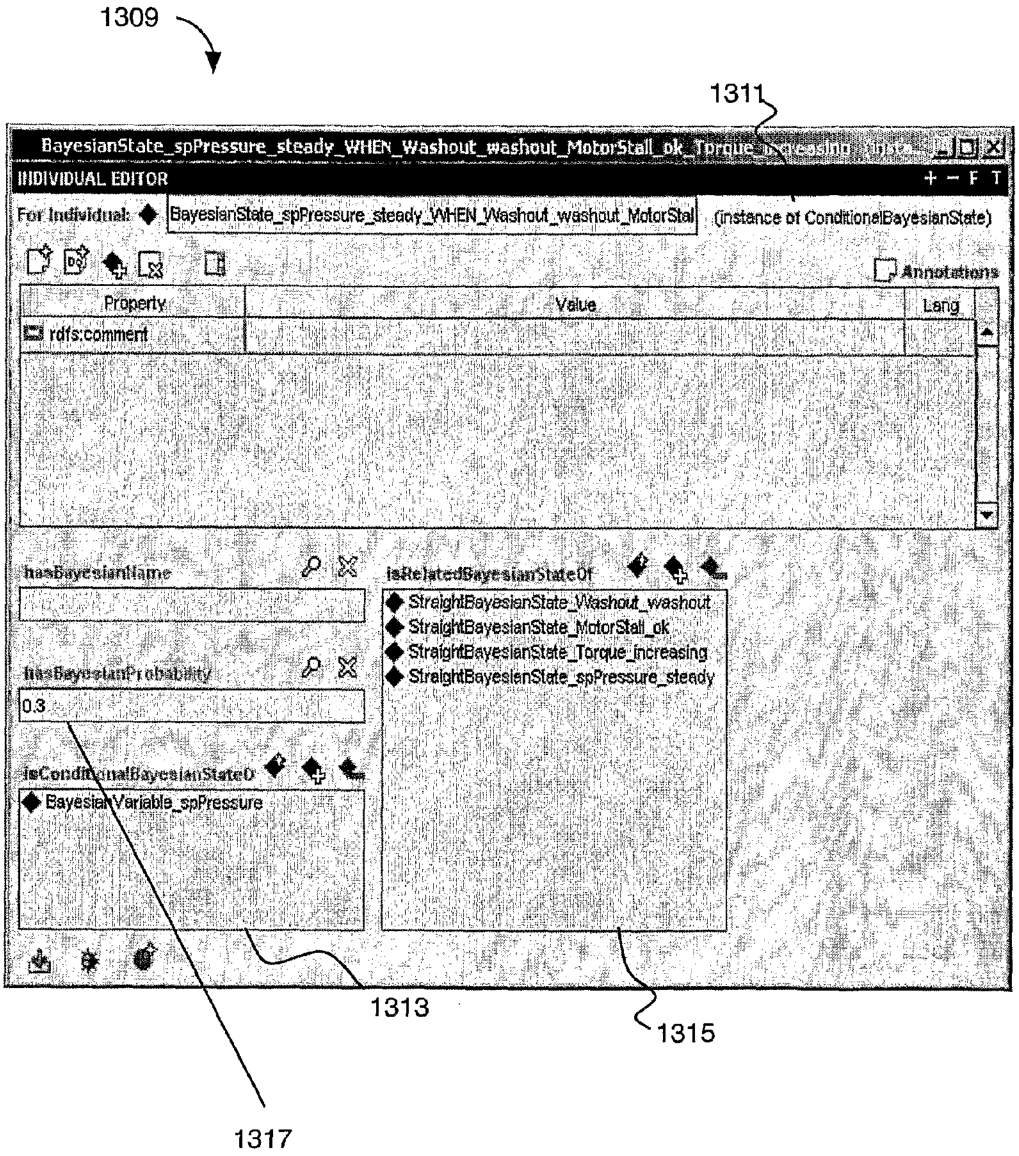
FIG. 38 is a screen shot illustrating the particular instance of a ConditionalBayesianState represented in the ontology, in accordance with an embodiment of the present invention.

FIG. 38 is a screen shot illustrating the particular instance of the ConditionalBayesianState BayesianState_spPressure_steady_WHEN_Washout_washout_MotorStall_ok_Torque_increasing. The window 1309 specifies that the hierarchical relationship in the ontology, namely, that the instance referred to is an instance of ConditionalBayesianState 1245. The subwindow 1313 specifies that the state is a conditional Bayesian state of the Bayesian variable BayesianVariable_spPressure 1236. The subwindow 1315 lists the states to which the state is related, namely, StraightBayesianState_Washout_washout, StraightBayesianState_Washout_washout, StraightBayesianState_MotorStall_ok, StraightBayesianState_Torque_increasing, and StraightBayesianState_spPressure_steady. The instance shown in the window 1309 corresponds to the probability that spPressure is steady when the other conditions are as specified, specifically, 0.3, as shown in the subwindow 1317.

Finally, in certain aspects of the present invention, we may be interested in expressing in the ontology the fact that a certain subset of Bayesian variables (with their associated probabilities) constitutes the basis for a Bayesian belief network. This may be expressed by defining BayesianNetwork 1208 as a sub-class of BayesianComponent 1204 so that each individual of this sub-class represents a specific Bayesian network, the variables of which are related to it by the relation hasBayesianVariable.

Figure 39:
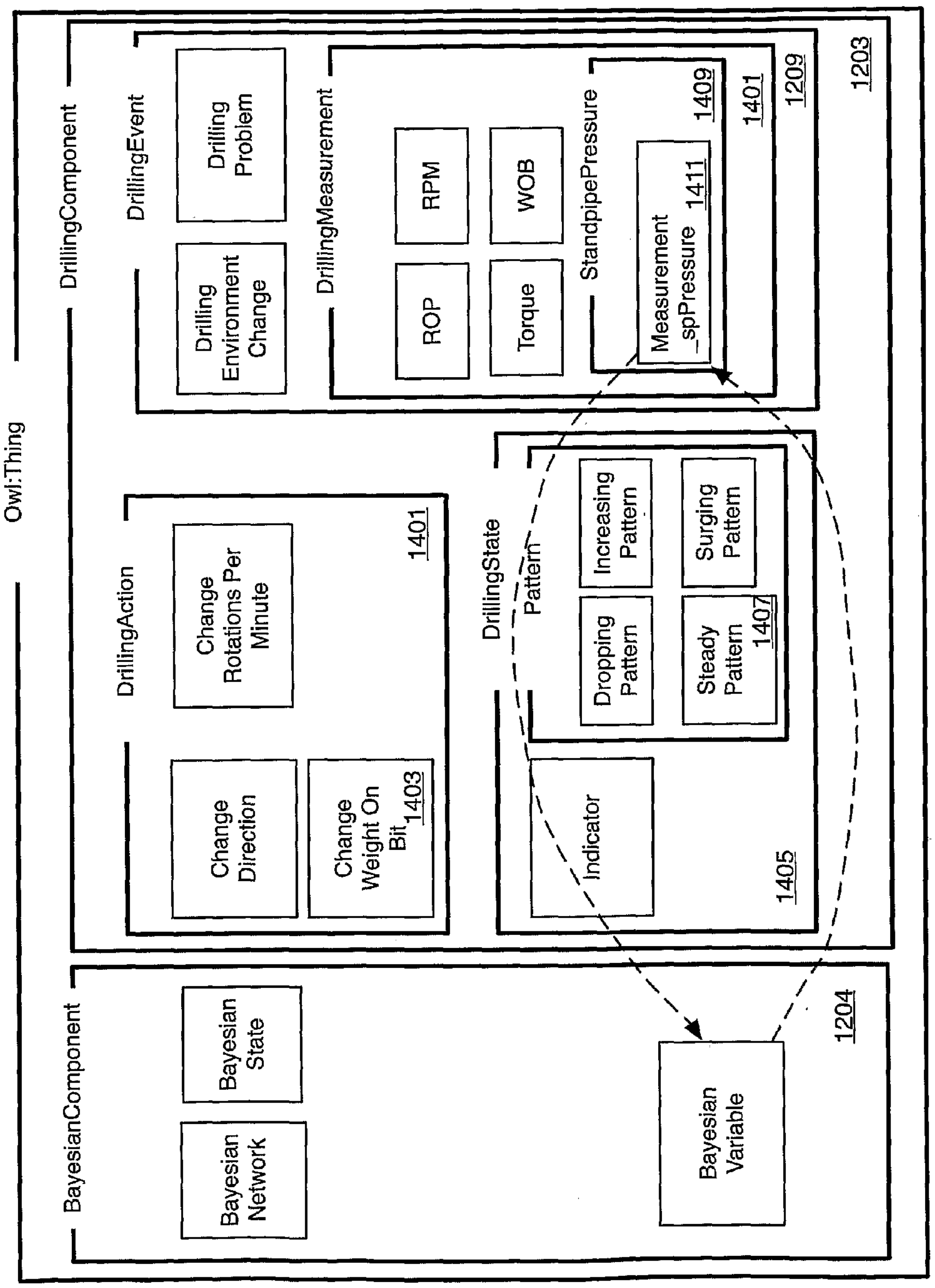
FIG. 39 is an alternative view of an ontology including the Bayesian component and the drilling component, in accordance with an embodiment of the present invention.

FIGS. 34 through 38 illustrate the specification of the BBN 1003 in the ontology 501. The ontology also contains information linking the BBN to drilling concepts that can apply to other representations, e.g., the stochastic grammar 1001. This linkage may be served by the drilling component 1203 (FIG. 34*a*). FIG. 39 is an alternative view of the ontology 501 including the Bayesian component 1204 and the drilling component 1203. In drilling, there are drilling actions 1401, such as ChangeWeightOnBit 1403, Drilling states 1405, such as that indicated by a SteadyPattern 1407, and Drilling events 1209, for example, Drilling measurements 1409 such as spPressure 1411. Thus the ontology presents a framework in which it is possible to relate measurements such as spPressure to actions such as ChangeWeightOnBit 1403, based on the relationships between the measurements that are expressed in the Bayesian network 1003.

Figure 40:
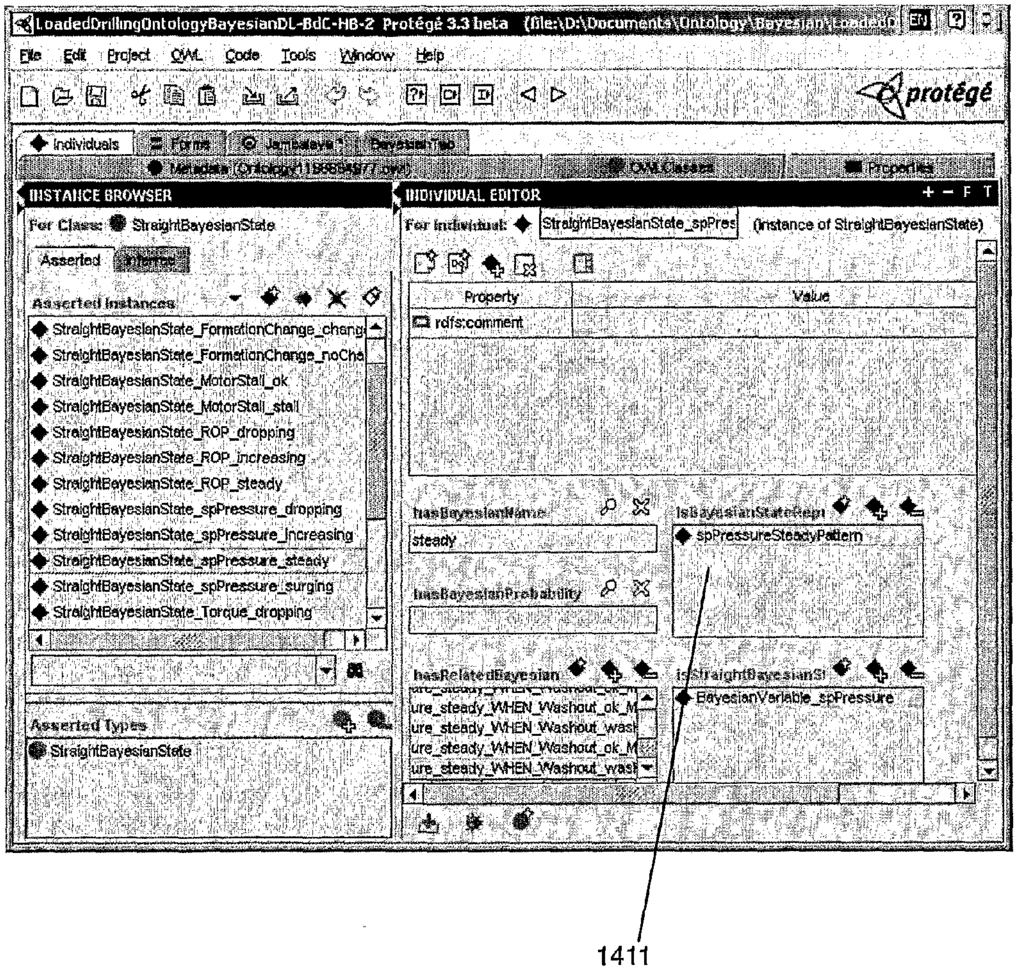
FIG. 40 is a screen shot illustrating several windows of the Protégé development system relating to the representation of the spPressure node of the BBN of FIG. 32, in accordance with an embodiment of the present invention.

The linkage between the drilling component 1203 and the Bayesian Component 1204 is further illustrated in the screen shot of FIG. 40 which shows several windows related to the spPressure node 1109 as it is represented in the ontology 1003. For example, the window 1411 illustrates the relationship that the Bayesian state StraightBayesianState_spPressure_steady is a Bayesian state representation of spPressureSteadyPattern, i.e., the Bayesian state value steady for the spPressure node 1109.

As demonstrated by this simple example, in accordance with an embodiment of the present invention, the herein described system provides the means to represent uncertain (probabilistic) knowledge in the ontology 501.

Extracting Probabilistic Knowledge from an Ontology. In some aspects of the present invention, Ontology representations, such as OWL, are designed to be analyzed by computers, which may then extract a subset of their knowledge. One such example is the BBN Generator 1009 and the corresponding BBN loader 1013. The generating program, is listed in Appendix D merely as an example. The generating program is a Java programming language, code that may be plugged into a Protégé development environment and which automatically extracts from an ontology one or more Bayesian networks represented within the ontology and re-represents the Bayesian networks in a different form. Of course other languages and other development environments and the like may be used in different embodiments of the present invention.

To summarize the operation of the BBN Generator 1011: Traverse the ontology to find each element of the Bayesian network and the associations between the element and other elements of the Bayesian network by:

1. Open the generated file for writing
2. Get the header information of the generated file (at a minimum the network name)
3. Loop over all Bayesian Variables of the ontology
4. For each Bayesian Variable:

5.1 Output the basic properties of the Bayesian Variable (for example, is the variable discrete or continuous)

5.2 Output the names of the straight Bayesian states of the variable (for spPressure, they are dropping, steady, increasing, surging)

5.3 Output the names of the parents of the Bayesian Variable if any, i.e. the Bayesian Variables that the Bayesian Variable associates to (for spPressure, Bayesian Variables that are parents are Torque, Washout, MotorStall)

5.4 If there are no parents of the Bayesian Variable, then merely output the straight probabilities 5.5 If there are parents of the Bayesian Variable, then output the conditional probabilities (procedure outputProbs below, called with two arguments: the list of parents added with the name of the Bayesian Variable, and an empty list of straight Bayesian states)

6. Close the generated file

The procedure outputProbs which is recursive, follows the following process flow:

1. If the list of parents plus Bayesian Variable is not empty:

1.1. Record the first element of the list of parents plus Bayesian Variable 1.2. Loop over all straight Bayesian states of the Bayesian Variable 1.3. For each straight Bayesian state of the first element of the list of parents plus Bayesian Variable:

1.3.1 Add the straight Bayesian state to the list of straight Bayesian states 1.3.2 Remove the first element of the list of parents plus Bayesian Variable 1.3.3 Recursion: call outputProbs anew with the list of parents plus Bayesian Variable and the list of straight Bayesian states 1.3.4 Restore the first element of the list of parents plus Bayesian Variable 1.3.5 Remove the last straight Bayesian state from the list of straight Bayesian states 2. If the list of parents plus Bayesian Variable is empty 2.1 Loop over the list of straight Bayesian states 2.1.3 For each straight Bayesian state:

2.1.3 The first time, build a current list of the Bayesian states related to the straight Bayesian state 2.1.4 The other times, extract from the current list the Bayesian states that are related to the straight Bayesian state to build a new current list of Bayesian states 2.2 Output the conditional probability of the single remaining Bayesian state in the current list of Bayesian states Naturally, the BBN Generator 1011 also takes into account the expected syntax of the BBN interpreter.

In accordance with some embodiments, the extraction process may require loading of knowledge from an ontology represented in an external form, such as OWL, into computer memory. It may then require accessing the internal form, such as a database, to find particular items, such as objects that represent instances of BayesianVariables. In some aspects, it may require writing out the information found in another form for subsequent application.

Figure 41:
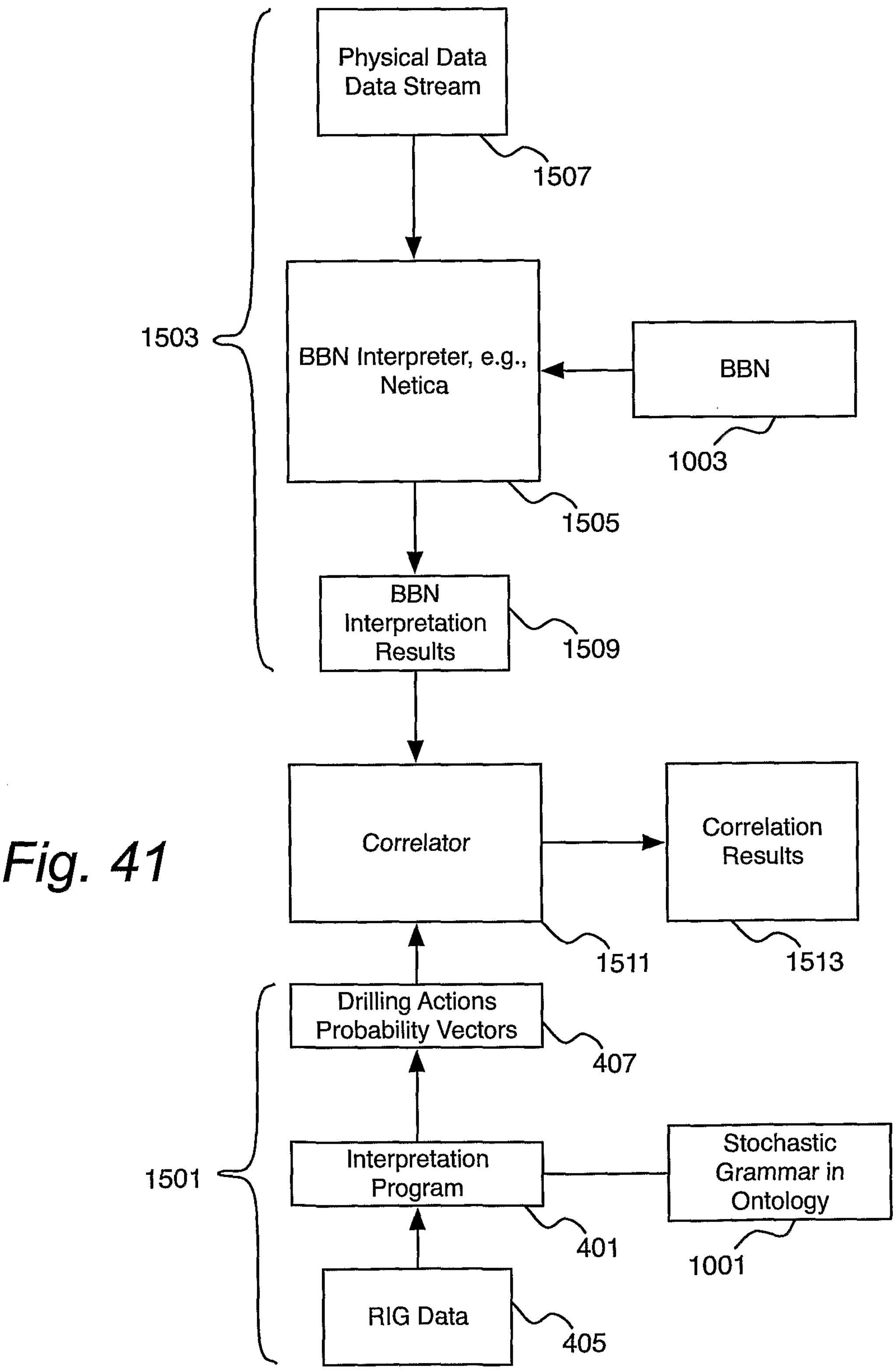
FIG. 41 is a block diagram illustrating the relationships between various components of the herein-above described embodiments providing for the ability to provide advanced reasoning about the activities, measurements, conditions, etc. of a drilling operation, in accordance with an embodiment of the present invention.

FIG. 41 is a block diagram illustrating the relationships between various components of the herein-above described embodiments providing for the ability to provide advanced reasoning about the activities, measurements, conditions, etc. of a drilling operation. An operational sequence 1501 uses an interpretation program 401 derived, from the stochastic grammar 1001 stored in the ontology 501, for example, in the manner described herein above. This sequence 1501 produces drilling action probability vectors 407 indicative of the activities that may have transpired on a drilling rig.

Conversely, an operational sequence 1503 uses a BBN interpreter 1505 to interpret a DNE BBN representation 1007 extracted from the ontology representation of the BBN 1003 in the manner described herein above, for example, in conjunction with FIGS. 31 through 39, to interpret a data stream of physical data 1507, for example. The output from this interpretation sequence may be a sequence 1509 of BBN variable values representing drilling problem diagnostics, e.g., bitballing, motor stalling, washout, formation change, as discussed herein above. If the input data include values for torque, rate of penetration (ROP), spPressure or weight on bit, in some combination, the BBN 1003, which may be extracted from the ontology into the representation of Appendix C, may be used to diagnose these types of drilling problems.

Because the ontology 1009 uses a common representation for the BBN 1003 and the stochastic grammar 1001, the framework provides for the capability to extend the reasoning about the respective interpretations by making correlations between their respective results, for example, by providing a correlation mechanism 1511 to produce correlation results 1513. These correlations may be to certain probability values for the drilling problem diagnostics against drilling action probability values. By observing such correlations, it is possible to deduce the actions taken by drillers in response to certain conditions. Thus, the correlation results include conclusions of the nature that when conditions X-Y-Z are observed using the BBN 1003, the interpretation program 401 indicates that the driller takes actions A-B-C. In another form, the deductions derived by the correlation mechanism 1511 may be presented as rules fed into an expert system.

This type of reasoning may provide many advances to the technology of drilling operation automation, driller training and/or the like.

Figure 42:
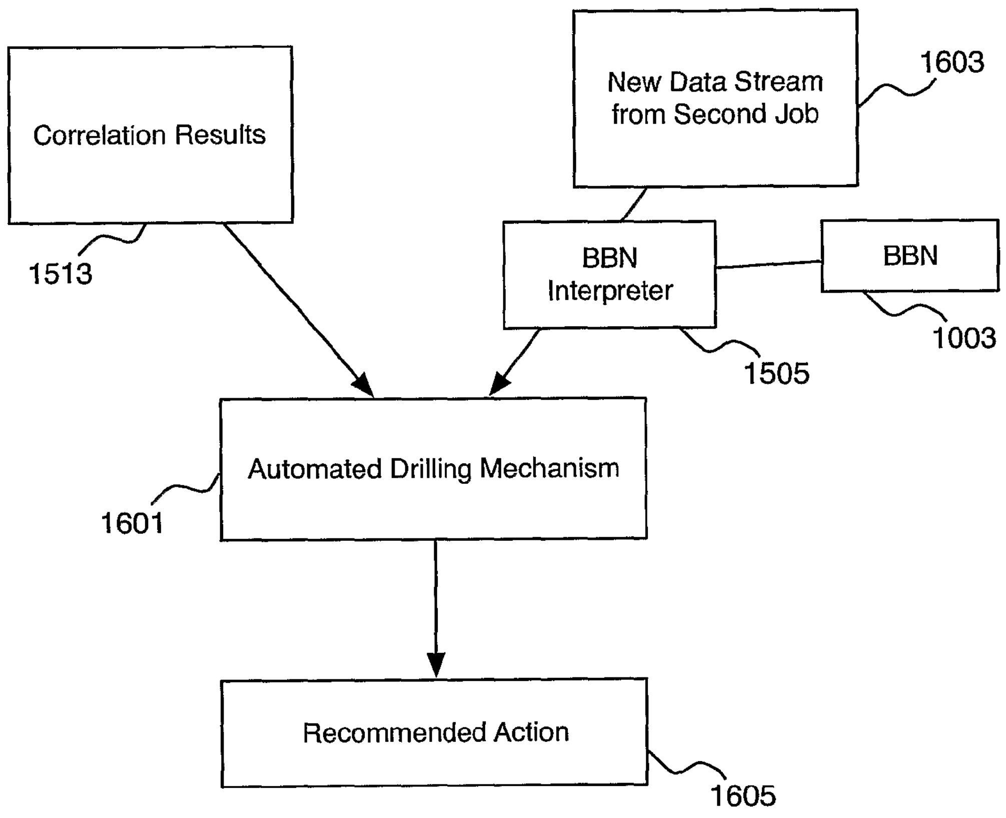
FIG. 42 illustrates the use of the correlation results from FIG. 41 used in conjunction with an automated drilling mechanism, in accordance with an embodiment of the present invention.

FIG. 42 illustrates the use of the correlation results 1513 with an automated drilling mechanism 1601. The correlation results, e.g., in the form of rules, are used with a real-time data stream 1603. The data stream 1603 may go through some initial filtering, for example, as shown through a BBN interpreter 1505 that interprets the data stream using the BBN 1003. Based on the rules derived from the correlation the automated drilling mechanism 1601 recommends actions 1605 to the driller. For example, the BBN interpreter 1505 may have detected a high probability of motor stall in conjunction with a formation change based on the input data 1603. From past experience captured in the correlation results, the automated drilling mechanism 1601 may recommend an action 1605 that drillers usually take in such circumstances.

Alternatively, the automated drilling mechanism 1601 may directly control the drilling operation by effecting the recommended action on the drilling apparatus. In such an alternative automated embodiment of a drilling operation, the automatic drilling mechanism 1601 may transmit control signals to the drilling operation control computer, for example, the surface processor 96 if surface processor 96 also functions as a control computer, or a separate control computer.

Figure 43:
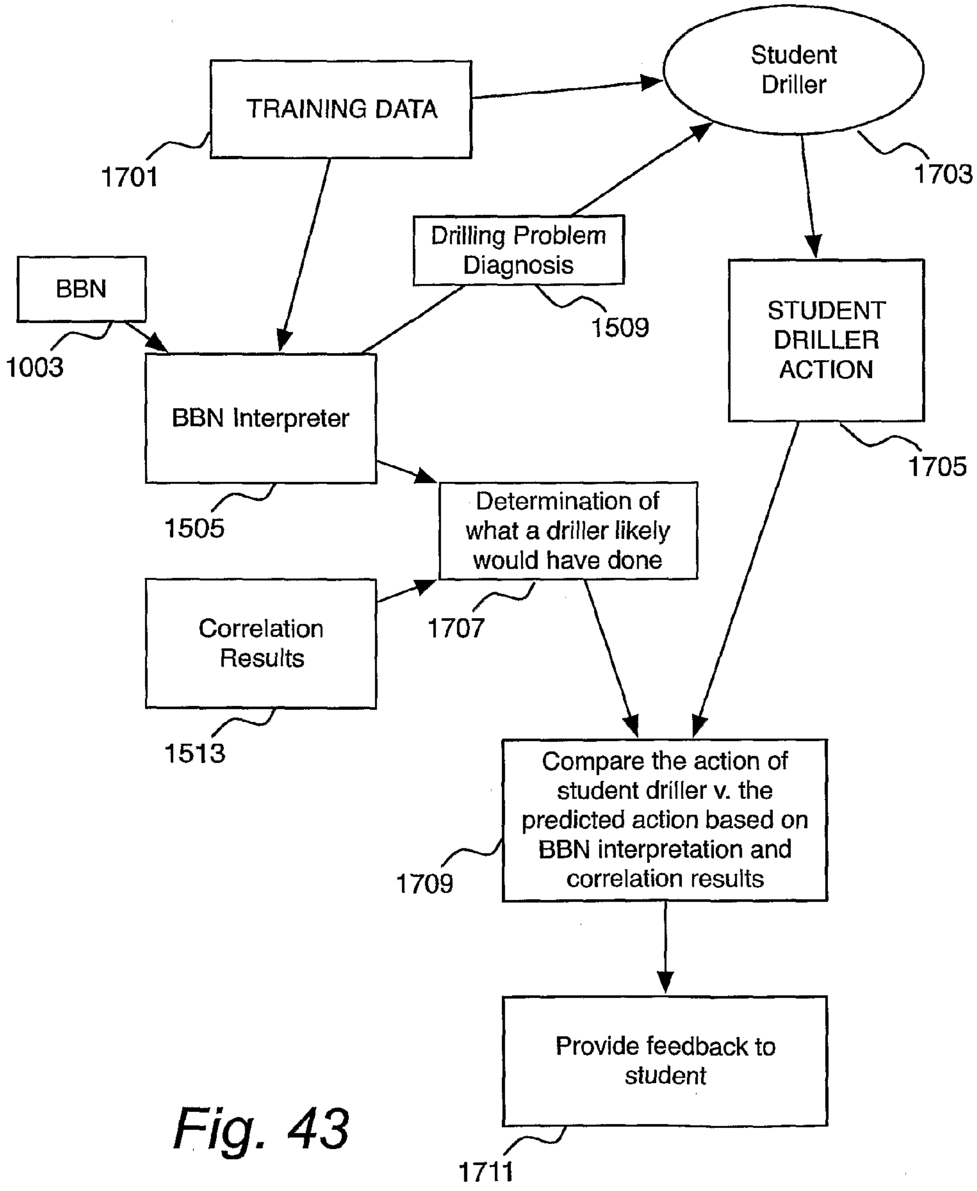
FIG. 43 is a data flow diagram illustrating the use of correlation results from FIG. 41 used in conjunction with a training environment for student drillers, in accordance with an embodiment of the present invention.

Another powerful use of the correlation results 1503 is to use the results for training purposes in an automated training program which, is illustrated in FIG. 43. Training data 1701, for example, from recorded drilling operations, is provided to a student driller 1703. Training data 1701 may be input to a training program (not shown), for example, via a BBN interpreter 1505 that diagnoses 1509 drilling problems from the input data 1701. The diagnoses 1509 are also provided to the student driller 1703. Based on the training data 1701 and the drilling diagnosis 1509, the student driller 1703 suggests corrective action 1705.

The drilling diagnosis 1509 and, optionally (not shown), the training data 1701, are fed into a program 1707 that applies the correlation results 1513, e.g., in the form of rules derived from the experiences of drilling actions taken by experienced drillers correlated against drilling problem diagnosis (or correlation against raw data), wherein the rules establish courses of action taken by drillers when faced with similar conditions. The program 1707 applies the rules from the correlation results 1513 to determine what action an experienced driller would have taken. Those actions are compared with the actions 1705 suggested by the student driller by a comparator 1709. The comparator 1709 results are fed back 1711 to the student.

Herein are discussed a mechanism in which different types of drilling knowledge may be stored in an ontology. The common representation provides a mechanism by which new functionality that builds on the existing drilling knowledge may be added seamlessly and whereby such new functionality may be used to provide powerful reasoning about data provided for interpretation. Such reasoning provides mechanisms for automating drilling operations and for providing training to student drillers. These applications are merely two examples of possible applications that may be devised based on the common representation of drilling knowledge in an ontology.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about A to about B," or, equivalently, "from approximately A to B," or, equivalently, "from approximately A-B") disclosed herein is to be understood as referring to the power set (the set of all subsets) of the respective range of values. Accordingly, the protection sought herein is as set forth in the claims below.

APPENDIX A

DRILLING STATES ONTOLOGY LISTING

```
<?xml version="1.0" encoding="utf-8"?>
<grammar>
   <traits>
      <trait>
         <label>absent</label>
         <option>yes</option>
         <option>no</option>
        <confusion>
            <from>yes</from>
            <to>yes</to>
            <prob>.9</prob>
        </confusion>
        <confusion>
            <from>yes</from>
            <to>no</to>
            <prob>.1</prob>
        </confusion>
        <confusion>
            <from>no</from>
            <to>yes</to>
            <prob>.1</prob>
        </confusion>
        <confusion>
            <from>no</from>
            <to>no</to>
            <prob>.9</prob>
        </confusion>
      </trait>
      <trait>
         <label>classified</label>
         <option>no</option>
         <option>yes</option>
        <confusion>
            <from>no</from>
            <to>no</to>
            <prob>.8</prob>
        </confusion>
        <confusion>
            <from>no</from>
            <to>yes</to>
            <prob>.2</prob>
        </confusion>
        <confusion>
            <from>yes</from>
            <to>no</to>
            <prob>.2</prob>
        </confusion>
        <confusion>
            <from>yes</from>
            <to>yes</to>
            <prob>.8</prob>
        </confusion>
      </trait>
      <trait>
         <label>datagap</label>
         <option>yes</option>
         <option>no</option>
        <confusion>
            <from>yes</from>
            <to>yes</to>
            <prob>1</prob>
```

APPENDIX A

```
    </confusion>
    <confusion>
        <from>yes</from>
        <to>no</to>
        <prob>0</prob>
    </confusion>
    <confusion>
        <from>no</from>
        <to>yes</to>
        <prob>0</prob>
    </confusion>
    <confusion>
        <from>no</from>
        <to>no</to>
        <prob>1</prob>
    </confusion>
  </trait>
  <trait>
     <label>slips</label>
     <option>notslips</option>
     <option>inslips</option>
    <confusion>
        <from>notslips</from>
        <to>notslips</to>
        <prob>.98</prob>
    </confusion>
    <confusion>
        <from>notslips</from>
        <to>inslips</to>
        <prob>.02</prob>
    </confusion>
    <confusion>
        <from>inslips</from>
        <to>notslips</to>
        <prob>.02</prob>
    </confusion>
    <confusion>
        <from>inslips</from>
        <to>inslips</to>
        <prob>.98</prob>
    </confusion>
  </trait>
  <trait>
     <label>rotate</label>
     <option>off</option>
     <option>on</option>
    <confusion>
        <from>off</from>
        <to>off</to>
        <prob>.98</prob>
    </confusion>
    <confusion>
        <from>off</from>
        <to>on</to>
        <prob>.02</prob>
    </confusion>
    <confusion>
        <from>on</from>
        <to>off</to>
        <prob>.02</prob>
    </confusion>
    <confusion>
```

APPENDIX A

```
            <from>on</from>
            <to>on</to>
            <prob>.98</prob>
        </confusion>
    </trait>
    <trait>
        <label>bottom</label>
        <option>offbottom</option>
        <option>onbottom</option>
        <confusion>
            <from>offbottom</from>
            <to>offbottom</to>
            <prob>.98</prob>
        </confusion>
        <confusion>
            <from>offbottom</from>
            <to>onbottom</to>
            <prob>.02</prob>
        </confusion>
        <confusion>
            <from>onbottom</from>
            <to>offbottom</to>
            <prob>.05</prob>
        </confusion>
        <confusion>
            <from>onbottom</from>
            <to>onbottom</to>
            <prob>.95</prob>
        </confusion>
    </trait>
    <trait>
        <label>block</label>
        <option>up</option>
        <option>down</option>
        <option>stop</option>
        <option>slow</option>
        <confusion>
            <from>up</from>
            <to>up</to>
            <prob>.94</prob>
        </confusion>
        <confusion>
            <from>up</from>
            <to>down</to>
            <prob>.01</prob>
        </confusion>
        <confusion>
            <from>up</from>
            <to>stop</to>
            <prob>.03</prob>
        </confusion>
        <confusion>
            <from>up</from>
            <to>slow</to>
            <prob>.02</prob>
        </confusion>
        <confusion>
            <from>down</from>
            <to>up</to>
            <prob>.01</prob>
        </confusion>
        <confusion>
            <from>down</from>
```

APPENDIX A

```
            <to>down</to>
            <prob>.94</prob>
        </confusion>
        <confusion>
            <from>down</from>
            <to>stop</to>
            <prob>.02</prob>
        </confusion>
        <confusion>
            <from>down</from>
            <to>slow</to>
            <prob>.03</prob>
        </confusion>
        <confusion>
            <from>stop</from>
            <to>up</to>
            <prob>.02</prob>
        </confusion>
        <confusion>
            <from>stop</from>
            <to>down</to>
            <prob>.02</prob>
        </confusion>
        <confusion>
            <from>stop</from>
            <to>stop</to>
            <prob>.93</prob>
        </confusion>
        <confusion>
            <from>stop</from>
            <to>slow</to>
            <prob>.03</prob>
        </confusion>
        <confusion>
            <from>slow</from>
            <to>up</to>
            <prob>.01</prob>
        </confusion>
        <confusion>
            <from>slow</from>
            <to>down</to>
            <prob>.03</prob>
        </confusion>
        <confusion>
            <from>slow</from>
            <to>stop</to>
            <prob>.02</prob>
        </confusion>
        <confusion>
            <from>slow</from>
            <to>slow</to>
            <prob>.94</prob>
        </confusion>
    </trait>
    <trait>
       <label>pump</label>
       <option>off</option>
       <option>on</option>
        <confusion>
            <from>off</from>
            <to>off</to>
            <prob>.98</prob>
        </confusion>
```

APPENDIX A

```
        <confusion>
            <from>off</from>
            <to>on</to>
            <prob>.02</prob>
        </confusion>
        <confusion>
            <from>on</from>
            <to>off</to>
            <prob>.02</prob>
        </confusion>
        <confusion>
            <from>on</from>
            <to>on</to>
            <prob>.98</prob>
        </confusion>
      </trait>
  </traits>
  <tokens>
      <token>
          <comment>Run In</comment>
          <input>6</input>
          <trait>
              <label>classified</label>
              <selection>yes</selection>
          </trait>
          <trait>
              <label>absent</label>
              <selection>no</selection>
          </trait>
          <trait>
              <label>rotate</label>
              <selection>off</selection>
          </trait>
          <trait>
              <label>block</label>
              <selection>down</selection>
          </trait>
          <trait>
              <label>bottom</label>
              <selection>offbottom</selection>
          </trait>
          <trait>
              <label>pump</label>
              <selection>off</selection>
          </trait>
          <trait>
              <label>slips</label>
              <selection>notslips</selection>
          </trait>
          <trait>
              <label>datagap</label>
              <selection>no</selection>
          </trait>
      </token>
      <token>
          <comment>Pull Up, Pump</comment>
          <input>8</input>
          <trait>
              <label>bottom</label>
              <selection>offbottom</selection>
          </trait>
          <trait>
              <label>pump</label>
```

APPENDIX A

```
            <selection>on</selection>
        </trait>
        <trait>
            <label>classified</label>
            <selection>yes</selection>
        </trait>
        <trait>
            <label>rotate</label>
            <selection>off</selection>
        </trait>
        <trait>
            <label>block</label>
            <selection>up</selection>
        </trait>
        <trait>
            <label>absent</label>
            <selection>no</selection>
        </trait>
        <trait>
            <label>slips</label>
            <selection>notslips</selection>
        </trait>
        <trait>
            <label>datagap</label>
            <selection>no</selection>
        </trait>
    </token>
    <token>
        <comment>Slide Drill</comment>
        <input>1</input>
        <trait>
            <label>bottom</label>
            <selection>onbottom</selection>
        </trait>
        <trait>
            <label>rotate</label>
            <selection>off</selection>
        </trait>
        <trait>
            <label>absent</label>
            <selection>no</selection>
        </trait>
        <trait>
            <label>block</label>
            <selection>slow</selection>
        </trait>
        <trait>
            <label>slips</label>
            <selection>notslips</selection>
        </trait>
        <trait>
            <label>pump</label>
            <selection>on</selection>
        </trait>
        <trait>
            <label>classified</label>
            <selection>yes</selection>
        </trait>
        <trait>
            <label>datagap</label>
            <selection>no</selection>
        </trait>
    </token>
```

APPENDIX A

```
<token>
    <comment>Run In, Pump</comment>
    <input>4</input>
    <trait>
        <label>pump</label>
        <selection>on</selection>
    </trait>
    <trait>
        <label>block</label>
        <selection>down</selection>
    </trait>
    <trait>
        <label>bottom</label>
        <selection>offbottom</selection>
    </trait>
    <trait>
        <label>classified</label>
        <selection>yes</selection>
    </trait>
    <trait>
        <label>datagap</label>
        <selection>no</selection>
    </trait>
    <trait>
        <label>absent</label>
        <selection>no</selection>
    </trait>
    <trait>
        <label>rotate</label>
        <selection>off</selection>
    </trait>
    <trait>
        <label>slips</label>
        <selection>notslips</selection>
    </trait>
</token>
<token>
    <comment>Rotate</comment>
    <input>13</input>
    <trait>
        <label>slips</label>
        <selection>notslips</selection>
    </trait>
    <trait>
        <label>datagap</label>
        <selection>no</selection>
    </trait>
    <trait>
        <label>block</label>
        <selection>stop</selection>
    </trait>
    <trait>
        <label>absent</label>
        <selection>no</selection>
    </trait>
    <trait>
        <label>bottom</label>
        <selection>offbottom</selection>
    </trait>
    <trait>
        <label>classified</label>
        <selection>yes</selection>
    </trait>
```

APPENDIX A

```
            <trait>
                <label>pump</label>
                <selection>off</selection>
            </trait>
            <trait>
                <label>rotate</label>
                <selection>on</selection>
            </trait>
        </token>
        <token>
            <comment>Pull Up, Rotate</comment>
            <input>9</input>
            <trait>
                <label>absent</label>
                <selection>no</selection>
            </trait>
            <trait>
                <label>bottom</label>
                <selection>offbottom</selection>
            </trait>
            <trait>
                <label>classified</label>
                <selection>yes</selection>
            </trait>
            <trait>
                <label>slips</label>
                <selection>notslips</selection>
            </trait>
            <trait>
                <label>rotate</label>
                <selection>on</selection>
            </trait>
            <trait>
                <label>pump</label>
                <selection>off</selection>
            </trait>
            <trait>
                <label>block</label>
                <selection>up</selection>
            </trait>
            <trait>
                <label>datagap</label>
                <selection>no</selection>
            </trait>
        </token>
        <token>
            <comment>Data Gap</comment>
            <input>17</input>
            <trait>
                <label>classified</label>
                <selection>yes</selection>
            </trait>
            <trait>
                <label>absent</label>
                <selection>no</selection>
            </trait>
            <trait>
                <label>datagap</label>
                <selection>yes</selection>
            </trait>
        </token>
        <token>
            <comment>Ream</comment>
```

APPENDIX A

```
            <input>3</input>
            <trait>
                <label>block</label>
                <selection>down</selection>
            </trait>
            <trait>
                <label>datagap</label>
                <selection>no</selection>
            </trait>
            <trait>
                <label>rotate</label>
                <selection>on</selection>
            </trait>
            <trait>
                <label>classified</label>
                <selection>yes</selection>
            </trait>
            <trait>
                <label>bottom</label>
                <selection>offbottom</selection>
            </trait>
            <trait>
                <label>slips</label>
                <selection>notslips</selection>
            </trait>
            <trait>
                <label>absent</label>
                <selection>no</selection>
            </trait>
            <trait>
                <label>pump</label>
                <selection>on</selection>
            </trait>
        </token>
        <token>
            <comment>Pump</comment>
            <input>12</input>
            <trait>
                <label>bottom</label>
                <selection>offbottom</selection>
            </trait>
            <trait>
                <label>absent</label>
                <selection>no</selection>
            </trait>
            <trait>
                <label>pump</label>
                <selection>on</selection>
            </trait>
            <trait>
                <label>rotate</label>
                <selection>off</selection>
            </trait>
            <trait>
                <label>classified</label>
                <selection>yes</selection>
            </trait>
            <trait>
                <label>block</label>
                <selection>stop</selection>
            </trait>
            <trait>
                <label>datagap</label>
```

APPENDIX A

```
            <selection>no</selection>
        </trait>
        <trait>
            <label>slips</label>
            <selection>notslips</selection>
        </trait>
    </token>
    <token>
        <comment>Back Ream</comment>
        <input>7</input>
        <trait>
            <label>block</label>
            <selection>up</selection>
        </trait>
        <trait>
            <label>classified</label>
            <selection>yes</selection>
        </trait>
        <trait>
            <label>slips</label>
            <selection>notslips</selection>
        </trait>
        <trait>
            <label>datagap</label>
            <selection>no</selection>
        </trait>
        <trait>
            <label>rotate</label>
            <selection>on</selection>
        </trait>
        <trait>
            <label>pump</label>
            <selection>on</selection>
        </trait>
        <trait>
            <label>absent</label>
            <selection>no</selection>
        </trait>
        <trait>
            <label>bottom</label>
            <selection>offbottom</selection>
        </trait>
    </token>
    <token>
        <comment>Pull Up</comment>
        <input>10</input>
        <trait>
            <label>bottom</label>
            <selection>offbottom</selection>
        </trait>
        <trait>
            <label>datagap</label>
            <selection>no</selection>
        </trait>
        <trait>
            <label>pump</label>
            <selection>off</selection>
        </trait>
        <trait>
            <label>absent</label>
            <selection>no</selection>
        </trait>
        <trait>
```

APPENDIX A

```
            <label>slips</label>
            <selection>notslips</selection>
        </trait>
        <trait>
            <label>classified</label>
            <selection>yes</selection>
        </trait>
        <trait>
            <label>block</label>
            <selection>up</selection>
        </trait>
        <trait>
            <label>rotate</label>
            <selection>off</selection>
        </trait>
    </token>
    <token>
        <comment>Rotate, Pump</comment>
        <input>11</input>
        <trait>
            <label>rotate</label>
            <selection>on</selection>
        </trait>
        <trait>
            <label>pump</label>
            <selection>on</selection>
        </trait>
        <trait>
            <label>block</label>
            <selection>stop</selection>
        </trait>
        <trait>
            <label>datagap</label>
            <selection>no</selection>
        </trait>
        <trait>
            <label>absent</label>
            <selection>no</selection>
        </trait>
        <trait>
            <label>slips</label>
            <selection>notslips</selection>
        </trait>
        <trait>
            <label>classified</label>
            <selection>yes</selection>
        </trait>
        <trait>
            <label>bottom</label>
            <selection>offbottom</selection>
        </trait>
    </token>
    <token>
        <comment>Absent</comment>
        <input>16</input>
        <trait>
            <label>datagap</label>
            <selection>no</selection>
        </trait>
        <trait>
            <label>absent</label>
            <selection>yes</selection>
        </trait>
```

APPENDIX A

```
        <trait>
            <label>classified</label>
            <selection>yes</selection>
        </trait>
    </token>
    <token>
        <comment>InSlips</comment>
        <input>2</input>
        <trait>
            <label>datagap</label>
            <selection>no</selection>
        </trait>
        <trait>
            <label>slips</label>
            <selection>inslips</selection>
        </trait>
        <trait>
            <label>absent</label>
            <selection>no</selection>
        </trait>
        <trait>
            <label>classified</label>
            <selection>yes</selection>
        </trait>
    </token>
    <token>
        <comment>Rotary Drill</comment>
        <input>0</input>
        <trait>
            <label>rotate</label>
            <selection>on</selection>
        </trait>
        <trait>
            <label>bottom</label>
            <selection>onbottom</selection>
        </trait>
        <trait>
            <label>slips</label>
            <selection>notslips</selection>
        </trait>
        <trait>
            <label>block</label>
            <selection>slow</selection>
        </trait>
        <trait>
            <label>classified</label>
            <selection>yes</selection>
        </trait>
        <trait>
            <label>pump</label>
            <selection>on</selection>
        </trait>
        <trait>
            <label>datagap</label>
            <selection>no</selection>
        </trait>
        <trait>
            <label>absent</label>
            <selection>no</selection>
        </trait>
    </token>
    <token>
        <comment>Unclassified</comment>
```

APPENDIX A

```
        <input>15</input>
        <trait>
            <label>datagap</label>
            <selection>no</selection>
        </trait>
        <trait>
            <label>classified</label>
            <selection>no</selection>
        </trait>
        <trait>
            <label>absent</label>
            <selection>no</selection>
        </trait>
    </token>
    <token>
        <comment>Stationary</comment>
        <input>14</input>
        <trait>
            <label>datagap</label>
            <selection>no</selection>
        </trait>
        <trait>
            <label>rotate</label>
            <selection>off</selection>
        </trait>
        <trait>
            <label>absent</label>
            <selection>no</selection>
        </trait>
        <trait>

            <label>bottom</label>
            <selection>offbottom</selection>
        </trait>
        <trait>
            <label>classified</label>
            <selection>yes</selection>
        </trait>
        <trait>
            <label>pump</label>
            <selection>off</selection>
        </trait>
        <trait>
            <label>slips</label>
            <selection>notslips</selection>
        </trait>
        <trait>
            <label>block</label>
            <selection>stop</selection>
        </trait>
    </token>
    <token>
        <comment>Run in, Rotate</comment>
        <input>5</input>
        <trait>
            <label>datagap</label>
            <selection>no</selection>
        </trait>
        <trait>
            <label>slips</label>
            <selection>notslips</selection>
        </trait>
        <trait>
```

APPENDIX A

```
                <label>classified</label>
                <selection>yes</selection>
            </trait>
            <trait>
                <label>absent</label>
                <selection>no</selection>
            </trait>
            <trait>
                <label>block</label>
                <selection>down</selection>
            </trait>
            <trait>
                <label>bottom</label>
                <selection>offbottom</selection>
            </trait>
            <trait>
                <label>rotate</label>
                <selection>on</selection>
            </trait>
            <trait>
                <label>pump</label>
                <selection>off</selection>
            </trait>
        </token>
    </tokens>
    <rulesets>
        <ruleset>
            <label>pre_drill_stand</label>
            <rule>
                <label>lower_to_bottom*12</label>
                <type>lower_to_bottom</type>
                <to>finish</to>
                <prob>1</prob>
                <repeat>12</repeat>
            </rule>
            <rule>
                <label>circulate*60</label>
                <type>circulate</type>
                <to>lower_to_bottom*12</to>
                <prob>1</prob>
                <repeat>60</repeat>
            </rule>
            <rule>
                <label>start</label>
                <type>start</type>
                <to>circulate*60</to>
                <prob>1</prob>
                <repeat>1</repeat>
            </rule>
        </ruleset>
        <ruleset>
            <label>lower_to_bottom</label>
            <rule>
                <label>start</label>
                <type>start</type>
                <to>finish</to>
                <prob>1</prob>
                <repeat>1</repeat>
            </rule>
            <trait>
                <label>slips</label>
                <selection>notslips</selection>
            </trait>
```

APPENDIX A

```
        <trait>
            <label>bottom</label>
            <selection>offbottom</selection>
        </trait>
        <trait>
            <label>pump</label>
            <selection>on</selection>
        </trait>
        <trait>
            <label>block</label>
            <selection>down</selection>
        </trait>
    </ruleset>
    <ruleset>
        <label>run_into_hole</label>
        <rule>
            <label>start</label>
            <type>start</type>
            <to>finish</to>
            <prob>1</prob>
            <repeat>1</repeat>
        </rule>
        <trait>
            <label>pump</label>
            <selection>off</selection>
        </trait>
        <trait>
            <label>rotate</label>
            <selection>off</selection>
        </trait>
        <trait>
            <label>block</label>
            <selection>down</selection>
        </trait>
        <trait>
            <label>bottom</label>
            <selection>offbottom</selection>
        </trait>
        <trait>
            <label>slips</label>
            <selection>notslips</selection>
        </trait>
    </ruleset>
    <ruleset>
        <label>trip_out</label>
        <rule>
            <label>trip_out_stand*100</label>
            <type>trip_out_stand</type>
            <to>finish</to>
            <prob>1</prob>
            <repeat>100</repeat>
        </rule>
        <rule>
            <label>start</label>
            <type>start</type>
            <to>trip_out_stand*100</to>
            <prob>1</prob>
            <repeat>1</repeat>
        </rule>
        <trait>
            <label>bottom</label>
            <selection>offbottom</selection>
        </trait>
```

APPENDIX A

```
        <trait>
            <label>rotate</label>
            <selection>off</selection>
        </trait>
        <trait>
            <label>pump</label>
            <selection>off</selection>
        </trait>
    </ruleset>
    <ruleset>
        <label>trip_out_stand</label>
        <rule>
            <label>pull_out_of_hole*45</label>
            <type>pull_out_of_hole</type>
            <to>lower_into_slips*3</to>
            <prob>.5</prob>
            <repeat>45</repeat>
        </rule>
        <rule>
            <label>pull_out_of_hole*45</label>
            <type>pull_out_of_hole</type>
            <to>in_slips*150</to>
            <prob>.5</prob>
            <repeat>45</repeat>
        </rule>
        <rule>
            <label>in_slips*150</label>
            <type>in_slips</type>
            <to>finish</to>
            <prob>1</prob>
            <repeat>150</repeat>
        </rule>
        <rule>
            <label>start</label>
            <type>start</type>
            <to>pull_out_of_hole*45</to>
            <prob>1</prob>
            <repeat>1</repeat>
        </rule>
        <rule>
            <label>lower_into_slips*3</label>
            <type>lower_into_slips</type>
            <to>in_slips*150</to>
            <prob>1</prob>
            <repeat>3</repeat>
        </rule>
    </ruleset>
    <ruleset>
        <label>trip_in_stand</label>
        <rule>
            <label>run_into_hole*45</label>
            <type>run_into_hole</type>
            <to>finish</to>
            <prob>1</prob>
            <repeat>45</repeat>
        </rule>
        <rule>
            <label>in_slips*150</label>
            <type>in_slips</type>
            <to>run_into_hole*45</to>
            <prob>.5</prob>
            <repeat>150</repeat>
        </rule>
```

APPENDIX A

```
      <rule>
        <label>lift_out_of_slips*3</label>
        <type>lift_out_of_slips</type>
        <to>run_into_hole*45</to>
        <prob>1</prob>
        <repeat>3</repeat>
      </rule>
      <rule>
        <label>start</label>
        <type>start</type>
        <to>in_slips*150</to>
        <prob>1</prob>
        <repeat>1</repeat>
      </rule>
      <rule>
        <label>in_slips*150</label>
        <type>in_slips</type>
        <to>lift_out_of_slips*3</to>
        <prob>.5</prob>
        <repeat>150</repeat>
      </rule>
    </ruleset>
    <ruleset>
      <label>lift_out_of_slips</label>
      <rule>
        <label>start</label>
        <type>start</type>
        <to>finish</to>
        <prob>1</prob>
        <repeat>1</repeat>
      </rule>
      <trait>
        <label>slips</label>
        <selection>notslips</selection>
      </trait>
      <trait>
        <label>rotate</label>
        <selection>off</selection>
      </trait>
      <trait>
        <label>bottom</label>
        <selection>offbottom</selection>
      </trait>
      <trait>
        <label>block</label>
        <selection>up</selection>
      </trait>
    </ruleset>
    <ruleset>
      <label>trip_in</label>
      <rule>
        <label>start</label>
        <type>start</type>
        <to>trip_in_stand*100</to>
        <prob>1</prob>
        <repeat>1</repeat>
      </rule>
      <rule>
        <label>trip_in_stand*100</label>
        <type>trip_in_stand</type>
        <to>finish</to>
        <prob>1</prob>
        <repeat>100</repeat>
```

APPENDIX A

```
    </rule>
    <trait>
      <label>bottom</label>
      <selection>offbottom</selection>
    </trait>
    <trait>
      <label>rotate</label>
      <selection>off</selection>
    </trait>
    <trait>
      <label>pump</label>
      <selection>off</selection>
    </trait>
  </ruleset>
  <ruleset>
    <label>circulate</label>
    <rule>
      <label>start</label>
      <type>start</type>
      <to>finish</to>
      <prob>1</prob>
      <repeat>1</repeat>
    </rule>
    <trait>
      <label>slips</label>
      <selection>notslips</selection>
    </trait>
    <trait>
      <label>pump</label>
      <selection>on</selection>
    </trait>
    <trait>
      <label>bottom</label>
      <selection>offbottom</selection>
    </trait>
    <trait>
      <label>block</label>
      <selection>stop</selection>
    </trait>
  </ruleset>
  <ruleset>
    <label>wipe_up</label>
    <rule>
      <label>start</label>
      <type>start</type>
      <to>finish</to>
      <prob>1</prob>
      <repeat>1</repeat>
    </rule>
    <trait>
      <label>slips</label>
      <selection>notslips</selection>
    </trait>
    <trait>
      <label>pump</label>
      <selection>on</selection>
    </trait>
    <trait>
      <label>bottom</label>
      <selection>offbottom</selection>
    </trait>
    <trait>
      <label>block</label>
```

APPENDIX A

```
            <selection>up</selection>
        </trait>
    </ruleset>
    <ruleset>
        <label>wipe_down</label>
        <rule>
            <label>start</label>
            <type>start</type>
            <to>finish</to>
            <prob>1</prob>
            <repeat>1</repeat>
        </rule>
        <trait>
            <label>slips</label>
            <selection>notslips</selection>
        </trait>
        <trait>
            <label>pump</label>
            <selection>on</selection>
        </trait>
        <trait>
            <label>bottom</label>
            <selection>offbottom</selection>
        </trait>
        <trait>
            <label>block</label>
            <selection>down</selection>
        </trait>
    </ruleset>
    <ruleset>
        <label>lower_into_slips</label>
        <rule>
            <label>start</label>
            <type>start</type>
            <to>finish</to>
            <prob>1</prob>
            <repeat>1</repeat>
        </rule>
        <trait>
            <label>slips</label>
            <selection>notslips</selection>
        </trait>
        <trait>
            <label>rotate</label>
            <selection>off</selection>
        </trait>
        <trait>
            <label>bottom</label>
            <selection>offbottom</selection>
        </trait>
        <trait>
            <label>block</label>
            <selection>down</selection>
        </trait>
    </ruleset>
    <ruleset>
        <label>make_hole</label>
        <rule>
            <label>start</label>
            <type>start</type>
            <to>finish</to>
            <prob>1</prob>
            <repeat>1</repeat>
```

APPENDIX A

```
        </rule>
        <trait>
            <label>slips</label>
            <selection>notslips</selection>
        </trait>
        <trait>
            <label>pump</label>
            <selection>on</selection>
        </trait>
        <trait>
            <label>block</label>
            <selection>slow</selection>
        </trait>
        <trait>
            <label>bottom</label>
            <selection>onbottom</selection>
        </trait>
    </ruleset>
    <ruleset>
        <label>pull_out_of_hole</label>
        <rule>
            <label>start</label>
            <type>start</type>
            <to>finish</to>
            <prob>1</prob>
            <repeat>1</repeat>
        </rule>
        <trait>
            <label>slips</label>
            <selection>notslips</selection>
        </trait>
        <trait>
            <label>rotate</label>
            <selection>off</selection>
        </trait>
        <trait>
            <label>bottom</label>
            <selection>offbottom</selection>
        </trait>
        <trait>
            <label>block</label>
            <selection>up</selection>
        </trait>
        <trait>
            <label>pump</label>
            <selection>off</selection>
        </trait>
    </ruleset>
    <ruleset>
        <label>in_slips</label>
        <rule>
            <label>start</label>
            <type>start</type>
            <to>finish</to>
            <prob>1</prob>
            <repeat>1</repeat>
        </rule>
        <trait>
            <label>bottom</label>
            <selection>offbottom</selection>
        </trait>
        <trait>
            <label>rotate</label>
```

APPENDIX A

```
            <selection>off</selection>
         </trait>
         <trait>
            <label>slips</label>
            <selection>inslips</selection>
         </trait>
      </ruleset>
      <ruleset>
         <label>connect_stand</label>
         <rule>
            <label>start</label>
            <type>start</type>
            <to>finish</to>
            <prob>1</prob>
            <repeat>1</repeat>
         </rule>
         <trait>

            <label>rotate</label>
            <selection>on</selection>
         </trait>
         <trait>
            <label>bottom</label>
            <selection>offbottom</selection>
         </trait>
         <trait>
            <label>pump</label>
            <selection>off</selection>
         </trait>
         <trait>
            <label>slips</label>
            <selection>inslips</selection>
         </trait>
      </ruleset>
      <ruleset>
         <label>drill_rotary</label>
         <rule>
            <label>start</label>
            <type>start</type>
            <to>drill_hole</to>
            <prob>1</prob>
            <repeat>1</repeat>
         </rule>
         <rule>
            <label>drill_hole</label>
            <type>drill_hole</type>
            <to>finish</to>
            <prob>1</prob>
            <repeat>1</repeat>
         </rule>
         <trait>
            <label>rotate</label>
            <selection>on</selection>
         </trait>
      </ruleset>
      <ruleset>
         <label>drill_hole</label>
         <rule>
            <label>wipe_hole</label>
            <type>wipe_hole</type>
            <to>make_hole*270</to>
            <prob>.5</prob>
            <repeat>1</repeat>
```

APPENDIX A

```
    </rule>
    <rule>
       <label>make_hole*270</label>
       <type>make_hole</type>
       <to>circulate*60</to>
       <prob>.4</prob>
       <repeat>270</repeat>
    </rule>
    <rule>
       <label>circulate*60</label>
       <type>circulate</type>
       <to>wipe_hole</to>
       <prob>.3</prob>
       <repeat>60</repeat>
    </rule>
    <rule>
       <label>circulate*60</label>
       <type>circulate</type>
       <to>make_hole*270</to>
       <prob>.5</prob>
       <repeat>60</repeat>
    </rule>
    <rule>
       <label>circulate*60</label>
       <type>circulate</type>
       <to>finish</to>
       <prob>.2</prob>
       <repeat>60</repeat>
    </rule>
    <rule>
       <label>make_hole*270</label>
       <type>make_hole</type>
       <to>finish</to>
       <prob>.3</prob>
       <repeat>270</repeat>
    </rule>
    <rule>
       <label>start</label>
       <type>start</type>
       <to>make_hole*270</to>
       <prob>1</prob>
       <repeat>1</repeat>
    </rule>
    <rule>
       <label>wipe_hole</label>
       <type>wipe_hole</type>
       <to>circulate*60</to>
       <prob>.3</prob>
       <repeat>1</repeat>
    </rule>
    <rule>
       <label>wipe_hole</label>
       <type>wipe_hole</type>
       <to>finish</to>
       <prob>.2</prob>
       <repeat>1</repeat>
    </rule>
    <rule>
       <label>make_hole*270</label>
       <type>make_hole</type>
       <to>wipe_hole</to>
       <prob>.3</prob>
       <repeat>270</repeat>
```

APPENDIX A

```
    </rule>
</ruleset>
<ruleset>
    <label>wipe_hole</label>
    <rule>
        <label>start</label>
        <type>start</type>
        <to>wipe_up*30</to>
        <prob>.2</prob>
        <repeat>1</repeat>
    </rule>
    <rule>
        <label>circulate*3[2]</label>
        <type>circulate</type>
        <to>wipe_down*30</to>
        <prob>1</prob>
        <repeat>3</repeat>
    </rule>
    <rule>
        <label>wipe_down*30</label>
        <type>wipe_down</type>
        <to>finish</to>
        <prob>1</prob>
        <repeat>30</repeat>
    </rule>
    <rule>
        <label>wipe_up*30</label>
        <type>wipe_up</type>
        <to>circulate*3[2]</to>
        <prob>.8</prob>
        <repeat>30</repeat>
    </rule>
    <rule>
        <label>wipe_up*30</label>
        <type>wipe_up</type>
        <to>wipe_down*30</to>
        <prob>.2</prob>
        <repeat>30</repeat>
    </rule>
    <rule>
        <label>start</label>
        <type>start</type>
        <to>circulate*3</to>
        <prob>.8</prob>
        <repeat>1</repeat>
    </rule>
    <rule>
        <label>circulate*3</label>
        <type>circulate</type>
        <to>wipe_up*30</to>
        <prob>1</prob>
        <repeat>3</repeat>
    </rule>
</ruleset>
<ruleset>
    <label>drill_sliding</label>
    <rule>
        <label>start</label>
        <type>start</type>
        <to>drill_hole</to>
        <prob>1</prob>
        <repeat>1</repeat>
    </rule>
```

APPENDIX A

```
   <rule>
      <label>drill_hole</label>
      <type>drill_hole</type>
      <to>finish</to>
      <prob>1</prob>
      <repeat>1</repeat>
   </rule>
   <trait>
      <label>rotate</label>
      <selection>off</selection>
   </trait>
</ruleset>
<ruleset>
   <label>absent</label>
   <rule>
      <label>start</label>
      <type>start</type>
      <to>finish</to>
      <prob>1</prob>
      <repeat>1</repeat>
   </rule>
   <trait>
      <label>absent</label>
      <selection>yes</selection>
   </trait>
</ruleset>
<ruleset>
   <label>drill_well</label>
   <rule>
      <label>start</label>
      <type>start</type>
      <to>trip_out</to>
      <prob>.2</prob>
      <repeat>1</repeat>
   </rule>
   <rule>
      <label>start</label>
      <type>start</type>
      <to>trip_in</to>
      <prob>.4</prob>
      <repeat>1</repeat>
   </rule>
   <rule>
      <label>trip_in</label>
      <type>trip_in</type>
      <to>drill_a_section</to>
      <prob>.8</prob>
      <repeat>1</repeat>
   </rule>
   <rule>
      <label>drill_a_section</label>
      <type>drill_a_section</type>
      <to>finish</to>
      <prob>.4</prob>
      <repeat>1</repeat>
   </rule>
   <rule>
      <label>start</label>
      <type>start</type>
      <to>drill_a_section</to>
      <prob>.4</prob>
      <repeat>1</repeat>
   </rule>
```

APPENDIX A

```
        <rule>
            <label>trip_in</label>
            <type>trip_in</type>
            <to>finish</to>
            <prob>.1</prob>
            <repeat>1</repeat>
        </rule>
        <rule>
            <label>trip_out</label>
            <type>trip_out</type>
            <to>finish</to>
            <prob>.6</prob>
            <repeat>1</repeat>
        </rule>
        <rule>
            <label>trip_out</label>
            <type>trip_out</type>
            <to>trip_in</to>
            <prob>.4</prob>
            <repeat>1</repeat>
        </rule>
        <rule>
            <label>drill_a_section</label>
            <type>drill_a_section</type>
            <to>trip_out</to>
            <prob>.6</prob>
            <repeat>1</repeat>
        </rule>
        <rule>
            <label>trip_in</label>
            <type>trip_in</type>
            <to>trip_out</to>
            <prob>.1</prob>
            <repeat>1</repeat>
        </rule>
        <trait>
            <label>classified</label>
            <selection>yes</selection>
        </trait>
        <trait>
            <label>datagap</label>
            <selection>no</selection>
        </trait>
        <trait>
            <label>absent</label>
            <selection>no</selection>
        </trait>
    </ruleset>
    <ruleset>
        <label>drill_a_section</label>
        <rule>
            <label>pre_drill_stand</label>
            <type>pre_drill_stand</type>
            <to>drill_stand</to>
            <prob>1</prob>
            <repeat>1</repeat>
        </rule>
        <rule>
            <label>start</label>
            <type>start</type>
            <to>pre_drill_stand</to>
            <prob>1</prob>
            <repeat>1</repeat>
```

APPENDIX A

```
    </rule>
    <rule>
      <label>add_stand</label>
      <type>add_stand</type>
      <to>pre_drill_stand</to>
      <prob>.9</prob>
      <repeat>1</repeat>
    </rule>
    <rule>
      <label>drill_stand</label>
      <type>drill_stand</type>
      <to>pre_add_stand</to>
      <prob>.9</prob>
      <repeat>1</repeat>
    </rule>
    <rule>
      <label>drill_stand</label>
      <type>drill_stand</type>
      <to>finish</to>
      <prob>.1</prob>
      <repeat>1</repeat>
    </rule>
    <rule>
      <label>pre_add_stand</label>
      <type>pre_add_stand</type>
      <to>add_stand</to>
      <prob>1</prob>
      <repeat>1</repeat>
    </rule>
    <rule>
      <label>add_stand</label>
      <type>add_stand</type>
      <to>finish</to>
      <prob>.1</prob>
      <repeat>1</repeat>
    </rule>
  </ruleset>
  <ruleset>
    <label>drill_stand</label>
    <rule>
      <label>start</label>
      <type>start</type>
      <to>drill_sliding</to>
      <prob>.5</prob>
      <repeat>1</repeat>
    </rule>
    <rule>
      <label>drill_sliding</label>
      <type>drill_sliding</type>
      <to>finish</to>
      <prob>.3</prob>
      <repeat>1</repeat>
    </rule>
    <rule>
      <label>drill_rotary</label>
      <type>drill_rotary</type>
      <to>finish</to>
      <prob>.3</prob>
      <repeat>1</repeat>
    </rule>
    <rule>
      <label>drill_sliding</label>
      <type>drill_sliding</type>
```

APPENDIX A

```
            <to>drill_rotary</to>
            <prob>.7</prob>
            <repeat>1</repeat>
        </rule>
        <rule>
            <label>drill_rotary</label>
            <type>drill_rotary</type>
            <to>drill_sliding</to>
            <prob>.7</prob>
            <repeat>1</repeat>
        </rule>
        <rule>
            <label>start</label>
            <type>start</type>
            <to>drill_rotary</to>
            <prob>.5</prob>
            <repeat>1</repeat>
        </rule>
    </ruleset>
    <ruleset>
        <label>add_stand</label>
        <rule>
            <label>start</label>
            <type>start</type>
            <to>lower_into_slips*4</to>
            <prob>.8</prob>
            <repeat>1</repeat>
        </rule>
        <rule>
            <label>lower_into_slips*4</label>
            <type>lower_into_slips</type>
            <to>in_slips*120</to>
            <prob>1</prob>
            <repeat>4</repeat>
        </rule>
        <rule>
            <label>in_slips*225</label>
            <type>in_slips</type>
            <to>lift_out_of_slips*7</to>
            <prob>1</prob>
            <repeat>225</repeat>
        </rule>
        <rule>
            <label>connect_stand*24</label>
            <type>connect_stand</type>
            <to>in_slips*225</to>
            <prob>1</prob>
            <repeat>24</repeat>
        </rule>
        <rule>
            <label>in_slips*120</label>
            <type>in_slips</type>
            <to>in_slips*225</to>
            <prob>.5</prob>
            <repeat>120</repeat>
        </rule>
        <rule>
            <label>lift_out_of_slips*7</label>
            <type>lift_out_of_slips</type>
            <to>finish</to>
            <prob>1</prob>
            <repeat>7</repeat>
        </rule>
```

APPENDIX A

```
        <rule>
            <label>start</label>
            <type>start</type>
            <to>in_slips*120</to>
            <prob>.2</prob>
            <repeat>1</repeat>
        </rule>
        <rule>
            <label>in_slips*120</label>
            <type>in_slips</type>
            <to>connect_stand*24</to>
            <prob>.5</prob>
            <repeat>120</repeat>
        </rule>
    </ruleset>
    <ruleset>
        <label>pre_add_stand</label>
        <rule>
            <label>start</label>
            <type>start</type>
            <to>wipe_hole*3</to>
            <prob>1</prob>
            <repeat>1</repeat>
        </rule>
        <rule>
            <label>wipe_hole*3</label>
            <type>wipe_hole</type>
            <to>finish</to>
            <prob>1</prob>
            <repeat>3</repeat>
        </rule>
    </ruleset>
    <ruleset>
        <label>unclassified</label>
        <rule>
            <label>start</label>
            <type>start</type>
            <to>finish</to>
            <prob>1</prob>
            <repeat>1</repeat>
        </rule>
        <trait>
            <label>classified</label>
            <selection>no</selection>
        </trait>
    </ruleset>
    <ruleset>
        <label>datagap</label>
        <rule>
            <label>start</label>
            <type>start</type>
            <to>finish</to>
            <prob>1</prob>
            <repeat>1</repeat>
        </rule>
        <trait>
            <label>datagap</label>
            <selection>yes</selection>
        </trait>
    </ruleset>
    <ruleset>
        <label>meta</label>
        <rule>
```

APPENDIX A

```
            <label>start</label>
            <type>start</type>
            <to>absent</to>
            <prob>.2</prob>
            <repeat>1</repeat>
        </rule>
        <rule>
            <label>unknown</label>
            <type>unknown</type>
            <to>finish</to>
            <prob>1</prob>
            <repeat>1</repeat>
        </rule>
        <rule>
            <label>start</label>
            <type>start</type>
            <to>unclassified</to>
            <prob>.3</prob>
            <repeat>1</repeat>
        </rule>
        <rule>
            <label>start</label>
            <type>start</type>
            <to>unknown</to>
            <prob>.4</prob>
            <repeat>1</repeat>
        </rule>
        <rule>
            <label>absent</label>
            <type>absent</type>
            <to>finish</to>
            <prob>1</prob>
            <repeat>1</repeat>
        </rule>
        <rule>
            <label>start</label>
            <type>start</type>
            <to>datagap</to>
            <prob>.1</prob>
            <repeat>1</repeat>
        </rule>
        <rule>
            <label>unclassified</label>
            <type>unclassified</type>
            <to>finish</to>
            <prob>1</prob>
            <repeat>1</repeat>
        </rule>
        <rule>
            <label>datagap</label>
            <type>datagap</type>
            <to>finish</to>
            <prob>1</prob>
            <repeat>1</repeat>
        </rule>
    </ruleset>
    <ruleset>
        <label>unknown</label>
        <rule>
            <label>start</label>
            <type>start</type>
            <to>finish</to>
            <prob>1</prob>
```

APPENDIX A

```
            <repeat>1</repeat>
        </rule>
    </ruleset>
    <ruleset>
        <label>_top</label>
        <rule>
            <label>meta</label>
            <type>meta</type>
            <to>finish</to>
            <prob>.1</prob>
            <repeat>1</repeat>
        </rule>
        <rule>
            <label>drill_well</label>
            <type>drill_well</type>
            <to>meta</to>
            <prob>.5</prob>
            <repeat>1</repeat>
        </rule>
        <rule>
            <label>drill_well</label>
            <type>drill_well</type>
            <to>finish</to>
            <prob>.5</prob>
            <repeat>1</repeat>
        </rule>
        <rule>
            <label>meta</label>
            <type>meta</type>
            <to>meta</to>
            <prob>.1</prob>
            <repeat>1</repeat>
        </rule>
        <rule>
            <label>start</label>
            <type>start</type>
            <to>meta</to>
            <prob>.5</prob>
            <repeat>1</repeat>
        </rule>
        <rule>
            <label>meta</label>
            <type>meta</type>
            <to>drill_well</to>
            <prob>.8</prob>
            <repeat>1</repeat>
        </rule>
        <rule>
            <label>start</label>
            <type>start</type>
            <to>drill_well</to>
            <prob>.5</prob>
            <repeat>1</repeat>
        </rule>
    </ruleset>
</rulesets>
</grammar>
```

APPENDIX B

INTERPRETATION PROGRAM CODE GENERATOR

```
package com.slb.ontology.protege.drillingstates;
//import edu.stanford.smi.protege.model.Cls;
import edu.stanford.smi.protege.model.FrameID;
import edu.stanford.smi.protegex.owl.model.RDFProperty;
import edu.stanford.smi.protegex.owl.model.impl.DefaultRDFIndividual;
import edu.stanford.smi.protegex.owl.model.*;
import edu.stanford.smi.protege.resource.Icons;
import edu.stanford.smi.protege.util.*;
import edu.stanford.smi.protege.widget.AbstractTabWidget;
import java.awt.*;
import java.awt.event.*;
import java.io.*;
import java.text.DecimalFormat;
import javax.swing.*;
import java.text.SimpleDateFormat;
import java.util.*;
import java.util.Collections;
public class DrillingStates extends AbstractTabWidget {

  JTextField exportFileNameField;
  JTextArea exportContents;
  BufferedWriter exportFile;
  String newline = System.getProperty("line.separator");
  OWLIndividual startActivity;
  int DEBUGCounter = 0;
  int TRACEamountOfTracingForConfigurationProbabilities = 0;
  int TRACEmaxAmountOfTracingForConfigurationProbabilities = 200;
  DecimalFormat decimalFormat = new DecimalFormat("0.000000");
  boolean trace = true;

  OWLModel owlModel;

  final String instructions = "Please select a file for storing the drilling grammar by clicking on the folder icon at
the top right of the window. Then click on \"EXPORT\" when you're ready.\n";

  public DrillingStates() {
  }

  public void initialize() {
    setLabel("DrillingStates");

    owlModel = (OWLModel)getKnowledgeBase();

    setLayout(new BorderLayout(6, 6));

    JSplitPane leftSplitPane = ComponentFactory.createLeftRightSplitPane();
    add(leftSplitPane, BorderLayout.CENTER);
    leftSplitPane.setLeftComponent(getImportFilePanel());
  }

  JComponent getImportFilePanel() {

    JPanel dneFilePanel = new JPanel(new BorderLayout());
    JPanel contentsPanel = new JPanel(new BorderLayout());
    JPanel selectionPanel = new JPanel(new BorderLayout());

    Box filePanel = Box.createVerticalBox();

    JPanel ofilePanel = new JPanel(new BorderLayout());
```

APPENDIX B

```
      exportFileNameField = new JTextField();
      ofilePanel.add(exportFileNameField, BorderLayout.CENTER);

      final LabeledComponent exportFileNameLabel = new LabeledComponent("Code generation file",
ofilePanel);
      exportFileNameLabel.addHeaderButton(new AbstractAction("browse", Icons.getOpenProjectIcon()) {
        public void actionPerformed(ActionEvent ae) {
          JFileChooser chooser = ComponentFactory.createFileChooser("Prolog (PL) File", ".pl");
          int rval = chooser.showSaveDialog(exportFileNameLabel);
          if (rval == JFileChooser.APPROVE_OPTION) {
            if (chooser.getSelectedFile().exists()) {
              JFrame frame = new JFrame();
              Object[] options = {"Yes","No"};
              if (JOptionPane.showOptionDialog(frame,"Overwrite file
"+chooser.getSelectedFile().getPath()+"?","Export file chosen already exists",

JOptionPane.OK_CANCEL_OPTION,JOptionPane.WARNING_MESSAGE,null,options,options[1]) == 0) {
                exportFileNameField.setText(chooser.getSelectedFile().getPath());
              } else {
                exportFileNameField.setText("");
              }
            } else {
              exportFileNameField.setText(chooser.getSelectedFile().getPath());
            }
          } else {
            exportFileNameField.setText("");
          }
        }
      });

      filePanel.add(exportFileNameLabel);
      selectionPanel.add(filePanel, BorderLayout.CENTER);

      JPanel commandPanel = new JPanel(new GridLayout(1, 0));
      JButton importButton = new JButton("EXPORT");
      importButton.addActionListener(new ActionListener() {
        public void actionPerformed(ActionEvent e) {
          try {
            generateCode();
          } catch (Exception exp) {
            System.out.println(exp.getMessage());
          }
        }
      });
      commandPanel.add(importButton);

      selectionPanel.add(commandPanel, BorderLayout.SOUTH);
      contentsPanel.add(selectionPanel, BorderLayout.NORTH);
      exportContents = new JTextArea(10, 35);
      exportContents.setTabSize(2);
      exportContents.setLineWrap(true);
      exportContents.setWrapStyleWord(true);
      exportContents.setText(instructions);
      LabeledComponent contentsLC = new LabeledComponent("Information panel", new
JScrollPane(exportContents));
      contentsPanel.add(contentsLC, BorderLayout.CENTER);
      dneFilePanel.add(contentsPanel, BorderLayout.CENTER);

      return dneFilePanel;
    }

    void generateCode() throws IOException {
```

APPENDIX B

```
        String exportFileName = exportFileNameField.getText();
//      if (exportFileName.equals("")) {
//          exportContents.setText("Notice: You need to select a file for storing the drilling grammar. Please select
one by clicking on the folder icon at the top right of the window.\n");
//          return;
//      }
        exportContents.setText("Generating code: "+exportFileName+" ... started:\n\n");
        try {
//          generateCodeText(exportFileName);
            trace("\nGenerating code: "+exportFileName+" ... completed\n");
            OWLIndividual topActivity = getOneInstance("TopActivity");
            DEBUGCounter = 0;

            Collection activityTypes = getInstances("ActivityType",true);
            trace("BEGIN"+newline);
            System.out.print("BEGIN"+newline);
            trace("BEGIN NAME OF ACTIVITIES ("+(activityTypes.size()-2)+")"+newline);
            System.out.println("BEGIN NAME OF ACTIVITIES ("+(activityTypes.size()-2)+")"+newline);
            String repeat = "1";
            for (Iterator sk = activityTypes.iterator(); sk.hasNext();) {
                OWLIndividual activityType = (OWLIndividual)sk.next();
                if (activityType.getRDFType().getName().equals("RepeatedActivityType")){
                    repeat = getDatatypePropertyValue(activityType,"hasRepetitionFactor");
                    activityType = getOneObjectPropertyValue(activityType,"repeatsActivityType");
                } else {
                    repeat = "1";
                }
                if
(!getDatatypePropertyValue(activityType,"hasConfigurationName").equals("start")&&!getDatatypePropertyValue(
activityType,"hasConfigurationName").equals("finish")){
                    trace(getDatatypePropertyValue(activityType,"hasConfigurationName"));
                    if (!repeat.equals("1")) trace("*"+repeat);
                    trace(newline);
                }
            }
            trace("END NAME OF ACTIVITIES"+newline);

            trace("BEGIN STUDYING THE GRAMMAR OF ACTIVITIES"+newline);
            System.out.print("BEGIN STUDYING THE GRAMMAR OF ACTIVITIES"+newline);
            ArrayList verticalActivitiesTracking=new ArrayList();
            FinalActivities verticalFinalActivitiesList=new FinalActivities();
            Collection virtualSubActivities = getInstances("VirtualSubActivity",true);
            int startActivityNumber = 0;
            int finishActivityNumber = 0;
            int virtualSubActivityNumbering = 0;
            for (Iterator mt = virtualSubActivities.iterator(); mt.hasNext();) {
                OWLIndividual virtualSubActivity = (OWLIndividual)mt.next();
                if (getDatatypePropertyValue(virtualSubActivity,"hasConfigurationName").equals("start")) {
                    startActivity = virtualSubActivity;
                    startActivityNumber = virtualSubActivityNumbering;
                }
                if (getDatatypePropertyValue(virtualSubActivity,"hasConfigurationName").equals("finish"))
finishActivityNumber = virtualSubActivityNumbering;
                ArrayList a = new ArrayList();
                a.add(topActivity);
                a.add(virtualSubActivity);
                verticalFinalActivitiesList.finalActivities.add("
"+getDatatypePropertyValue(topActivity,"hasConfigurationName")+"
"+getDatatypePropertyValue(virtualSubActivity,"hasConfigurationName"));
                verticalFinalActivitiesList.finalActivitiesInstances.add(a);
                virtualSubActivityNumbering++;
            }
```

APPENDIX B

```
        FinalActivities currentFinalActivities=new FinalActivities();
        currentFinalActivities.finalActivities.add("
"+getDatatypePropertyValue(topActivity,"hasConfigurationName")+" start");
        currentFinalActivities.finalProbabilities.add("");
        currentFinalActivities.fromFinish.add(false);
        ArrayList stateTransitions=new ArrayList();

goDownActivities(topActivity,verticalActivitiesTracking,verticalFinalActivitiesList,currentFinalActivities,stateTransit
ions,"",false);
        trace("END STUDYING THE GRAMMAR OF ACTIVITIES"+newline);

        trace("BEGIN LIST OF VERTICAL FINAL ACTIVITIES
("+verticalFinalActivitiesList.finalActivities.size()+")"+newline);
        System.out.print("BEGIN LIST OF VERTICAL FINAL ACTIVITIES
("+verticalFinalActivitiesList.finalActivities.size()+")"+newline);
        for (int i=0;i<verticalFinalActivitiesList.finalActivities.size();i++)
trace((""+i/1000)+(""+i/100)+(""+i/10)+(""+i%10)+verticalFinalActivitiesList.finalActivities.get(i)+newline);
        trace("END LIST OF VERTICAL FINAL ACTIVITIES"+newline);

        trace("BEGIN LIST OF VERTICAL FINAL ACTIVITIES CONFIGURATIONS
("+verticalFinalActivitiesList.finalActivities.size()+")"+newline);
        System.out.print("BEGIN LIST OF VERTICAL FINAL ACTIVITIES CONFIGURATIONS
("+verticalFinalActivitiesList.finalActivities.size()+")"+newline);
        ArrayList configurationVariables = new ArrayList();
        for (int i=0;i<verticalFinalActivitiesList.finalActivities.size();i++) {
          trace((""+i/1000)+(""+i/100)+(""+i/10)+(""+i%10)+verticalFinalActivitiesList.finalActivities.get(i)+newline);
          ArrayList verticalFinalActivityHierarchy =
(ArrayList)verticalFinalActivitiesList.finalActivitiesInstances.get(i);
          for (int j=verticalFinalActivityHierarchy.size()-1;j>=0;j--){
            OWLIndividual activity = (OWLIndividual)verticalFinalActivityHierarchy.get(j);
            OWLIndividual activityType = getOneObjectPropertyValue(activity,"hasActivityType");
            if (activityType.getRDFType().getName().equals("RepeatedActivityType")){
              repeat = getDatatypePropertyValue(activityType,"hasRepetitionFactor");
              activityType = getOneObjectPropertyValue(activityType,"repeatsActivityType");
            }
            Collection configurations = getObjectPropertyValues(activityType,"containsConfiguration");
            if (!configurations.isEmpty()) trace("   "+activity.getName()+" "+activityType.getName());
            for (Iterator jt = configurations.iterator(); jt.hasNext();) {
              OWLIndividual configuration = (OWLIndividual)jt.next();
              boolean isAlreadyThere = false;
              for (int aa=0;aa<configurationVariables.size();aa++){
                if
(((ConfigurationVariable)configurationVariables.get(aa)).instance==getOneObjectPropertyValue(configuration,"h
asConfigurationVariable")){
                  if
(!((ConfigurationVariable)configurationVariables.get(aa)).values.contains(getOneObjectPropertyValue(configurati
on,"hasConfigurationValue"))){

((ConfigurationVariable)configurationVariables.get(aa)).values.add(getOneObjectPropertyValue(configuration,"ha
sConfigurationValue"));

((ConfigurationVariable)configurationVariables.get(aa)).probabilities.add(getDatatypePropertyValue(configuration
,"hasConfigurationProbability"));
                  }
                  isAlreadyThere = true;
                }
              }
              if (!isAlreadyThere) {
                ConfigurationVariable newConfigurationVariable = new ConfigurationVariable();
                newConfigurationVariable.instance =
getOneObjectPropertyValue(configuration,"hasConfigurationVariable");
```

APPENDIX B

```
newConfigurationVariable.values.add(getOneObjectPropertyValue(configuration,"hasConfigurationValue"));

newConfigurationVariable.probabilities.add(getDatatypePropertyValue(configuration,"hasConfigurationProbability
"));
                configurationVariables.add(newConfigurationVariable);
            }
            trace("
"+getDatatypePropertyValue(getOneObjectPropertyValue(configuration,"hasConfigurationVariable"),"hasConfigu
rationName")+"="

+getDatatypePropertyValue(getOneObjectPropertyValue(configuration,"hasConfigurationValue"),"hasConfigurati
onName"));
          }
          if (!configurations.isEmpty()) trace(newline);
        }
      }
      trace("END LIST OF VERTICAL FINAL ACTIVITIES CONFIGURATIONS"+newline);

      Collection tokens = getInstances("Token",true);
      trace("BEGIN TOKENS ("+tokens.size()+") vs CONFIGURATIONS [negative value shows ranges of
values]"+newline);
      System.out.print("BEGIN TOKENS ("+tokens.size()+") vs CONFIGURATIONS [negative value shows
ranges of values]"+newline);
      ArrayList tokenConfigurations = new ArrayList();
      for (Iterator jt = tokens.iterator(); jt.hasNext();) {
        OWLIndividual token = (OWLIndividual)jt.next();
        TokenConfiguration tokenConfiguration = new TokenConfiguration();
        String name = getDatatypePropertyValue(token,"hasTokenName");
        Boolean notYetInserted = true;
        for (int i=0;i<tokenConfigurations.size();i++){
          if (((TokenConfiguration)tokenConfigurations.get(i)).name.compareTo(name)>0){
            tokenConfigurations.add(i,tokenConfiguration);
            notYetInserted = false;
            break;
          }
        }
        if (notYetInserted)tokenConfigurations.add(tokenConfiguration);
        tokenConfiguration.name = getDatatypePropertyValue(token,"hasTokenName");
        tokenConfiguration.value = Integer.parseInt(getDatatypePropertyValue(token,"hasTokenValue"));
        trace(tokenConfiguration.name+" ("+tokenConfiguration.value+")");
        int configurationValues[] = new int[configurationVariables.size()];
        for (int i =0;i<configurationVariables.size();i++) configurationValues[i] = 0;
        Collection configurations = getObjectPropertyValues(token,"mapsToConfiguration");
        for (Iterator mu = configurations.iterator(); mu.hasNext();) {
          OWLIndividual configuration = (OWLIndividual)mu.next();
          OWLIndividual configurationVariable =
getOneObjectPropertyValue(configuration,"hasConfigurationVariable");
          for (int i=0;i<configurationVariables.size();i++){
            if (((ConfigurationVariable)configurationVariables.get(i)).instance==configurationVariable){
            for (int j=0;j<((ConfigurationVariable)configurationVariables.get(i)).values.size();j++){
              if
(((ConfigurationVariable)configurationVariables.get(i)).values.get(j)==getOneObjectPropertyValue(configuration,"
hasConfigurationValue")){
                configurationValues[i] = j+1;
              }
            }
          }
        }
      }
      for (int i =0;i<configurationValues.length;i++){
        if (configurationValues[i]==0){
          configurationValues[i] = -((ConfigurationVariable)configurationVariables.get(i)).values.size();
```

APPENDIX B

```
            }
          }
          trace(": ");
          tokenConfiguration.configuration = configurationValues;
          for (int i =0;i<configurationValues.length;i++){
trace(getDatatypePropertyValue(((ConfigurationVariable)configurationVariables.get(i)).instance,"hasConfiguratio
nName")+"=");
            trace(configurationValues[i]+" ");
          }
          trace(newline);
        }
        trace("---- Check configurations vs tokens, whether two tokens have the same configuration"+newline);
        boolean twoTokensHaveSameConfiguration = false;
        for (int i=0;i<tokenConfigurations.size();i++){
          TokenConfiguration iTokenConfiguration = (TokenConfiguration)tokenConfigurations.get(i);
          for (int j=0;j<i;j++){
            TokenConfiguration jTokenConfiguration = (TokenConfiguration)tokenConfigurations.get(j);
            Boolean allEquals = true;
            for (int k=0;k<iTokenConfiguration.configuration.length;k++){
              if (iTokenConfiguration.configuration[k]>0&&jTokenConfiguration.configuration[k]>0){
                if (iTokenConfiguration.configuration[k]!=jTokenConfiguration.configuration[k]){
                  allEquals = false;
                }
              }
            }
            if (allEquals) {
              trace("----- tokens "+iTokenConfiguration.name+" and "+jTokenConfiguration.name+" have
intersecting configurations"+newline);
              twoTokensHaveSameConfiguration = true;
            }
          }
        }
        if (!twoTokensHaveSameConfiguration){
          trace("---- Configurations vs tokens check OK: no two tokens have the same configuration"+newline);
        } else {
          trace("ERROR grammar generation abort: there are two tokens with the same configuration"+newline);
          throw(new RuntimeException("grammar generation abort: there are two tokens with the same
configuration"));
        }
        trace("END TOKENS vs CONFIGURATIONS"+newline);

        trace("BEGIN MATRIX OF VERTICAL FINAL ACTIVITIES CONFIGURATIONS
("+verticalFinalActivitiesList.finalActivities.size()+"x"+configurationVariables.size()+") [negative values show
ranges of values]"+newline);
        System.out.print("BEGIN MATRIX OF VERTICAL FINAL ACTIVITIES CONFIGURATIONS
("+verticalFinalActivitiesList.finalActivities.size()+"x"+configurationVariables.size()+") [negative values show
ranges of values]"+newline);
        int matrixOfVerticalFinalActivitiesConfigurations[][] = new
int[verticalFinalActivitiesList.finalActivities.size()][configurationVariables.size()];
        for (int i=0;i<verticalFinalActivitiesList.finalActivities.size();i++) {
          trace((""+i/1000)+(""+i/100)+(""+i/10)+(""+i%10)+verticalFinalActivitiesList.finalActivities.get(i)+":");
          for (int cv=0;cv<configurationVariables.size();cv++){
            int configurationValue = 0;
            ArrayList verticalFinalActivityHierarchy =
(ArrayList)verticalFinalActivitiesList.finalActivitiesInstances.get(i);
            for (int j=verticalFinalActivityHierarchy.size()-1;j>=0;j--){
              OWLIndividual activity = (OWLIndividual)verticalFinalActivityHierarchy.get(j);
              OWLIndividual activityType = getOneObjectPropertyValue(activity,"hasActivityType");
              if (activityType.getRDFType().getName().equals("RepeatedActivityType")){
                repeat = getDatatypePropertyValue(activityType,"hasRepetitionFactor");
                activityType = getOneObjectPropertyValue(activityType,"repeatsActivityType");
```

APPENDIX B

```
                    }
                    Collection configurations = getObjectPropertyValues(activityType,"containsConfiguration");
                    for (Iterator jt = configurations.iterator(); jt.hasNext();) {
                       OWLIndividual configuration = (OWLIndividual)jt.next();
                       if
(getOneObjectPropertyValue(configuration,"hasConfigurationVariable")==((ConfigurationVariable)configurationV
ariables.get(cv)).instance){
                          int iValue = 0;
                          for (int uu=0;uu<((ConfigurationVariable)configurationVariables.get(cv)).values.size();uu++){
                             if
(getOneObjectPropertyValue(configuration,"hasConfigurationValue")==(((ConfigurationVariable)configurationVari
ables.get(cv)).values.get(uu))){
                                iValue = uu+1;
                             }
                          }
                          if (configurationValue==0||configurationValue==iValue){
                             configurationValue = iValue;
                          } else {
                             trace("ERROR DrillingStates abort: incompatible configuration for
"+verticalFinalActivitiesList.finalActivities.get(i));
                             throw(new RuntimeException("DrillingStates abort: incompatible configuration for
"+verticalFinalActivitiesList.finalActivities.get(i)));
                          }
                       }
                    }
                 }
                 if (configurationValue==0) configurationValue = -
((ConfigurationVariable)configurationVariables.get(cv)).values.size();
                 trace("
"+getDatatypePropertyValue(((ConfigurationVariable)configurationVariables.get(cv)).instance,"hasConfiguration
Name")+" = "+configurationValue);
                 matrixOfVerticalFinalActivitiesConfigurations[i][cv]=configurationValue;
              }
              trace(newline);
           }
           trace("Matrix of Vertical Final Activities Configurations:");
           for (int i=0;i<verticalFinalActivitiesList.finalActivities.size();i++){
              if (i!=0)trace(" ");
              trace("("+i+")[");
              for (int j=0;j<configurationVariables.size();j++){
                 trace(""+matrixOfVerticalFinalActivitiesConfigurations[i][j]);
                 if (j!=configurationVariables.size()-1)trace(",");
              }
              trace("]");
           }
           trace(newline);
           trace("END MATRIX OF VERTICAL FINAL ACTIVITIES CONFIGURATIONS"+newline);

           trace("BEGIN CONFUSION MATRICES (for any event, what is actually observed may not actually be the
token of that event, thanks to confusion)"+newline);
           System.out.print("BEGIN CONFUSION MATRICES (for any event, what is actually observed may not
actually be the token of that event, thanks to confusion)"+newline);
           for (int cv=0;cv<configurationVariables.size();cv++){

trace(getDatatypePropertyValue(((ConfigurationVariable)configurationVariables.get(cv)).instance,"hasConfigurati
onName")+newline);
              double confusionMatrix[][] = new
double[((ConfigurationVariable)configurationVariables.get(cv)).values.size()][((ConfigurationVariable)configuratio
nVariables.get(cv)).values.size()];
              for (int ai=0;ai<((ConfigurationVariable)configurationVariables.get(cv)).values.size();ai++){
                 trace("from "+
getDatatypePropertyValue((OWLIndividual)((ConfigurationVariable)configurationVariables.get(cv)).values.get(ai),
```

APPENDIX B

```
"hasConfigurationName"));
                for (int bi=0;bi<((ConfigurationVariable)configurationVariables.get(cv)).values.size();bi++){
                    trace(" to "+
getDatatypePropertyValue((OWLIndividual)((ConfigurationVariable)configurationVariables.get(cv)).values.get(bi),
"hasConfigurationName")+":");
                    Collection confusions =
getObjectPropertyValues(((ConfigurationVariable)configurationVariables.get(cv)).instance,"hasConfusion");
                    for (Iterator jt = confusions.iterator(); jt.hasNext();) {
                        OWLIndividual confusion = (OWLIndividual)jt.next();
                        if
(getOneObjectPropertyValue(confusion,"isConfusionFrom")==((ConfigurationVariable)configurationVariables.get(
cv)).values.get(ai)&&

getOneObjectPropertyValue(confusion,"isConfusionTo")==((ConfigurationVariable)configurationVariables.get(cv)
).values.get(bi)){
                            trace(" "+getDatatypePropertyValue(confusion,"hasConfusionProbability"));
                            confusionMatrix[ai][bi] =
Float.parseFloat(getDatatypePropertyValue(confusion,"hasConfusionProbability"));
                        }
                    }
                }
                trace(newline);
            }
            ((ConfigurationVariable)configurationVariables.get(cv)).confusionMatrix = confusionMatrix;
            for (int i=0;i<((ConfigurationVariable)configurationVariables.get(cv)).values.size();i++){
                trace("[");
                for (int j=0;j<((ConfigurationVariable)configurationVariables.get(cv)).values.size();j++){
                    trace(""+decimalFormat.format(confusionMatrix[i][j]));
                    if(j!=((ConfigurationVariable)configurationVariables.get(cv)).values.size()-1) trace(",");
                }
                trace("]");
            }
            trace(newline);
        }
        trace("END CONFUSION MATRICES"+newline);

        trace("BEGIN PROBABILITIES OF OBSERVING A GIVEN TOKEN GIVEN A VERTICAL FINAL
ACTIVITY"+newline);
        System.out.print("BEGIN PROBABILITIES OF OBSERVING A GIVEN TOKEN GIVEN A VERTICAL
FINAL ACTIVITY"+newline);
        trace("Token names, in order: ");
        for (int i=0;i<tokenConfigurations.size();i++)
trace("("+i+")"+((TokenConfiguration)tokenConfigurations.get(i)).name);
        trace(newline);
        double matrixActivitiesTokens[][] = new
double[verticalFinalActivitiesList.finalActivities.size()][tokenConfigurations.size()];
        for (int i=0;i<verticalFinalActivitiesList.finalActivities.size();i++) for (int j=0;j<tokenConfigurations.size();j++)
matrixActivitiesTokens[i][j]=0;
        TRACEamountOfTracingForConfigurationProbabilities = 0;
        for (int i=0;i<verticalFinalActivitiesList.finalActivities.size();i++) {
//            System.out.println("DEBUG: "+verticalFinalActivitiesList.finalActivities.get(i));
            trace((""+i/1000)+(""+i/100)+(""+i/10)+(""+i%10)+verticalFinalActivitiesList.finalActivities.get(i)+"
Configuration =");
            for (int j=0;j<configurationVariables.size();j++) trace("
"+matrixOfVerticalFinalActivitiesConfigurations[i][j]);
            trace(newline);
            if (i!=startActivityNumber&&i!=finishActivityNumber)
computeProbabilitiesOfAllActualConfigurations(matrixActivitiesTokens[i],matrixOfVerticalFinalActivitiesConfigurat
ions[i],0,matrixOfVerticalFinalActivitiesConfigurations[i],configurationVariables,tokenConfigurations,true);
            trace("     Token probabilities for configuration [");
            for (int j=0;j<configurationVariables.size();j++) trace("
"+matrixOfVerticalFinalActivitiesConfigurations[i][j]);
```

APPENDIX B

```
            trace("]");
            for (int j=0;j<matrixActivitiesTokens[i].length;j++) trace("
"+decimalFormat.format(matrixActivitiesTokens[i][j]));
            double sumProbs = 0;
            for (int j=0;j<matrixActivitiesTokens[i].length;j++) sumProbs += matrixActivitiesTokens[i][j];
            trace(" sum="+decimalFormat.format(sumProbs));
            trace(newline);

        }
        trace("Matrix [number of vertical final activities] [number of tokens]:"+newline);
        trace("Token names, in order: ");
        for (int i=0;i<tokenConfigurations.size();i++)
trace("("+i+")"+((TokenConfiguration)tokenConfigurations.get(i)).name);
        trace(newline);
/*          double sumTotal = 0;
        for (int i=0;i<verticalFinalActivitiesList.finalActivities.size();i++){
            for (int j=0;j<tokenConfigurations.size();j++){
                sumTotal += matrixActivitiesTokens[i][j];
            }
        }*/
        for (int i=0;i<verticalFinalActivitiesList.finalActivities.size();i++){
            trace(verticalFinalActivitiesList.finalActivities.get(i)+newline);
            trace("["+i+"]");
            for (int j=0;j<tokenConfigurations.size();j++){
                trace("["+j+"]");
//                matrixActivitiesTokens[i][j] /= sumTotal;
                trace(decimalFormat.format(matrixActivitiesTokens[i][j])+" ");
            }
            trace(newline);
        }
        trace("END PROBABILITIES OF OBSERVING A GIVEN TOKEN GIVEN A VERTICAL FINAL
ACTIVITY"+newline);
//          System.exit(0);//DEBUG
        trace("BEGIN LIST OF STATE TRANSITIONS (see the number of them at the end of the list)"+newline);
        System.out.print("BEGIN LIST OF STATE TRANSITIONS (see the number of them at the end of the
list)"+newline);
        ArrayList transitions = new ArrayList();
        Collections.sort(stateTransitions, new Comparator(){
            public int compare(Object a,Object b){
                StateTransition ta = (StateTransition)a;
                StateTransition tb = (StateTransition)b;
                return (ta.text.compareTo(tb.text));
            }
        });
        int numberOfUniqueStateTransitions = 0;
        String previousTransition = "";
        for (int i=0;i<stateTransitions.size();i++){
            String transition = ((StateTransition)stateTransitions.get(i)).text;
            if (!transition.equals(previousTransition)) {
                numberOfUniqueStateTransitions++;
                double probability = 1;
                String probabilities = transition.substring(1+transition.indexOf("transition probability =")+"transition
probability =".length(),transition.indexOf(" from finish = "));
                while (probabilities.indexOf(" ")!=-1) {
                    probabilities = probabilities.substring(probabilities.indexOf(" ")+1);
                    int end = probabilities.indexOf(" ");
                    if (end==-1) end = probabilities.length();
                    String s = probabilities.substring(0,end);
                    if (s.indexOf("*")!=-1) {
                        probability *=
Float.parseFloat(s.substring(0,s.indexOf("*")))*Float.parseFloat(s.substring(s.indexOf("*")+1));
                    } else {
```

APPENDIX B

```
                    probability *= Float.parseFloat(s);
                }
            }
            trace(""+((StateTransition)stateTransitions.get(i)).text+" PROBABILITY =
"+decimalFormat.format(probability)+newline);
            ((StateTransition)stateTransitions.get(i)).probability = probability;
            String from = transition.substring(transition.indexOf("FROM ")+"FROM
".length(),transition.indexOf(" TO "));
            for (int k=0;k<verticalFinalActivitiesList.finalActivities.size();k++){
                if (((String)verticalFinalActivitiesList.finalActivities.get(k)).equals(" "+from)){
                    ((StateTransition)stateTransitions.get(i)).from = k;
//                  trace("["+k+"]"+newline);
                    break;
                }
            }
            String to = transition.substring(transition.indexOf(" TO ")+" TO ".length(),transition.indexOf(" ["));
            for (int k=0;k<verticalFinalActivitiesList.finalActivities.size();k++){
                if (((String)verticalFinalActivitiesList.finalActivities.get(k)).equals(" "+to)){
                    ((StateTransition)stateTransitions.get(i)).to = k;
                    break;
                }
            }
            transitions.add(stateTransitions.get(i));
        }
        previousTransition = transition;
    }
    trace("There are "+numberOfUniqueStateTransitions+" transitions."+newline);
    trace("Transition matrix:"+newline);
    for (int i=0;i<verticalFinalActivitiesList.finalActivities.size();i++) {
        trace("Row "+i+":");
        for (int j=0;j<verticalFinalActivitiesList.finalActivities.size();j++) {
            for (int k=0;k<transitions.size();k++) {
                if (((StateTransition)transitions.get(k)).from==i&&((StateTransition)transitions.get(k)).to==j){
                    trace(" ["+j+"] "+decimalFormat.format(((StateTransition)transitions.get(k)).probability));
                    break;
                }
            }
        }
        trace(newline);
    }
    trace("END LIST OF STATE TRANSITIONS"+newline);
    trace("BEGIN TESTING THE MACHINE"+newline);
    System.out.print("BEGIN TESTING THE MACHINE"+newline);
//      int testVector[] = new int[]{0,1,2,3,4,5,6,7,8,9,10,11,12,13,14,15,16,17}; //test
DrillingStatesGeneration.owl
//      int testVector[] = new int[]{0,0,1,1,0,1}; //test SimpleGeneration.owl
//      int testVector[] = new int[]{0,0,1,15,0,1}; //test SimpleGenerationUnknown.owl
    trace("...BEGIN READING TEST DATA FROM THE ONTOLOGY"+newline);
    String testVectorString = getDatatypePropertyValue("testVector","hasTestVectorValue");
    int numberOfTestValues = 0;
    int iTest = 0;
    int newIndex = 1;
    while (iTest != -1){
        newIndex = testVectorString.indexOf(",",newIndex);
        iTest++;
        if (newIndex==-1) {
            numberOfTestValues = iTest;
            iTest = -1;
        }
        newIndex++;
    }
    int[] testVector = new int[numberOfTestValues];
```

APPENDIX B

```
        iTest = 0;
        newIndex = 1;
        while (iTest != -1){
          int oldIndex = newIndex;
          newIndex = testVectorString.indexOf(",",newIndex);
          if (newIndex==-1) {
            newIndex = testVectorString.indexOf("}");
            testVector[iTest]=Integer.parseInt(testVectorString.substring(oldIndex,newIndex));
            iTest = -1;
          } else {
            testVector[iTest]=Integer.parseInt(testVectorString.substring(oldIndex,newIndex));
            iTest++;
            newIndex++;
          }
          }
        trace("...Test vector = [");
        for (int i=0;i<testVector.length;i++){
          if (i!=0) trace(",");
          trace(""+testVector[i]);
        }
        trace("]"+newline);
        trace("...END READING TEST DATA FROM THE ONTOLOGY"+newline);
        double tempFinalVerticalActivitiesProbs[] = new double[verticalFinalActivitiesList.finalActivities.size()];
        double forwardFinalVerticalActivitiesProbs[][] = new
double[testVector.length][verticalFinalActivitiesList.finalActivities.size()];
        double backwardFinalVerticalActivitiesProbs[][] = new
double[testVector.length][verticalFinalActivitiesList.finalActivities.size()];
        double finalVerticalActivitiesProbs[][] = new
double[testVector.length][verticalFinalActivitiesList.finalActivities.size()];
        for (int forwardAndBackwardPass=0;forwardAndBackwardPass<=1;forwardAndBackwardPass++){
          int startSample = 0;
          int stopSample = testVector.length;
          int sampleIncrement = 1;
          for (int j=0;j<verticalFinalActivitiesList.finalActivities.size();j++) tempFinalVerticalActivitiesProbs[j] = 0;
          if (forwardAndBackwardPass==0){
            trace("------------ FORWARD evaluation: set the initial final vertical activities state to be the top-level
start:"+newline);
            tempFinalVerticalActivitiesProbs[startActivityNumber]=1.0;
          } else {
            startSample = testVector.length-1;
            stopSample = -1;
            sampleIncrement = -1;
            trace("------------ BACKWARD evaluation: set the initial final vertical activities state to be the top-
level end:"+newline);
            tempFinalVerticalActivitiesProbs[finishActivityNumber]=1.0;
          }
          for (int i=0;i<verticalFinalActivitiesList.finalActivities.size();i++) {
            trace("["+i+"]"+decimalFormat.format(tempFinalVerticalActivitiesProbs[i])+" ");
          }
          trace(newline);
          double newTempFinalVerticalActivitiesProbs[] = new
double[verticalFinalActivitiesList.finalActivities.size()];
          for (int iSample=startSample;iSample!=stopSample;iSample+=sampleIncrement){
            for (int j=0;j<verticalFinalActivitiesList.finalActivities.size();j++)
newTempFinalVerticalActivitiesProbs[j] = 0;
            for (int i=0;i<tokenConfigurations.size();i++)
trace("("+i+")"+((TokenConfiguration)tokenConfigurations.get(i)).name);
            trace(newline);
            int iSampleTokenNumber = 0;
            for (int i=0;i<tokenConfigurations.size();i++) {
              if (((TokenConfiguration)tokenConfigurations.get(i)).value==testVector[iSample]) {
                iSampleTokenNumber = i;
```

APPENDIX B

```
                    break;
                }
            }
            trace("Sample "+iSample+" token = "+testVector[iSample]+" token number =
"+iSampleTokenNumber+" (");
            if (forwardAndBackwardPass==0){
                trace("start to end, forward pass");
            } else {
                trace("end to start, backward pass");
            }
            trace("):"+newline);
            trace("Prior final vertical activities probabilities after sample step:"+newline);
            for (int j=0;j<verticalFinalActivitiesList.finalActivities.size();j++) {
                trace("Activity "+j+":");
                for (int i=0;i<verticalFinalActivitiesList.finalActivities.size();i++) {
                    for (int k=0;k<transitions.size();k++) {
                        if (forwardAndBackwardPass==0){
                            if
(((StateTransition)transitions.get(k)).from==i&&((StateTransition)transitions.get(k)).to==j){

trace("+["+i+"]"+decimalFormat.format(tempFinalVerticalActivitiesProbs[i])+"*["+i+"]["+j+"]"+decimalFormat.format
(((StateTransition)transitions.get(k)).probability));
                                newTempFinalVerticalActivitiesProbs[j] +=
tempFinalVerticalActivitiesProbs[i]*((StateTransition)transitions.get(k)).probability;
                                break;
                            }
                        }else{
                            if
(((StateTransition)transitions.get(k)).from==j&&((StateTransition)transitions.get(k)).to==i){

trace("+["+i+"]"+decimalFormat.format(tempFinalVerticalActivitiesProbs[i])+"*["+i+"]["+j+"]"+decimalFormat.format
(((StateTransition)transitions.get(k)).probability));
                                newTempFinalVerticalActivitiesProbs[j] +=
tempFinalVerticalActivitiesProbs[i]*((StateTransition)transitions.get(k)).probability;
                                break;
                            }
                        }
                    }
                }
                trace(" prob="+decimalFormat.format(newTempFinalVerticalActivitiesProbs[j])+newline);
            }
            trace("Prior probabilities =");
            double sum = 0;
            for (int j=0;j<verticalFinalActivitiesList.finalActivities.size();j++) {
                trace(" ["+j+"]"+decimalFormat.format(newTempFinalVerticalActivitiesProbs[j]));
                sum += newTempFinalVerticalActivitiesProbs[j];
            }
            trace(" sum="+decimalFormat.format(sum)+newline);
            trace("Match prior probabilities with probabilities that the token observed is the actual one
(probabilities due to the confusion matrices):"+newline);
            trace("Token probabilities =");
            sum = 0;
            for (int j=0;j<verticalFinalActivitiesList.finalActivities.size();j++){
                trace(" ["+j+"]"+decimalFormat.format(matrixActivitiesTokens[j][iSampleTokenNumber]));
                sum += matrixActivitiesTokens[j][iSampleTokenNumber];
            }
            trace(" sum="+decimalFormat.format(sum)+newline);
            trace("Posterior probabilities =");
            sum = 0;
            for (int j=0;j<verticalFinalActivitiesList.finalActivities.size();j++){
                newTempFinalVerticalActivitiesProbs[j] *= matrixActivitiesTokens[j][iSampleTokenNumber];
                trace(" ["+j+"]"+decimalFormat.format(newTempFinalVerticalActivitiesProbs[j]));
```

APPENDIX B

```
                sum += newTempFinalVerticalActivitiesProbs[j];
            }
            trace(" sum="+decimalFormat.format(sum)+newline);
            if (sum == 0) {
                if (forwardAndBackwardPass==0){
                    trace("RESET TO START STATE since sum == 0 means that we are in an impossible
situation"+newline);
                    newTempFinalVerticalActivitiesProbs[startActivityNumber] = 1;
                } else {
                    trace("RESET TO END STATE since sum == 0 means that we are in an impossible
situation"+newline);
                    newTempFinalVerticalActivitiesProbs[finishActivityNumber] = 1;
                }
                sum = 1;
            }
            trace("Normalize posterior probabilities; that defines the new state for going to the next
sample:"+newline+"Normalized probabilities = ");
            double checkSum = 0;
            for (int j=0;j<verticalFinalActivitiesList.finalActivities.size();j++){
                tempFinalVerticalActivitiesProbs[j] = newTempFinalVerticalActivitiesProbs[j]/sum;
                trace(" ["+j+"]"+decimalFormat.format(tempFinalVerticalActivitiesProbs[j]));
                checkSum += tempFinalVerticalActivitiesProbs[j];
                if (forwardAndBackwardPass==0){
                    forwardFinalVerticalActivitiesProbs[iSample][j] = tempFinalVerticalActivitiesProbs[j];
                } else {
                    backwardFinalVerticalActivitiesProbs[iSample][j] = tempFinalVerticalActivitiesProbs[j];
                }
            }
            trace(" sum="+decimalFormat.format(checkSum)+newline);
        }
    }
    trace ("Combine forward and backward probabilities"+newline);
    for (int iSample=0;iSample<testVector.length;iSample++){
        trace("Sample = "+iSample+" Token = "+testVector[iSample]+newline);
        for (int j=0;j<verticalFinalActivitiesList.finalActivities.size();j++){
            trace("["+iSample+"]["+j+"]"+"
forward="+decimalFormat.format(forwardFinalVerticalActivitiesProbs[iSample][j])+"
backward="+decimalFormat.format(backwardFinalVerticalActivitiesProbs[iSample][j]));
            finalVerticalActivitiesProbs[iSample][j] = (forwardFinalVerticalActivitiesProbs[iSample][j] +
backwardFinalVerticalActivitiesProbs[iSample][j])/2;
            trace(" combined and
normalized="+decimalFormat.format(finalVerticalActivitiesProbs[iSample][j])+newline);
        }
    }
    trace("Compute a checksum of all the data for verification; should be equal to the number of samples: ");
    double totalChecksum = 0;
    for (int iSample=0;iSample<testVector.length;iSample++){
        for (int j=0;j<verticalFinalActivitiesList.finalActivities.size();j++){
            totalChecksum += finalVerticalActivitiesProbs[iSample][j];
        }
    }
    trace(decimalFormat.format(totalChecksum)+newline);
    trace("Compute a checksum of half the data to see if the results are the same as on a prior reference
run:"+newline);
    totalChecksum = 0;
    for (int iSample=0;iSample<testVector.length;iSample++){
        for (int j=0;j<verticalFinalActivitiesList.finalActivities.size();j+=2){
            totalChecksum += finalVerticalActivitiesProbs[iSample][j];
        }
    }
    trace("Checksum of results (should be 0.072790) ="+decimalFormat.format(totalChecksum)+newline);
    if (decimalFormat.format(totalChecksum).equals("0.072790")){
```

APPENDIX B

```
            trace("HURRAH! RESULTS ARE SAME AS USUAL!"+newline);
        } else {
            trace("TEST FAILED! SOMETHING HAS CHANGED (OR YOU'RE NOT RUNNING THE
REFERENCE JOB)!"+newline);
        }
        trace("END TESTING THE MACHINE"+newline);
        trace("BEGIN DISPLAY RESULTS"+newline);
        System.out.print("BEGIN DISPLAY RESULTS"+newline);
        for (int iSample=0;iSample<testVector.length;iSample++){
            int iSampleTokenNumber = 0;
            for (int i=0;i<tokenConfigurations.size();i++) {
                if (((TokenConfiguration)tokenConfigurations.get(i)).value==testVector[iSample]) {
                    iSampleTokenNumber = i;
                    break;
                }
            }
            trace("Sample "+iSample+" token = "+testVector[iSample]+" token number = "+iSampleTokenNumber);
            double maxProb = 0;
            int result = 0;
            for (int j=0;j<verticalFinalActivitiesList.finalActivities.size();j++){
                if (finalVerticalActivitiesProbs[iSample][j]>maxProb) {
                    maxProb = finalVerticalActivitiesProbs[iSample][j];
                    result = j;
                }
            }
            trace (" max probability = "+decimalFormat.format(maxProb));
            trace (" activity = "+verticalFinalActivitiesList.finalActivities.get(result)+newline);
        }
        trace("END DISPLAY RESULTS"+newline);
        trace("BEGIN CREATING PROCESSING FILE"+newline);
        String PROCESSINGFILE =
"D:\\Documents\\Ontology\\DrillingStates\\Java\\GrammarGeneration\\GrammarGenerationProcessingFile.xml";
        trace("    PROCESSINGFILE="+PROCESSINGFILE+newline);
        System.out.print("    PROCESSINGFILE="+PROCESSINGFILE+newline);
        BufferedWriter processingFileWriter = new BufferedWriter(new FileWriter(PROCESSINGFILE));
        System.out.print("BEGIN CREATING PROCESSING FILE"+newline);
        processingFileWriter.write("<?xml version=\"1.0\" encoding=\"utf-8\"?>"+newline);
        processingFileWriter.write("<stochastic_grammar_processing>"+newline);
        processingFileWriter.write("  <software_version>1.0</software_version>"+newline);
        Date todaysDate = new java.util.Date();
        SimpleDateFormat formater = new SimpleDateFormat("EEE, dd-MMM-yyyy HH:mm:ss");
        String formatedDate = formater.format(todaysDate);
        processingFileWriter.write("  <date>"+formatedDate+"</date>"+newline);
        processingFileWriter.write("
<ontology>"+owlModel.getDefaultOWLOntology().getOntologyURI()+"</ontology>"+newline);
        processingFileWriter.write("  <final_activities>"+newline);
         for (int i=0;i<verticalFinalActivitiesList.finalActivities.size();i++) processingFileWriter.write("
<final_activity>"+verticalFinalActivitiesList.finalActivities.get(i)+"</final_activity>"+newline);
        processingFileWriter.write("  </final_activities>"+newline);
        processingFileWriter.write("  <tokens>"+newline);
        for (int i=0;i<tokenConfigurations.size();i++) {
            processingFileWriter.write("
<token><name>"+((TokenConfiguration)tokenConfigurations.get(i)).name+"</name><value>"+((TokenConfigurat
ion)tokenConfigurations.get(i)).value+"</value></token>"+newline);
        }
        processingFileWriter.write("  </tokens>"+newline);
        processingFileWriter.write("  <matrix_final_activities_vs_tokens>"+newline);
        DecimalFormat decimalFormatXML = new DecimalFormat("0.000000000000");
        for (int i=0;i<verticalFinalActivitiesList.finalActivities.size();i++){
            processingFileWriter.write("    <i>");
            for (int j=0;j<tokenConfigurations.size();j++){
                processingFileWriter.write("<j>"+decimalFormatXML.format(matrixActivitiesTokens[i][j])+"</j>");
```

APPENDIX B

```
        }
        processingFileWriter.write("</i>"+newline);
      }
      processingFileWriter.write("  </matrix_final_activities_vs_tokens>"+newline);
      processingFileWriter.write("  <matrix_final_activities_transitions>"+newline);
      for (int m=0;m<verticalFinalActivitiesList.finalActivities.size();m++) {
        processingFileWriter.write("    <m>");
        for (int n=0;n<verticalFinalActivitiesList.finalActivities.size();n++) {
          for (int k=0;k<transitions.size();k++) {
            if (((StateTransition)transitions.get(k)).from==m&&((StateTransition)transitions.get(k)).to==n){
processingFileWriter.write("<n><ni>"+n+"</ni><nv>"+decimalFormatXML.format(((StateTransition)transitions.get
(k)).probability)+"</nv></n>");
              break;
            }
          }
        }
        processingFileWriter.write("</m>"+newline);
      }
      processingFileWriter.write("  </matrix_final_activities_transitions>"+newline);
      processingFileWriter.write("</stochastic_grammar_processing>"+newline);
      processingFileWriter.close();
      trace("END CREATING PROCESSING FILE"+newline);
      System.out.print("END CREATING PROCESSING FILE"+newline);
      trace("END"+newline);
      System.out.print("END"+newline);
      exportContents.append("... done producing "+PROCESSINGFILE);
    } catch (IllegalStateException ex) {
      trace("ERROR: generating code: "+ex.getLocalizedMessage()+"\n");
    }
  }

  FinalActivities goDownActivities(OWLIndividual activity,ArrayList verticalActivitiesTracking,FinalActivities
verticalFinalActivitiesList,FinalActivities currentFinalActivities,ArrayList stateTransitions,String
transitionProbability,boolean recursion){
    String repeat = "1";
    OWLIndividual activityType = getOneObjectPropertyValue(activity,"hasActivityType");
    if (activityType.getRDFType().getName().equals("RepeatedActivityType")){
      repeat = getDatatypePropertyValue(activityType,"hasRepetitionFactor");
      activityType = getOneObjectPropertyValue(activityType,"repeatsActivityType");
    }
    String depth = "";
    for (int i=0;i<verticalActivitiesTracking.size();i++) depth +=" | ";
    String lastProbability = transitionProbability;
    if (transitionProbability.lastIndexOf(" ")!=-1) lastProbability =
transitionProbability.substring(transitionProbability.lastIndexOf(" "),transitionProbability.length());
    if (!lastProbability.equals("1.0")) trace(depth+"------ALTERNATIVE TO HORIZONTAL TERMINAL"+newline);
    trace(depth+lastProbability+" "+getDatatypePropertyValue(activity,"hasConfigurationName")+" [*"+repeat+"]
");
    FinalActivities localCurrentFinalActivities = new FinalActivities();
    Collection transitions =  getObjectPropertyValues(activityType,"containsTransition");
    if (getDatatypePropertyValue(activity,"hasConfigurationName").equals("start")) {
      trace(newline);
      localCurrentFinalActivities.addAll(currentFinalActivities);
    } else if
(verticalActivitiesTracking.size()!=1&&getDatatypePropertyValue(activity,"hasConfigurationName").equals("finish"
)) { //size==1 is special case of top start and finish activities
      trace(newline);
      for (int i=0;i<currentFinalActivities.finalActivities.size();i++) {
        localCurrentFinalActivities.finalActivities.add(currentFinalActivities.finalActivities.get(i));
localCurrentFinalActivities.finalProbabilities.add(currentFinalActivities.finalProbabilities.get(i)+transitionProbability
```

APPENDIX B

```
);
        localCurrentFinalActivities.fromFinish.add(true);
      }
    } else if (transitions.isEmpty()) {
      trace(" VERTICAL TERMINAL");
      String verticalFinalActivity = "";
      ArrayList verticalFinalActivityInstanceList = new ArrayList();
      verticalFinalActivityInstanceList = (ArrayList)verticalActivitiesTracking.clone();
      verticalFinalActivityInstanceList.add(activity);
      for (int i=0;i<verticalFinalActivityInstanceList.size();i++) verticalFinalActivity+="
"+getDatatypePropertyValue((OWLIndividual)verticalFinalActivityInstanceList.get(i),"hasConfigurationName");
      if (!verticalFinalActivitiesList.finalActivities.contains(verticalFinalActivity)) {
        verticalFinalActivitiesList.finalActivities.add(verticalFinalActivity);
        verticalFinalActivitiesList.finalActivitiesInstances.add(verticalFinalActivityInstanceList);
      }
      for (int i=0;i<currentFinalActivities.finalActivities.size();i++) {
        StateTransition stateTransition = new StateTransition();
        String transition = "FROM "+currentFinalActivities.finalActivities.get(i)+" TO "+verticalFinalActivity+"
[*"+repeat+"]";
        transition += " transition probability =
"+currentFinalActivities.finalProbabilities.get(i)+transitionProbability;
        transition += " from finish = "+currentFinalActivities.fromFinish.get(i);
        trace(" STATE TRANSITION: "+transition);
        stateTransition.text = transition;
        stateTransitions.add(stateTransition);
      }
      localCurrentFinalActivities.finalActivities.add(verticalFinalActivity);
      localCurrentFinalActivities.finalProbabilities.add("");
      localCurrentFinalActivities.fromFinish.add(false);
      trace(newline);
    } else {
      trace(newline);
      ArrayList horizontalActivitiesTracking = new ArrayList();
      verticalActivitiesTracking.add(activity);

localCurrentFinalActivities.addAll(followTransition(startActivity,transitions,horizontalActivitiesTracking,verticalActi
vitiesTracking,verticalFinalActivitiesList,currentFinalActivities,stateTransitions,transitionProbability,recursion));
      verticalActivitiesTracking.remove(verticalActivitiesTracking.size()-1);
    }
    return localCurrentFinalActivities;
  }
  FinalActivities followTransition(OWLIndividual activity, Collection transitions,ArrayList
horizontalActivitiesTracking,ArrayList verticalActivitiesTracking,FinalActivities
verticalFinalActivitiesList,FinalActivities currentFinalActivities,ArrayList stateTransitions,String
transitionProbability,boolean recursion){
    String repeat = "1";
    OWLIndividual activityType = getOneObjectPropertyValue(activity,"hasActivityType");
    if (activityType.getRDFType().getName().equals("RepeatedActivityType")){
      repeat = getDatatypePropertyValue(activityType,"hasRepetitionFactor");
      activityType = getOneObjectPropertyValue(activityType,"repeatsActivityType");
    }
    FinalActivities localCurrentFinalActivities = new FinalActivities();
    FinalActivities transitionCurrentActivities = new FinalActivities();
    horizontalActivitiesTracking.add(activity);
    String depth = "";
    for (int i=0;i<verticalActivitiesTracking.size();i++) depth +=" | ";
    for (Iterator jt = transitions.iterator(); jt.hasNext();) {
      OWLIndividual transition = (OWLIndividual)jt.next();
      OWLIndividual fromActivity = getOneObjectPropertyValue(transition,"isTransitionFromSubActivity");
      if (fromActivity.equals(activity)){
        OWLIndividual toActivity = getOneObjectPropertyValue(transition,"isTransitionToSubActivity");
```

APPENDIX B

```
            String addedProbability = getDatatypePropertyValue(transition,"hasProbabilityValue");
            if ((!recursion)&&!repeat.equals("1")) {
                double prob = Math.exp(-
Float.parseFloat(getDatatypePropertyValue(getOneInstance("TimeStep"),"hasTimeStepSizeInSeconds"))/Float.p
arseFloat(repeat));
                addedProbability = decimalFormat.format(prob);
                String probabilityComplement = decimalFormat.format(1-prob);

goDownActivities(activity,verticalActivitiesTracking,verticalFinalActivitiesList,currentFinalActivities,stateTransition
s,transitionProbability+" "+addedProbability,true);
                addedProbability =
probabilityComplement+"*"+getDatatypePropertyValue(transition,"hasProbabilityValue");
            }
            if (recursion||horizontalActivitiesTracking.contains(toActivity)){
                if (!recursion) trace(depth+"{beginning of recursion to
"+getDatatypePropertyValue(toActivity,"hasConfigurationName")+"}"+newline);

goDownActivities(toActivity,verticalActivitiesTracking,verticalFinalActivitiesList,currentFinalActivities,stateTransiti
ons,transitionProbability+" "+addedProbability,true);
                if (!recursion) trace(depth+"{end of recursion to
"+getDatatypePropertyValue(toActivity,"hasConfigurationName")+"}"+newline);
            } else if (getDatatypePropertyValue(toActivity,"hasConfigurationName").equals("finish")){

localCurrentFinalActivities.addAll(goDownActivities(toActivity,verticalActivitiesTracking,verticalFinalActivitiesList,c
urrentFinalActivities,stateTransitions,transitionProbability+" "+addedProbability,false));
                trace(depth+"------HORIZONTAL TERMINAL");
                for (int i=0;i<horizontalActivitiesTracking.size();i++) trace("
"+getDatatypePropertyValue((OWLIndividual)horizontalActivitiesTracking.get(i),"hasConfigurationName"));
                trace(" finish"+newline);
            }else{

transitionCurrentActivities.addAll(goDownActivities(toActivity,verticalActivitiesTracking,verticalFinalActivitiesList,c
urrentFinalActivities,stateTransitions,transitionProbability+" "+addedProbability,false));
                trace(">>");

localCurrentFinalActivities.addAll(followTransition(toActivity,transitions,horizontalActivitiesTracking,verticalActiviti
esTracking,verticalFinalActivitiesList,transitionCurrentActivities,stateTransitions,"",false));
                transitionCurrentActivities.clear();
            }
        }
    }
    horizontalActivitiesTracking.remove(horizontalActivitiesTracking.size()-1);
    return localCurrentFinalActivities;
  }

  void computeProbabilitiesOfAllActualConfigurations(double matrixActivitiesTokens[],int configuration[],int
configurationOffset,int referenceConfiguration[],
        ArrayList configurationVariables,ArrayList tokenConfigurations,Boolean actual){
    if (configurationOffset==configuration.length){
        double probability = 1;
        if
(actual||TRACEamountOfTracingForConfigurationProbabilities<TRACEmaxAmountOfTracingForConfigurationPr
obabilities) {
            TRACEamountOfTracingForConfigurationProbabilities++;
            if (actual) trace("  Actual Configuration = ") ;
            trace("[");
            for (int i=0;i<configuration.length;i++){
                if (i!=0) trace(" ");
                trace(""+configuration[i]);
            }
            trace("]");
        } else {
```

APPENDIX B

```
            trace("   .");
        }
        if (actual){
            if
(actual||TRACEamountOfTracingForConfigurationProbabilities<TRACEmaxAmountOfTracingForConfigurationPr
obabilities) trace(" ConfigurationProbability = ");
            for (int i=0;i<referenceConfiguration.length;i++) {
                if
(actual||TRACEamountOfTracingForConfigurationProbabilities<TRACEmaxAmountOfTracingForConfigurationPr
obabilities) if (i!=0) trace("*");
                if
(actual||TRACEamountOfTracingForConfigurationProbabilities<TRACEmaxAmountOfTracingForConfigurationPr
obabilities)trace("("+configuration[i]+")");
                if (referenceConfiguration[i]>0) {
                    if
(actual||TRACEamountOfTracingForConfigurationProbabilities<TRACEmaxAmountOfTracingForConfigurationPr
obabilities)trace("1.0");
                } else {
                    if
(actual||TRACEamountOfTracingForConfigurationProbabilities<TRACEmaxAmountOfTracingForConfigurationPr
obabilities)trace(""+((ConfigurationVariable)configurationVariables.get(i)).probabilities.get(configuration[i]-1));
                    probability *=
Float.parseFloat((String)((ConfigurationVariable)configurationVariables.get(i)).probabilities.get(configuration[i]-
1));
                }
            }
            if
(actual||TRACEamountOfTracingForConfigurationProbabilities<TRACEmaxAmountOfTracingForConfigurationPr
obabilities)trace(" = "+decimalFormat.format(probability));
            if
(actual||TRACEamountOfTracingForConfigurationProbabilities<TRACEmaxAmountOfTracingForConfigurationPr
obabilities)trace(newline);
            if
(actual||TRACEamountOfTracingForConfigurationProbabilities<TRACEmaxAmountOfTracingForConfigurationPr
obabilities)trace("    Observed Configurations:"+newline);
            int allConfiguration[] = new int[configuration.length];
            for (int i=0;i<configuration.length;i++)allConfiguration[i] = -
((ConfigurationVariable)configurationVariables.get(i)).values.size();;
            double tempMatrixActivitiesTokens[] = new double[matrixActivitiesTokens.length];
            for (int i=0;i<tempMatrixActivitiesTokens.length;i++) tempMatrixActivitiesTokens[i] = 0;

computeProbabilitiesOfAllActualConfigurations(tempMatrixActivitiesTokens,allConfiguration,0,configuration,confi
gurationVariables,tokenConfigurations,false);
            if
(actual||TRACEamountOfTracingForConfigurationProbabilities>=TRACEmaxAmountOfTracingForConfigurationP
robabilities) trace(newline);
            if
(actual||TRACEamountOfTracingForConfigurationProbabilities<TRACEmaxAmountOfTracingForConfigurationPr
obabilities)trace("    Compute compounded weighted (using Actual Configuration's probability
"+decimalFormat.format(probability)+") sum of token probabilities: "+newline+"     ");
            double sumProbs = 0;
            for (int i=0;i<matrixActivitiesTokens.length;i++){
                matrixActivitiesTokens[i] += probability*tempMatrixActivitiesTokens[i];
                if
(actual||TRACEamountOfTracingForConfigurationProbabilities<TRACEmaxAmountOfTracingForConfigurationPr
obabilities)trace(decimalFormat.format(matrixActivitiesTokens[i])+" ");
                sumProbs += matrixActivitiesTokens[i];
            }
            if
(actual||TRACEamountOfTracingForConfigurationProbabilities<TRACEmaxAmountOfTracingForConfigurationPr
obabilities)trace("Sum = "+decimalFormat.format(sumProbs));
        } else {
```

APPENDIX B

```
        double prob = 1;
        for (int i=0;i<configuration.length;i++){
          double iProb =
((ConfigurationVariable)configurationVariables.get(i)).confusionMatrix[referenceConfiguration[i]-
1][configuration[i]-1];
          if
(actual||TRACEamountOfTracingForConfigurationProbabilities<TRACEmaxAmountOfTracingForConfigurationPr
obabilities){
            trace(" prob("+configuration[i]+"|"+referenceConfiguration[i]+")= "+decimalFormat.format(iProb));
          }
          prob *= iProb;
        }
        if
(actual||TRACEamountOfTracingForConfigurationProbabilities<TRACEmaxAmountOfTracingForConfigurationPr
obabilities)trace(" >>> prob(observed|actual)="+decimalFormat.format(prob));
        int token = findToken(configuration,tokenConfigurations);
        if (token==-1){
          if
(actual||TRACEamountOfTracingForConfigurationProbabilities<TRACEmaxAmountOfTracingForConfigurationPr
obabilities)trace(" (no token found for the configuration)"+newline);
          for (int i=0;i<tokenConfigurations.size();i++) {
            matrixActivitiesTokens[i] += prob/tokenConfigurations.size();
          }
        } else {
          if
(actual||TRACEamountOfTracingForConfigurationProbabilities<TRACEmaxAmountOfTracingForConfigurationPr
obabilities){
            trace(" token("+token+") name= "+((TokenConfiguration)tokenConfigurations.get(token)).name+"
value="+((TokenConfiguration)tokenConfigurations.get(token)).value+newline);
          }
          matrixActivitiesTokens[token] += prob;
        }
        if
(actual||TRACEamountOfTracingForConfigurationProbabilities<TRACEmaxAmountOfTracingForConfigurationPr
obabilities){
          double sumProbs = 0;
          for (int i=0;i<matrixActivitiesTokens.length;i++) {
            trace(decimalFormat.format(matrixActivitiesTokens[i])+" ");
          sumProbs += matrixActivitiesTokens[i];
          }
          trace("Sum = "+decimalFormat.format(sumProbs));
        }
      }
      if
(actual||TRACEamountOfTracingForConfigurationProbabilities<TRACEmaxAmountOfTracingForConfigurationPr
obabilities) trace(newline);
    } else {
      if (configuration[configurationOffset]>0)
computeProbabilitiesOfAllActualConfigurations(matrixActivitiesTokens,configuration,configurationOffset+1,refere
nceConfiguration,configurationVariables,tokenConfigurations,actual);
      if (configuration[configurationOffset]<0) {
        for (int i=1;i<=-configuration[configurationOffset];i++){
          int patchedConfiguration[] = configuration.clone();
          patchedConfiguration[configurationOffset] = i;

computeProbabilitiesOfAllActualConfigurations(matrixActivitiesTokens,patchedConfiguration,configurationOffset+
1,referenceConfiguration,configurationVariables,tokenConfigurations,actual);
        }
      }
    }
  }
```

APPENDIX B

```
int findToken(int configuration[],ArrayList tokenConfigurations){
  for (int i=0;i<tokenConfigurations.size();i++){
    boolean isTheToken = true;
    for (int j=0;j<configuration.length;j++){
      if
(((TokenConfiguration)tokenConfigurations.get(i)).configuration[j]<0||((TokenConfiguration)tokenConfigurations.g
et(i)).configuration[j]==configuration[j]){
      } else {
        isTheToken = false;
        break;
      }
    }
    if (isTheToken){
      return(i);
    }
  }
  return(-1);
}

// Objects ----------------------------------------------------------------
  class FinalActivities {
    public ArrayList finalActivities = new ArrayList();
    public ArrayList finalActivitiesInstances = new ArrayList();
    public ArrayList finalProbabilities = new ArrayList();
    public ArrayList fromFinish = new ArrayList();
    public void addAll(FinalActivities inputFinalActivities) {
      finalActivities.addAll(inputFinalActivities.finalActivities);
      finalActivitiesInstances.addAll(inputFinalActivities.finalActivitiesInstances);
      finalProbabilities.addAll(inputFinalActivities.finalProbabilities);
      fromFinish.addAll(inputFinalActivities.fromFinish);
    }
    public void clear() {
      finalActivities.clear();
      finalActivitiesInstances.clear();
      finalProbabilities.clear();
      fromFinish.clear();
    }
  }
  class ConfigurationVariable {
    public OWLIndividual instance;
    public ArrayList values = new ArrayList();
    public ArrayList probabilities = new ArrayList();
    public double confusionMatrix[][];
  }
  class TokenConfiguration {
    public String name;
    public int value;
    public int[] configuration;
  }
  class StateTransition {
    public String text;
    public double probability = 1;
    public int from;
    public int to;
  }

// Utilities ----------------------------------------------------------------
  Collection getInstances(String cls,boolean includingSubclasses){
    OWLNamedClass myCls = owlModel.getOWLNamedClass(cls);
    return myCls.getInstances(includingSubclasses);
  }
```

APPENDIX B

```
    OWLIndividual getOneInstance(String cls){
        Collection clsses = getInstances(cls,false);
        OWLIndividual instance = null;
        for (Iterator jt = clsses.iterator(); jt.hasNext();) {
            instance = (OWLIndividual)jt.next();
            break;
        }
        return instance;
    }

    String getDatatypePropertyValue(OWLIndividual oIndividual,String property){
        OWLDatatypeProperty oProperty = owlModel.getOWLDatatypeProperty(property);
        return (String)oIndividual.getPropertyValue(oProperty);
    }
    String getDatatypePropertyValue(String name,String property){
        OWLIndividual oIndividual = owlModel.getOWLIndividual(name);
        return getDatatypePropertyValue(oIndividual,property);
    }

    Collection getObjectPropertyValues(OWLIndividual oIndividual,String property){
        OWLObjectProperty oProperty = owlModel.getOWLObjectProperty(property);
        return (Collection)oIndividual.getPropertyValues(oProperty);
    }
    Collection getObjectPropertyValues(String name,String property){
        OWLIndividual oIndividual = owlModel.getOWLIndividual(name);
        return getObjectPropertyValues(oIndividual,property);
    }

    OWLIndividual getOneObjectPropertyValue(OWLIndividual oIndividual, String property){
        Collection values = getObjectPropertyValues(oIndividual,property);
        OWLIndividual value = null;
        for (Iterator un = values.iterator(); un.hasNext();) {
            value = (OWLIndividual)un.next();
            break;
        }
        return value;
    }

    void trace(String text) {
        if (trace) {
            try {
//                  System.out.print(text);
                exportContents.append(text);
            }catch (Exception e){
                System.err.println("trace: Error while tracing text: " + e.getMessage());
            }
        }
    }
    void getOut(String text) {
        try {
            exportContents.append(text);
            exportFile.write(text);
        }catch (Exception e){
            System.err.println("getOut: Error writing export file: " + e.getMessage());
        }
    }
}
/*
 * Created on November 10, 2007, 9:23 AM - Bertrand du Castel
 * Copyright Schlumberger 2007,2008,2009
 */
```

APPENDIX C

GENERATED .DNE FILE FROM ONTOLOGY REPRESENTATION 1003 CORRESPONDING TO BBN 1100

```
// ~->[DNET-1]->~

// File created by BayesianTab

bnet motors {
node spPressure {
        kind = NATURE;
        discrete = TRUE;
        chance = CHANCE;
        states = (surging,increasing,steady,dropping);
        parents = (Torque,Washout,MotorStall);
        probs =

((((0.9,0.1,0,0),(0,0,0,1)),((0.95,0.05,0,0),(0,0,0.05,0.95))),(((0.9,0.1,0,0),(0,0.3,0.3,0.4)),((0.95,0.05,0,0),(0
,0.95,0.05,0))),(((0.9,0.1,0,0),(0,0,0.1,0.9)),((0.95,0.05,0,0),(0,0.025,0.95,0.025))));
        };
node Torque {
        kind = NATURE;
        discrete = TRUE;
        chance = CHANCE;
        states = (dropping,increasing,steady);
        parents = (WOB,MotorStall,BitBalling);
        probs =

((((0,1,0),(0,0.9,0.1)),((0.025,0.025,0.95),(1,0,0))),(((0,1,0),(0,0.9,0.1)),((0.95,0,0.05),(1,0,0))),(((0,1,0),(0,0
.9,0.1)),((0,0.95,0.05),(1,0,0))));
        };
node MotorStall {
        kind = NATURE;
        discrete = TRUE;
        chance = CHANCE;
        states = (stall,ok);
        parents = ();
        probs =
                (0.01,0.99);
        };
node BitBalling {
        kind = NATURE;
        discrete = TRUE;
        chance = CHANCE;
        states = (ok,bitBalling);
        parents = ();
        probs =
                (0.99,0.01);
        };
node WOB {
        kind = NATURE;
        discrete = TRUE;
        chance = CHANCE;
        states = (steady,dropping,increasing);
```

APPENDIX C

```
        parents = ();
        probs =
                (0.34,0.33,0.33);
        };
node FormationChange {
        kind = NATURE;
        discrete = TRUE;
        chance = CHANCE;
        states = (change,noChange);
        parents = ();
        probs =
                (0.05,0.95);
        };
node Washout {
        kind = NATURE;
        discrete = TRUE;
        chance = CHANCE;
        states = (washout,ok);
        parents = ();
        probs =
                (0.01,0.99);
        };
node ROP {
        kind = NATURE;
        discrete = TRUE;
        chance = CHANCE;
        states = (increasing,dropping,steady);
        parents = (FormationChange,BitBalling,WOB);
        probs =

((((0.5,0.5,0),(0.15,0.8,0.05),(0.8,0.15,0.05)),((0.1,0.8,0.1),(0.05,0.9,0.05),(0.2,0.6,0.2))),(((0.02,0.02,0.96)
,(0,0.96,0.04),(0.96,0,0.04)),((0,0.9,0.1),(0,1,0),(0.05,0.7,0.25))));
        };
};
```

We claim:

1. A method for automating exploration or production of subterranean resources, comprising:

representing a first body of knowledge relevant to exploration or production of subterranean resources in an ontology, the first body of knowledge comprises a Bayesian Belief Network comprising conditional probabilities linking exploration or production problems to observable or detectable physical quantities;

representing a second body of knowledge relevant to exploration or production of subterranean resources in the ontology, wherein the second body of knowledge is a stochastic grammar comprising rules to interpret a data stream in terms of activities performed during an exploration or production operation;

producing a first interpretation product from the first body of knowledge, wherein the first interpretation product comprises a first set of indexed values;

producing a second interpretation product from the second body of knowledge, wherein the second interpretation product comprises a second set of indexed values;

correlating the first and second interpretation products to produce rules reflecting how the first set of indexed values affect the second set of indexed values; and using the rules to automate at least one task associated with the exploration or production of subterranean resources.

2. The method of claim 1, wherein:

the first interpretation product is produced by a first interpretation program derived from a representation of the Bayesian Belief Network useable by a Bayesian Belief Network interpreter from the ontology representation of the Bayesian Belief Network; and the second interpretation product is produced by a second interpretation program derived from an interpretation program for exploration or production equipment data from the stochastic grammar, and wherein the interpretation program computes first probabilities of states reflecting activities from transitions from a one or more of the states or between the states and computes second probabilities of states reflecting activities from the equipment data, and combining the first probabilities with the second probabilities to produce the second interpretation results.

3. The method of claim 1, wherein the at least one automated task is an operational task comprising operation of a subterranean exploration or production equipment.

4. The method of claim 1, wherein the at least one automated task is an automated training operation for the operation of subterranean exploration or production equipment.

5. The method of claim 1, wherein the subterranean exploration or production comprises drilling for petroleum resources, wherein the first body of knowledge is a Bayesian Belief Network linking drilling problems to observable physical conditions, and wherein the second body of knowledge is a stochastic grammar for interpreting a drilling states data channel relating to activities of a driller; wherein the correlation comprises correlation of probabilities assigned to various drilling problems to probabilities of the activities of the driller, thereby producing rules indicative of how the driller reacts to particular drilling problems given particular conditions.

6. The method of claim 5 further comprises:

receiving the data stream;

interpreting the data stream to compute probabilities of drilling problems;

applying the rules indicative of how a driller reacts to the interpretation of the data stream to derive a suggested action.

7. The method of claim 6, further comprising:

suggesting the suggested action to the driller.

8. The method of claim 6 further comprising:

using the suggested action to control the operation of drilling equipment.

9. The method of claim 6 further comprising:

comparing the suggested action to an action suggested by a student driller and using the comparison to provide feedback to the student.

* * * * *